(12) United States Patent
Mark et al.

(10) Patent No.: US 11,093,344 B2
(45) Date of Patent: Aug. 17, 2021

(54) SOURCE VOLUME BACKUP WITH PREDICTIVE AND LOOKAHEAD OPTIMIZATIONS APPARATUSES, METHODS AND SYSTEMS

(71) Applicant: Datto, Inc., Norwalk, CT (US)

(72) Inventors: Stuart Mark, Chappaqua, NY (US); William Robert Speirs, II, Norwalk, CT (US); Robert Loce, Webster, NY (US); Robert J. Gibbons, Jr., Wilton, CT (US)

(73) Assignee: Datto, Inc., Norwalk, CT (US)

( * ) Notice: Subject to any disclaimer, the term of this patent is extended or adjusted under 35 U.S.C. 154(b) by 0 days.

(21) Appl. No.: 16/391,243

(22) Filed: Apr. 22, 2019

(65) Prior Publication Data

US 2019/0250995 A1    Aug. 15, 2019

Related U.S. Application Data

(63) Continuation-in-part of application No. 16/391,205, filed on Apr. 22, 2019, now Pat. No. 10,915,407, and
(Continued)

(51) Int. Cl.
*G06F 11/14* (2006.01)
*G06F 3/06* (2006.01)

(52) U.S. Cl.
CPC ........ *G06F 11/1458* (2013.01); *G06F 3/0604* (2013.01); *G06F 3/0655* (2013.01); *G06F 3/0673* (2013.01)

(58) Field of Classification Search
None
See application file for complete search history.

(56) References Cited

U.S. PATENT DOCUMENTS 6,785,786 B1 * 8/2004 Gold ................... G06F 11/1469
711/162
6,847,984 B1    1/2005 Midgley
(Continued)

OTHER PUBLICATIONS

U.S. Appl. No. 16/055,347.
(Continued)

*Primary Examiner* — William E. Baughman
(74) *Attorney, Agent, or Firm* — Hanchuk Kheit LLP; Walter G. Hanchuk

(57) ABSTRACT

The Source Volume Backup with Predictive and Lookahead Optimizations Apparatuses, Methods and Systems ("SVBAF") transforms backup request inputs via SVBAF components into backup response outputs. A set of blocks to be copied from a source volume to a target volume is designated based on predictive optimization settings and copied based on lookahead optimization settings while an operating system is configured to write to the source volume. Blocks of the source volume that were written to by the operating system are identified. A determination is made whether to enter a CoW mode. If the CoW mode should not be entered, the designated set of blocks is changed to include at least one of the identified blocks and a pass is repeated. Otherwise, the operating system is instructed to enter the CoW mode and bring the target volume into a state consistent with a state of the source volume.

23 Claims, 16 Drawing Sheets

Related U.S. Application Data a continuation-in-part of application No. 16/055,347, filed on Aug. 6, 2018, now Pat. No. 10,884,871.

(60) Provisional application No. 62/541,952, filed on Aug. 7, 2017.

(56) References Cited

U.S. PATENT DOCUMENTS

| | | | |
|---|---|---|---|
| 6,880,051 B2* | 4/2005 | Timpanaro-Perrotta | G06F 11/1448 707/999.202 |
| 8,924,352 B1* | 12/2014 | Andruss | G06F 11/1461 707/640 |
| 9,235,582 B1* | 1/2016 | Madiraju Varadaraju | G06F 11/1451 |
| 9,690,666 B1* | 6/2017 | Shembavnekar | G06F 11/1451 |
| 9,811,422 B2 | 11/2017 | Bushman | |
| 10,204,016 B1 | 2/2019 | Patwardhan | |
| 2005/0086443 A1* | 4/2005 | Mizuno | G06F 11/1451 711/162 |
| 2010/0100696 A1* | 4/2010 | Suzuki | G06F 3/0625 711/162 |
| 2011/0282841 A1* | 11/2011 | Saika | G06F 3/0608 707/649 |
| 2013/0226870 A1* | 8/2013 | Dash | G06F 3/0619 707/634 |
| 2016/0011790 A1 | 1/2016 | Rostoker | |
| 2017/0091047 A1* | 3/2017 | Bangalore | G06F 16/1734 |
| 2017/0293628 A1* | 10/2017 | Adler | G06F 11/1464 |
| 2018/0173596 A1 | 6/2018 | Petracca | |
| 2018/0239555 A1* | 8/2018 | Cao | G06F 3/0647 |

OTHER PUBLICATIONS

U.S. Appl. No. 16/285,189.
U.S. Appl. No. 16/391,205.
U.S. Appl. No. 16/391,243.
U.S. Appl. No. 16/424,469.
U.S. Appl. No. 16/442,514.
U.S. Appl. No. 16/559,598.
U.S. Appl. No. 16/661,881.
U.S. Appl. No. 16/661,934.
U.S. Appl. No. 16/661,936.
U.S. Appl. No. 16/837,992.
U.S. Appl. No. 16/837,997.
U.S. Appl. No. 62/541,952.

\* cited by examiner

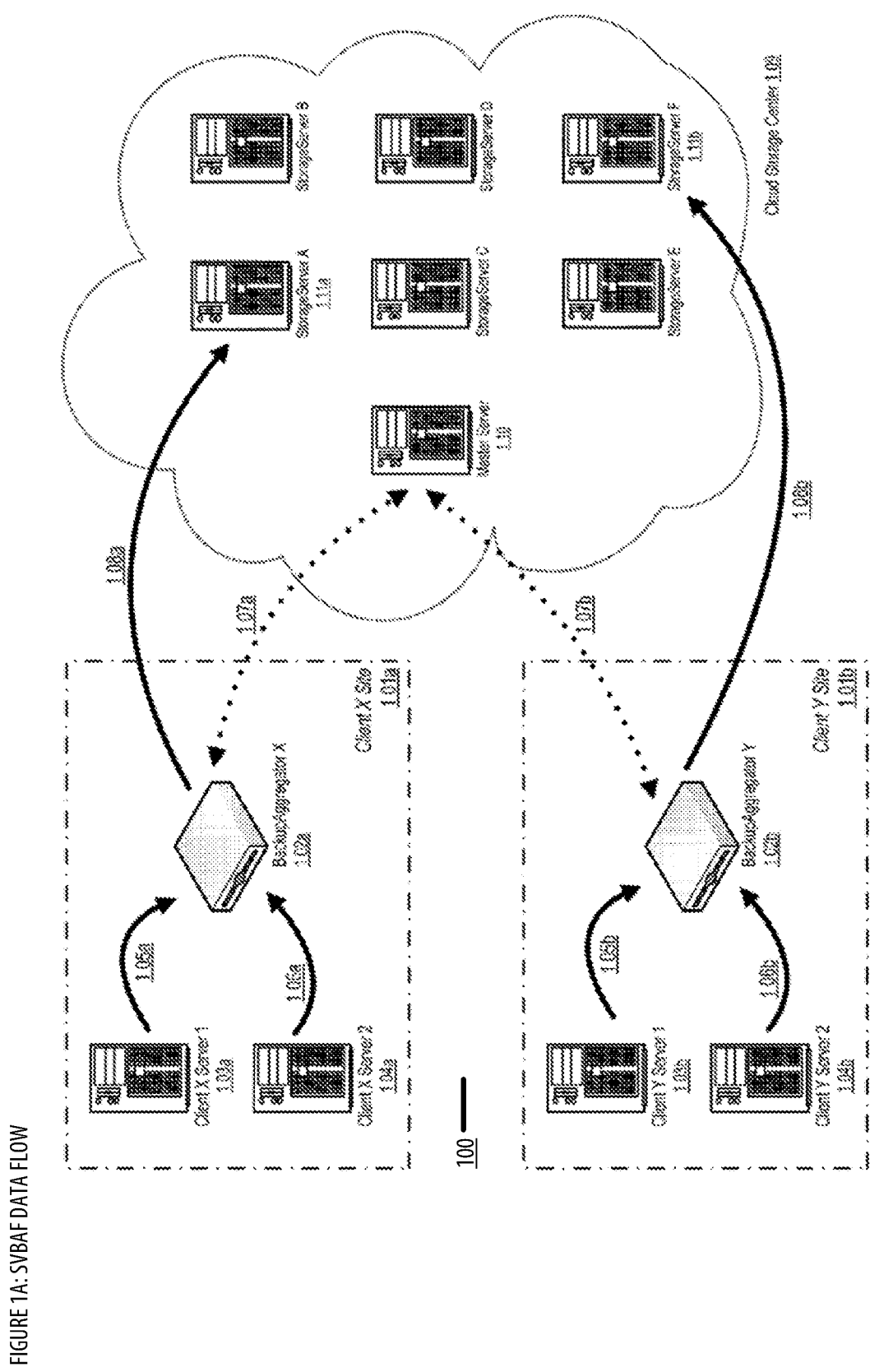
FIGURE 1A: SVBAF DATA FLOW

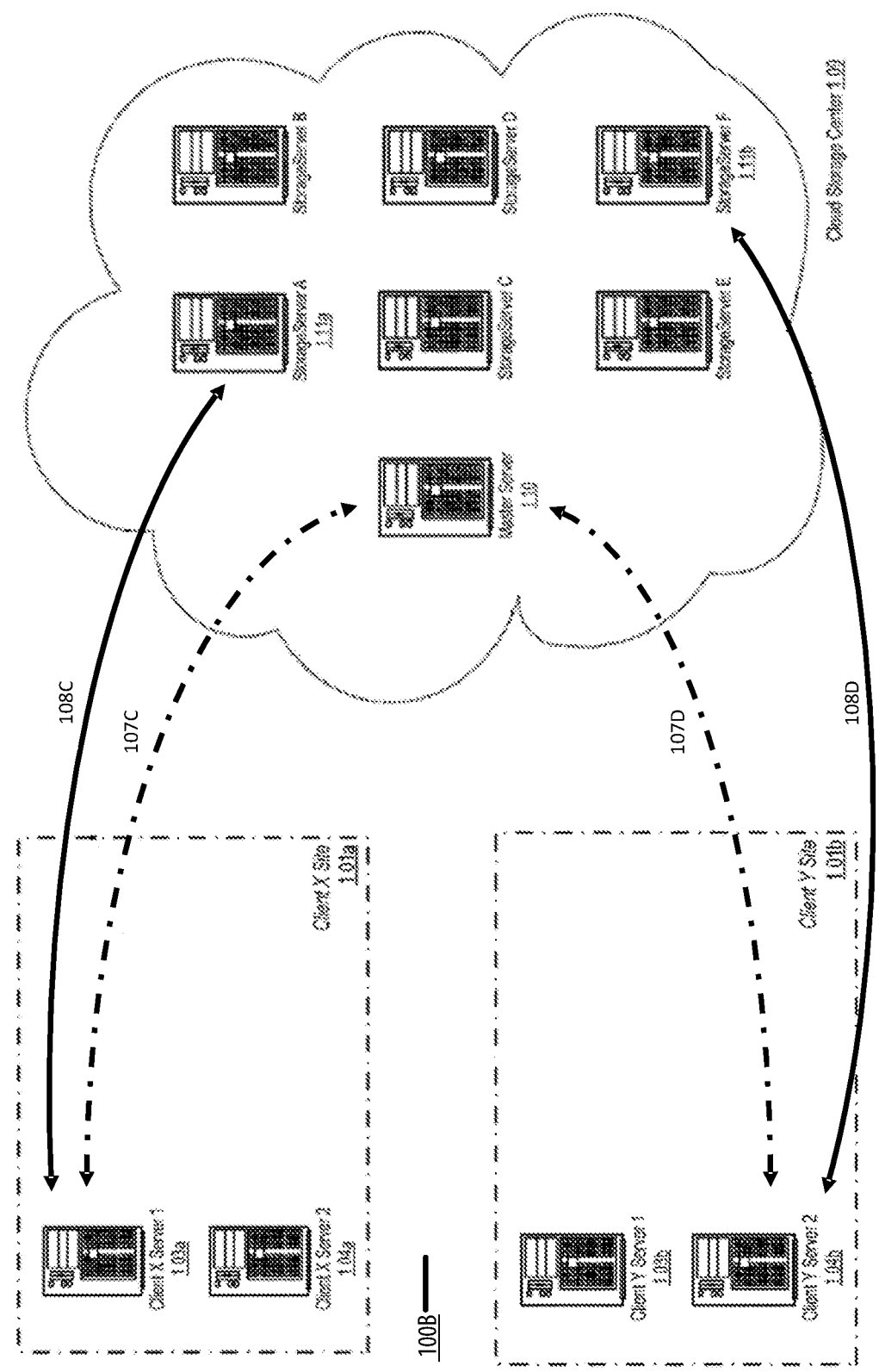
FIGURE 1B: SVBAF DATA FLOW

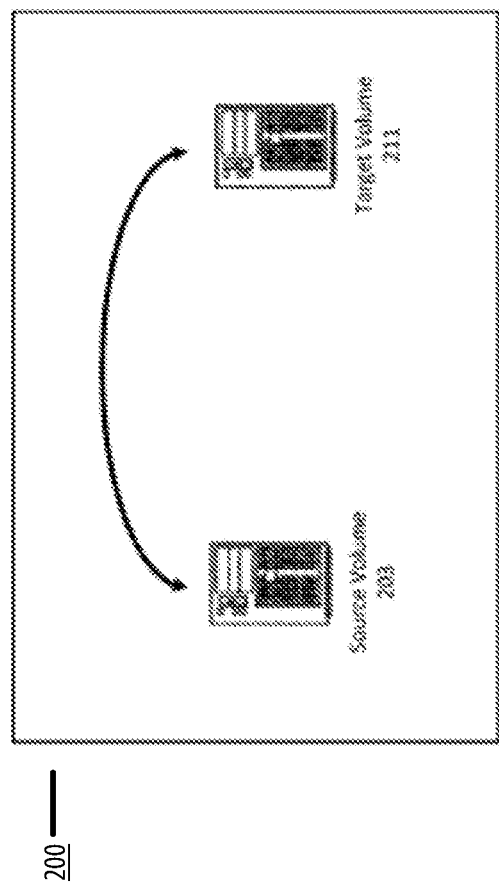
FIGURE 2: SVBAF BLOCK DIAGRAM

FIGURE 3: SVBAF BP COMPONENT
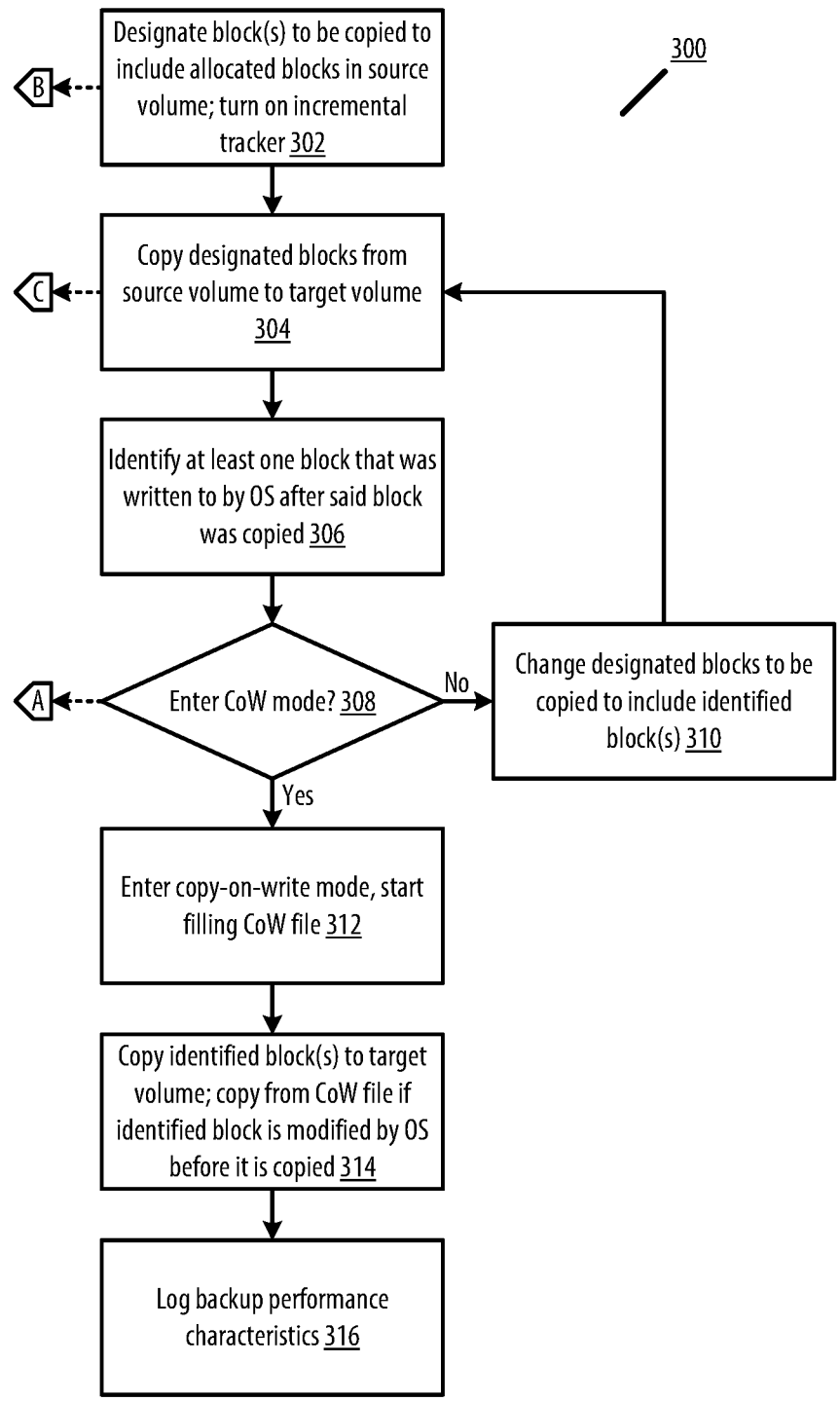

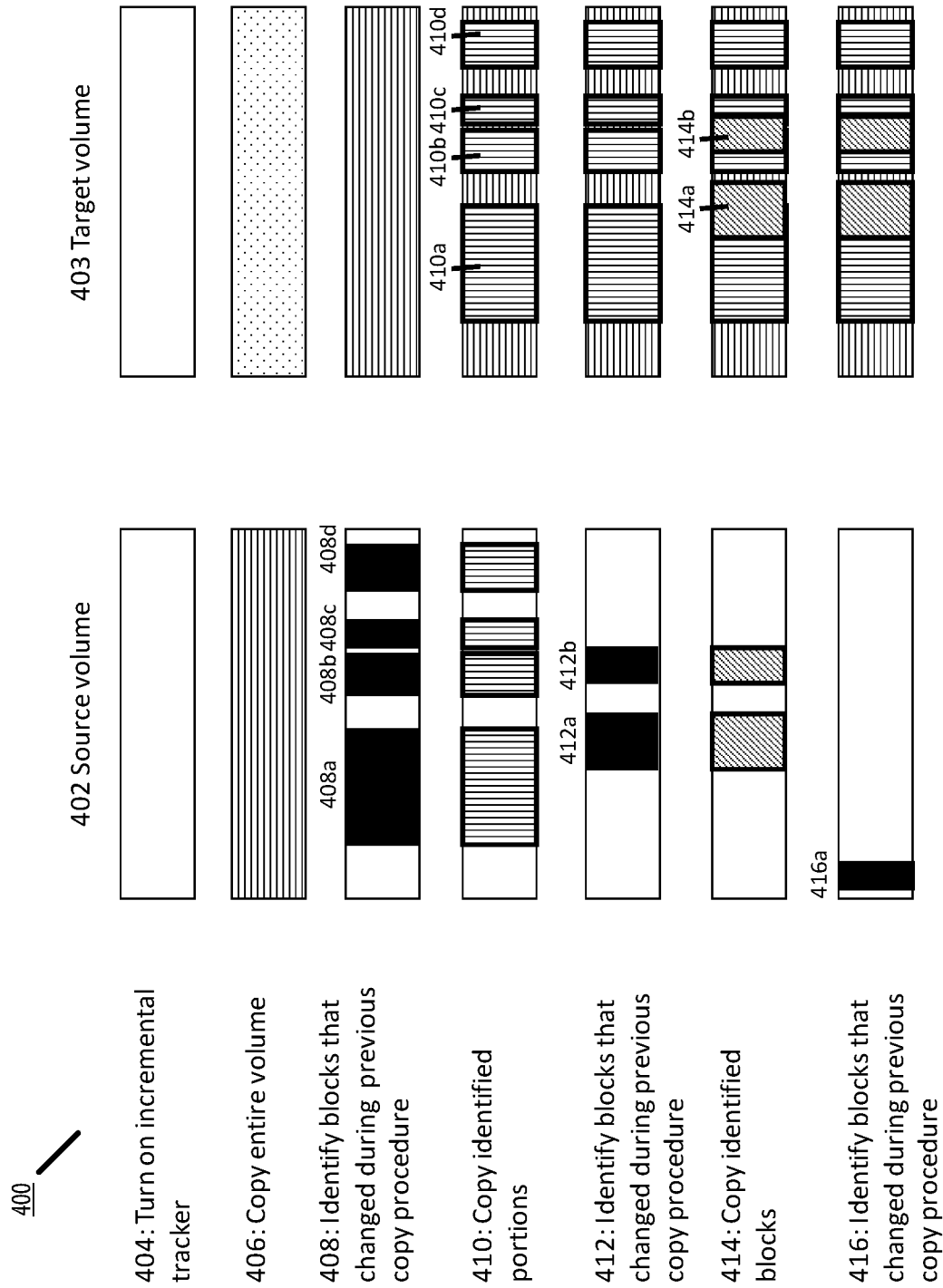

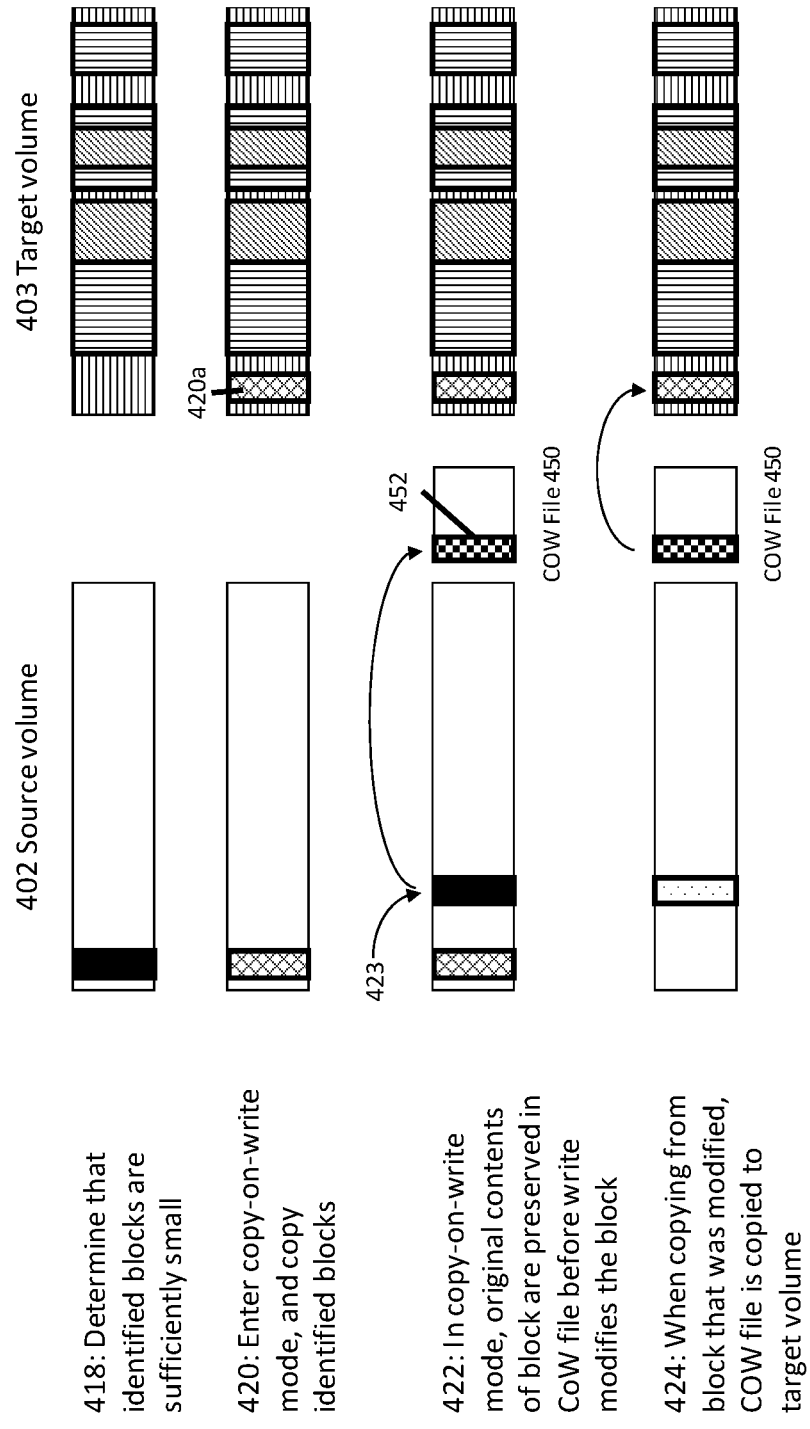

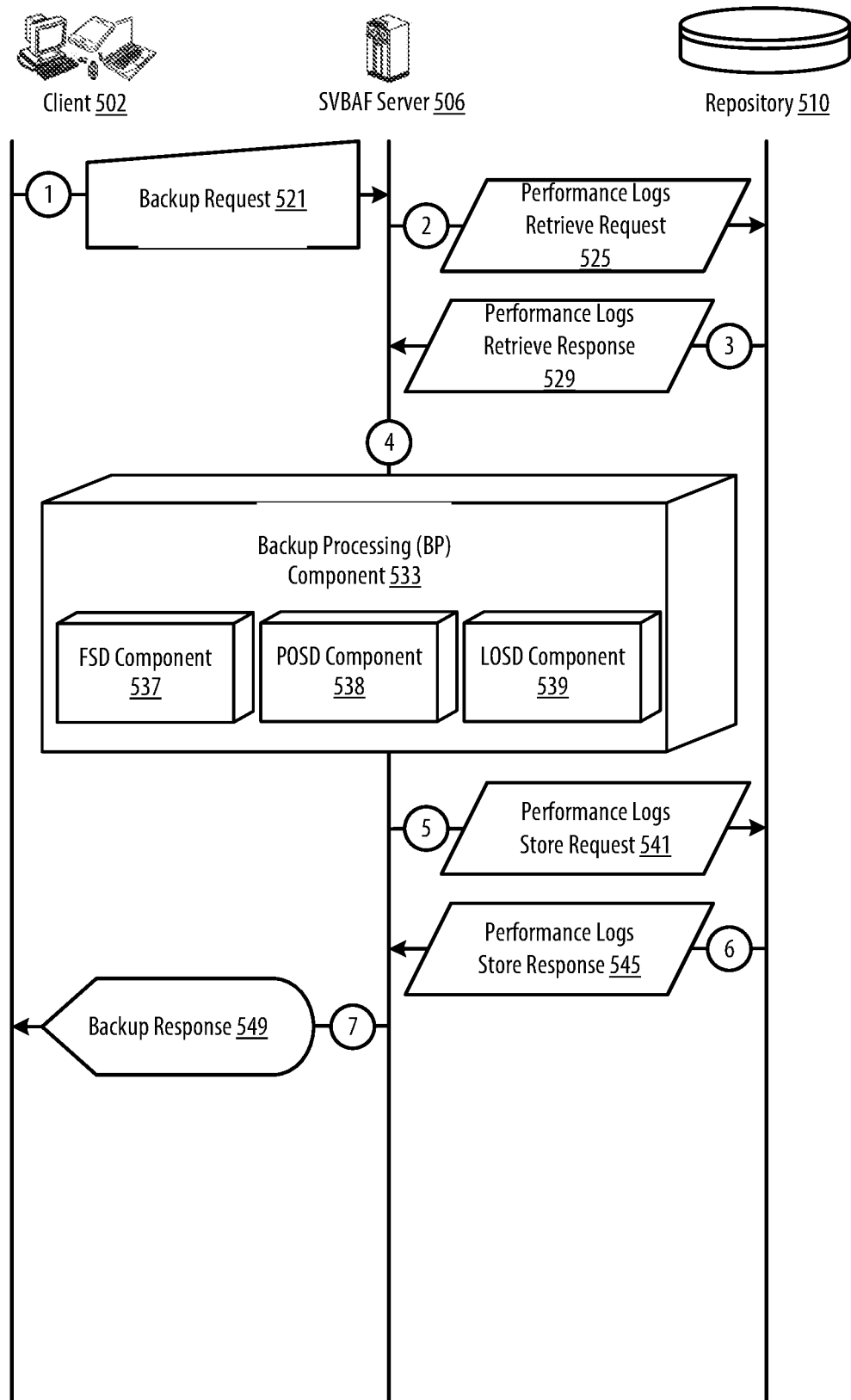

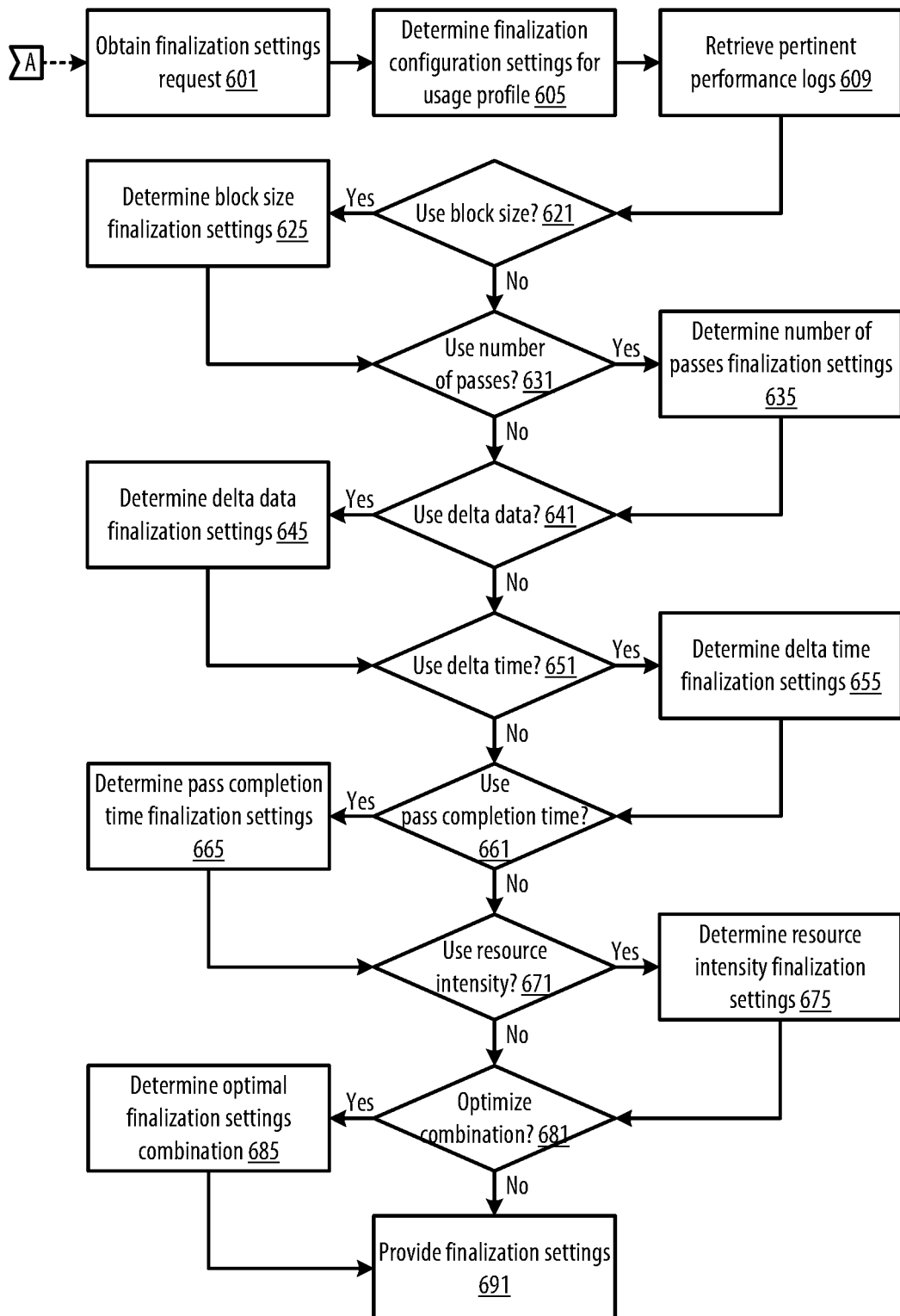

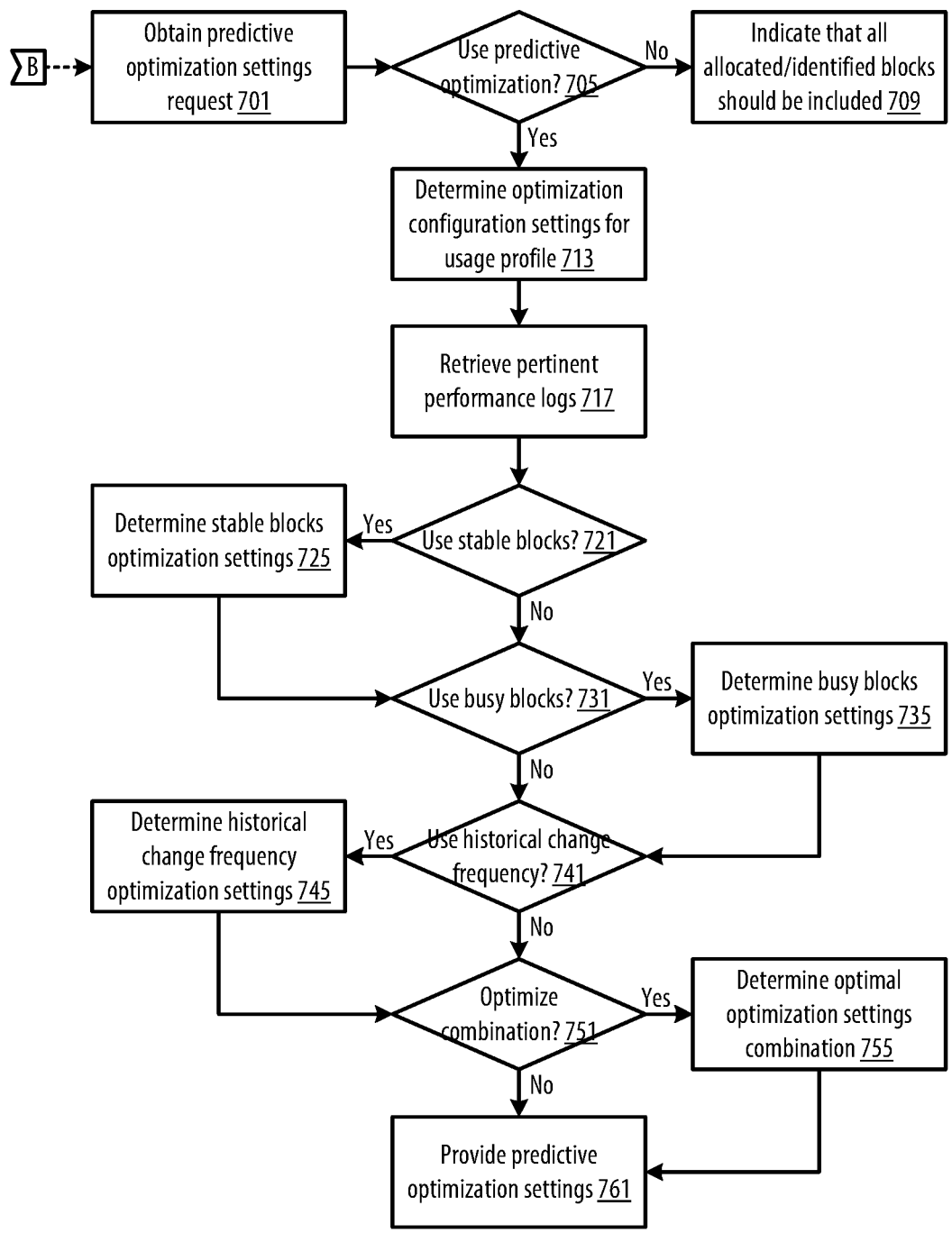
FIGURE 7: SVBAF POSD COMPONENT

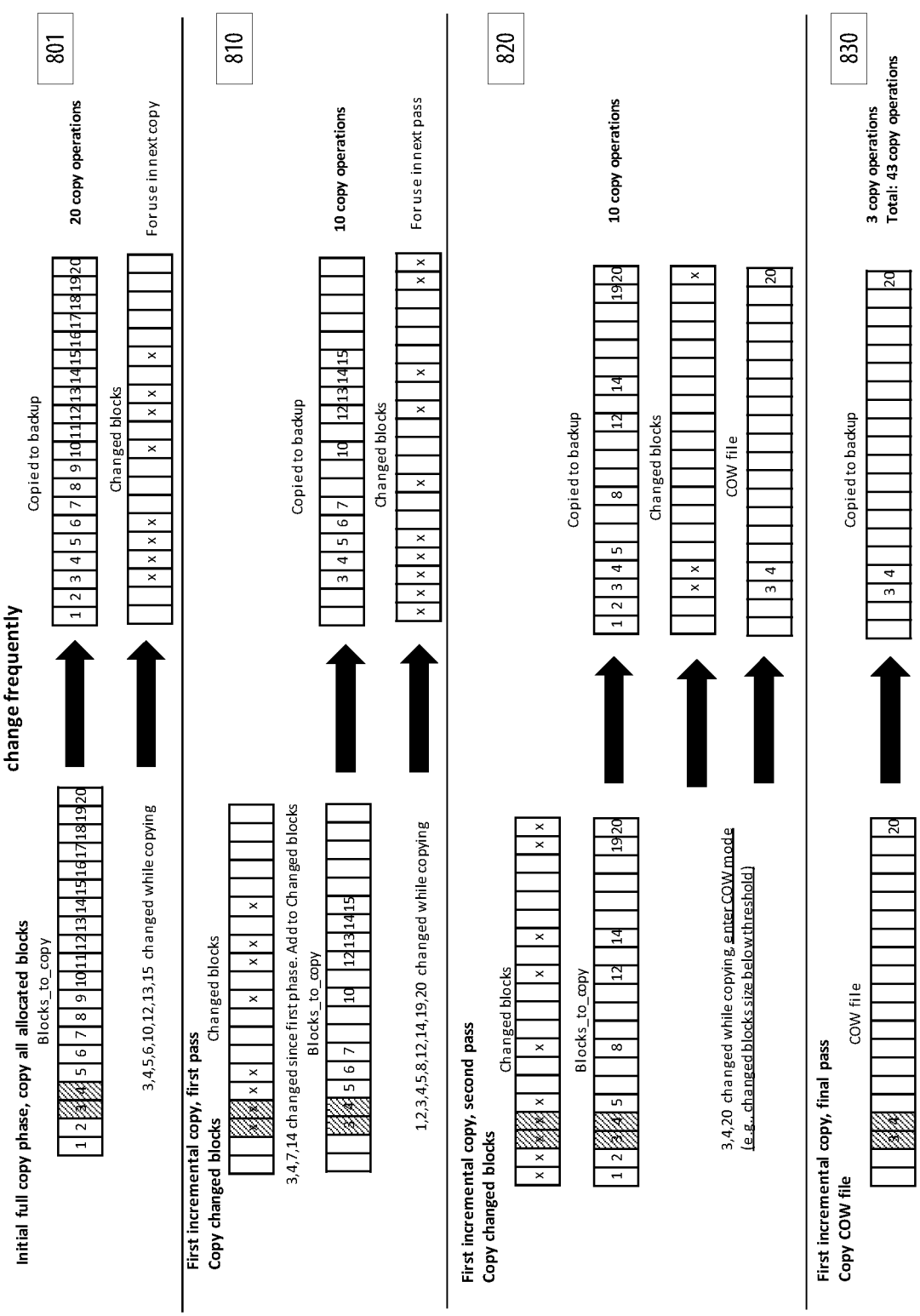
FIGURE 8A: SVBAF IMPLEMENTATION CASE

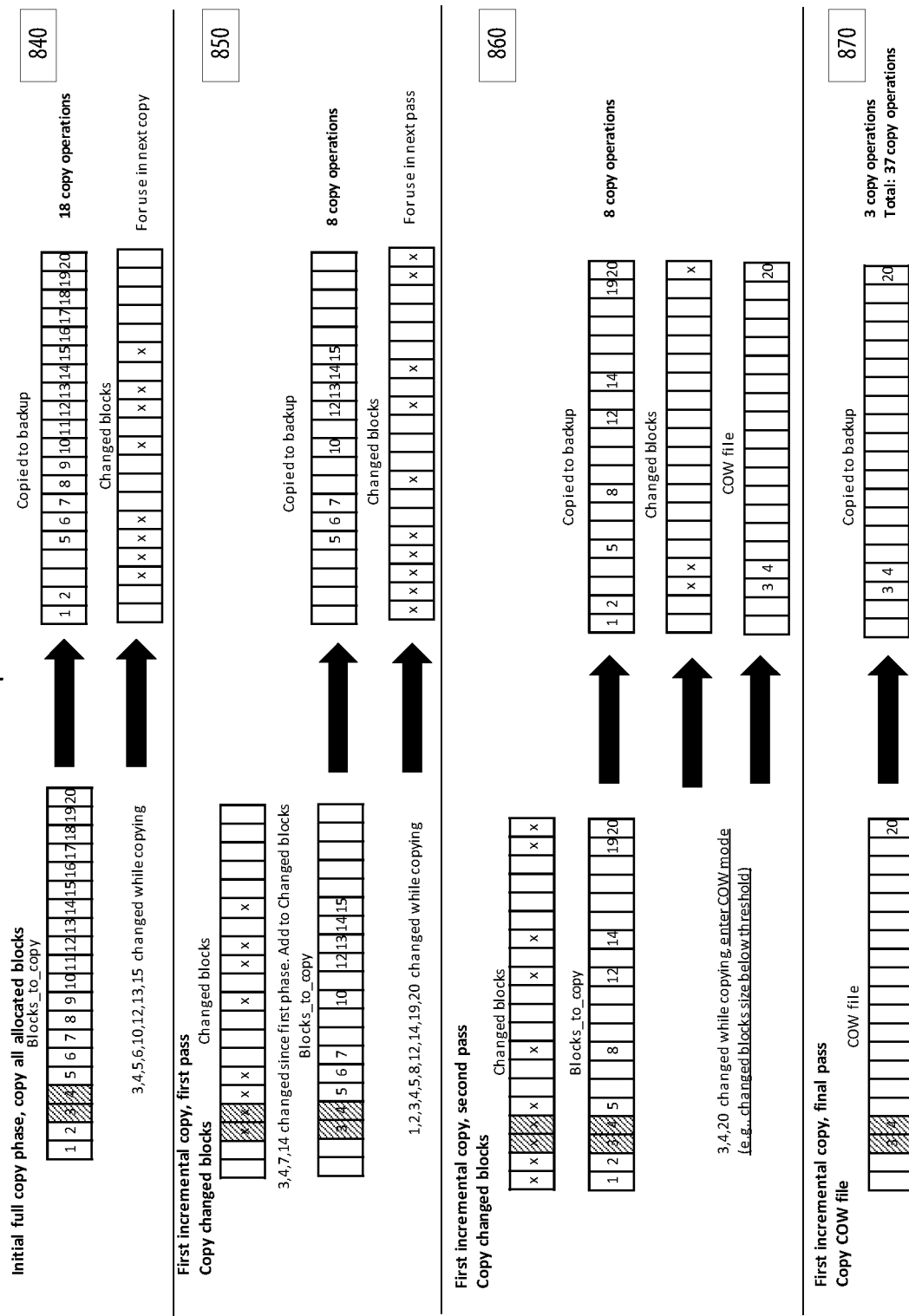
FIGURE 8B: SVBAF IMPLEMENTATION CASE

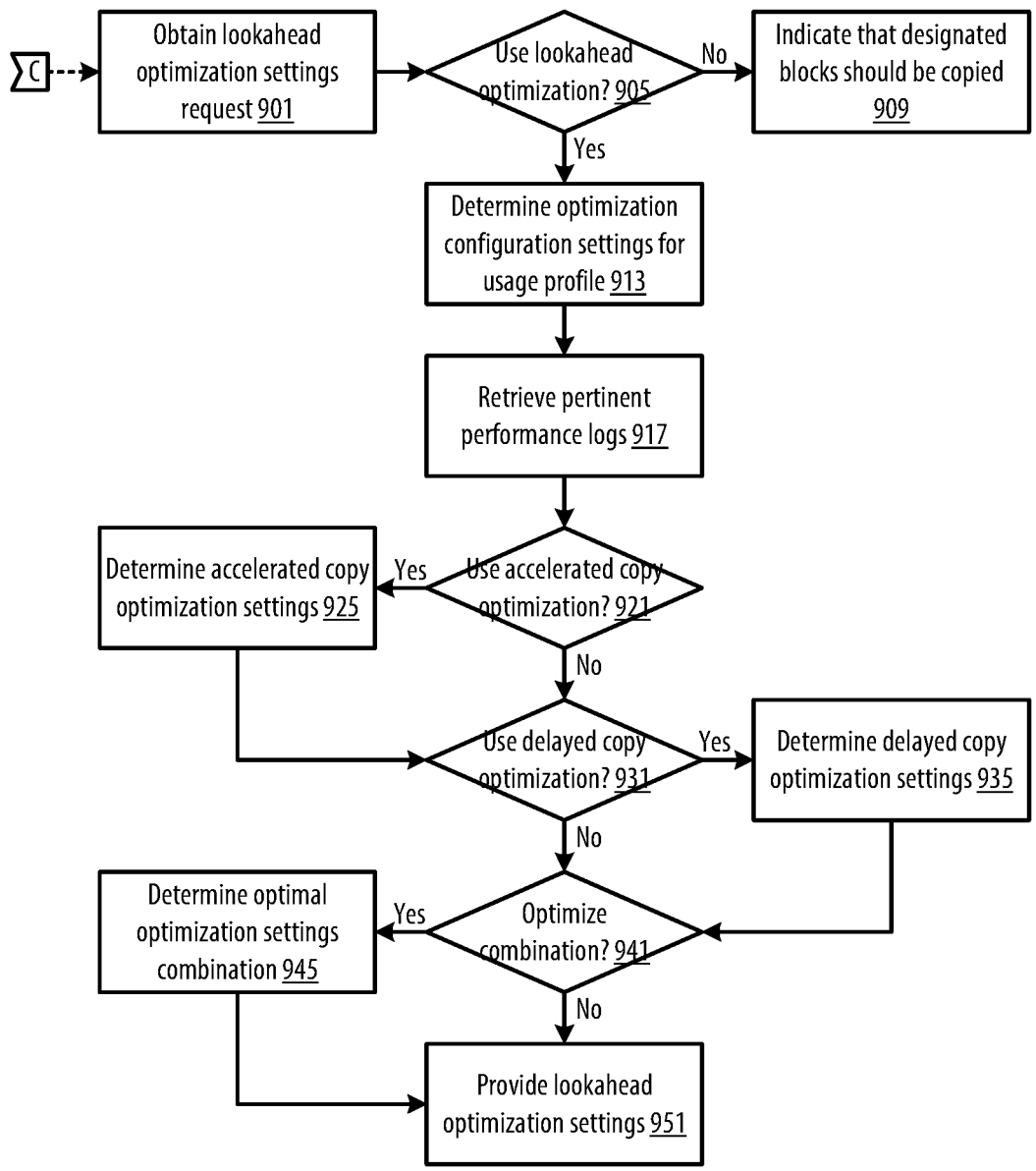
FIGURE 9: SVBAF LOSD COMPONENT

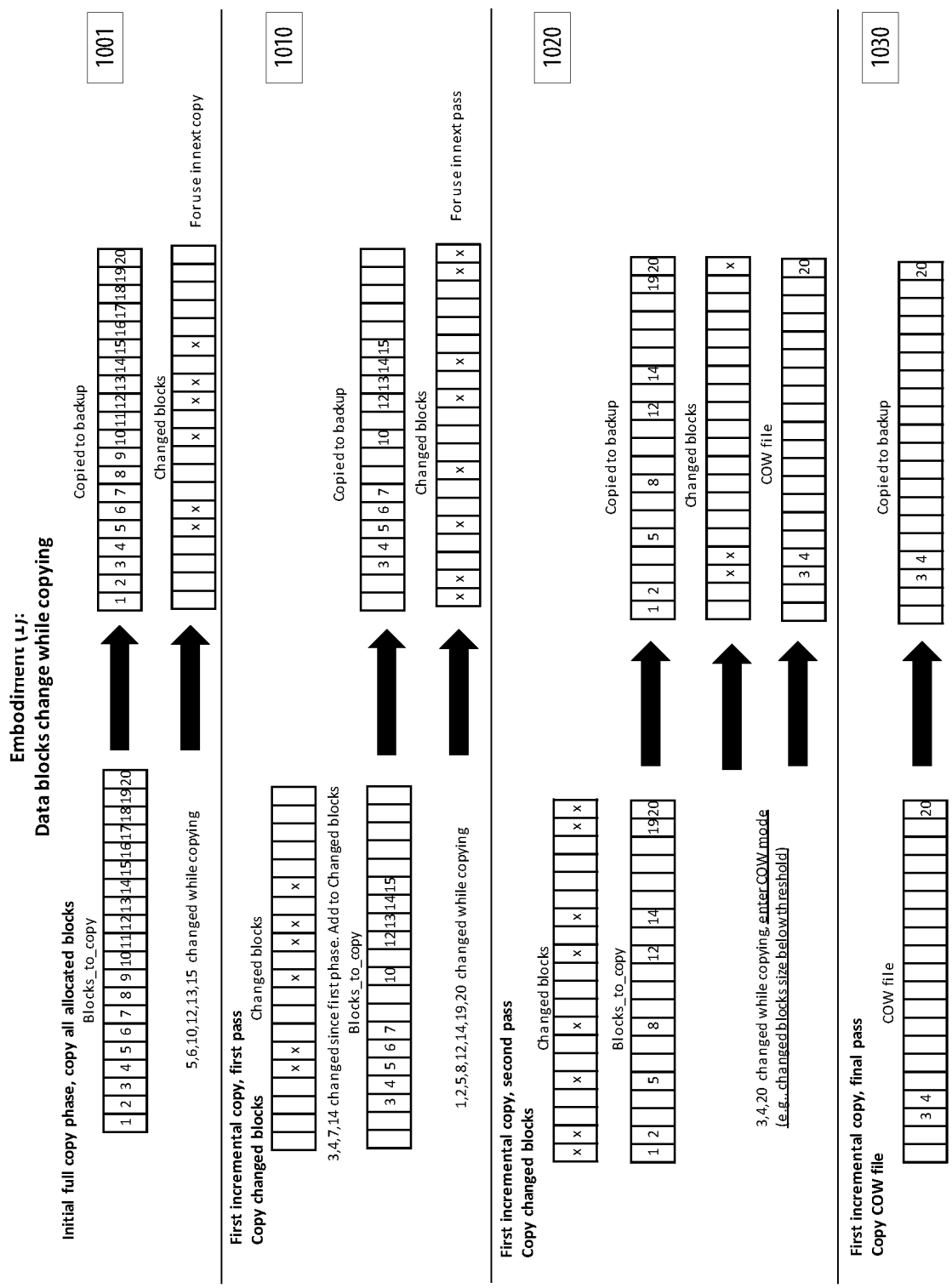
FIGURE 10A: SVBAF IMPLEMENTATION CASE

FIGURE 10B: SVBAF IMPLEMENTATION CASE
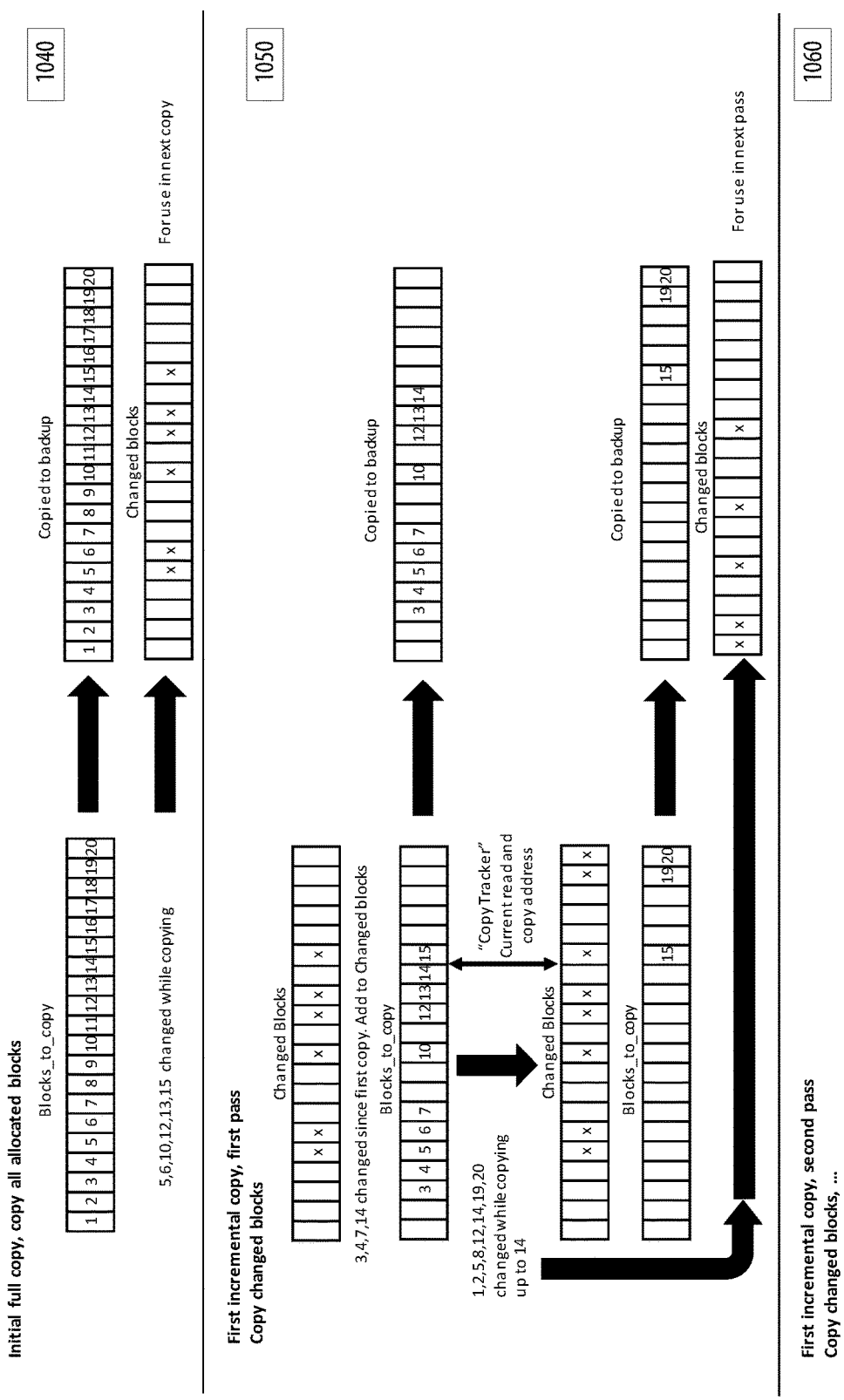

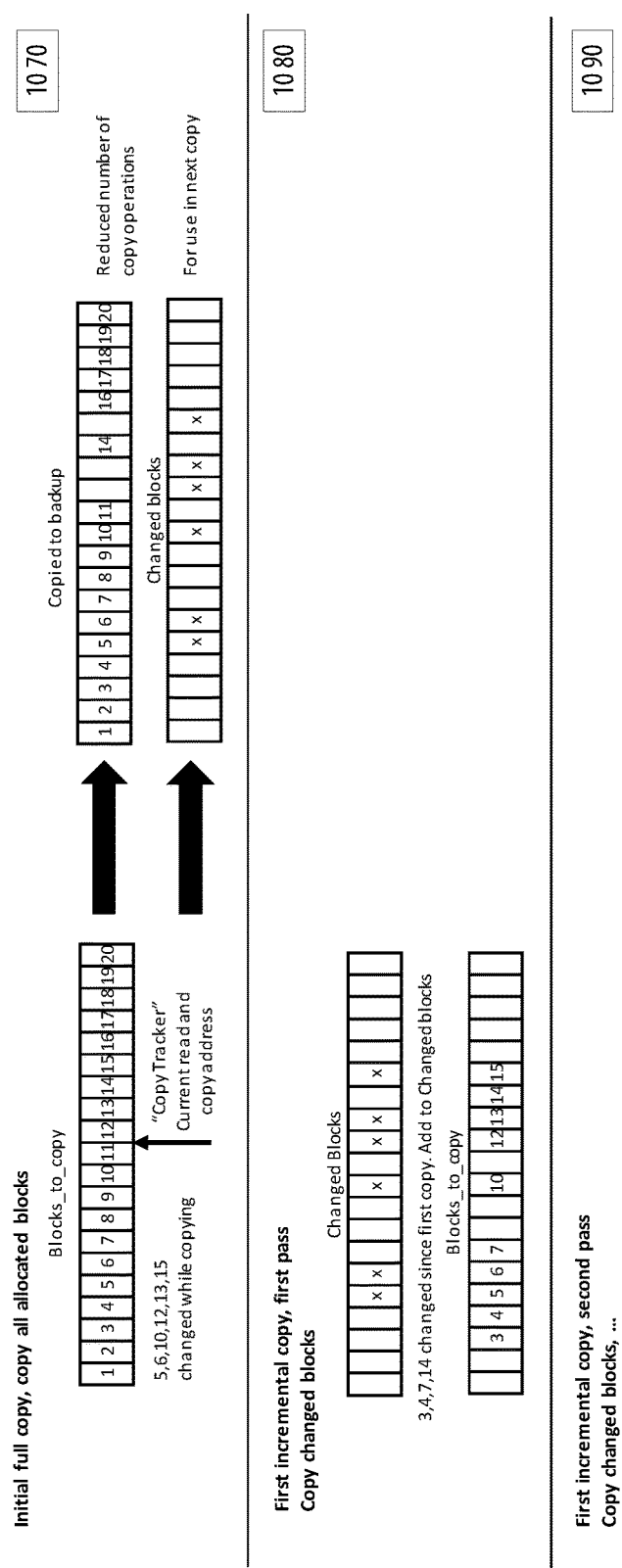
FIGURE 10 C: SVBAF IMPLEMENTATION CASE

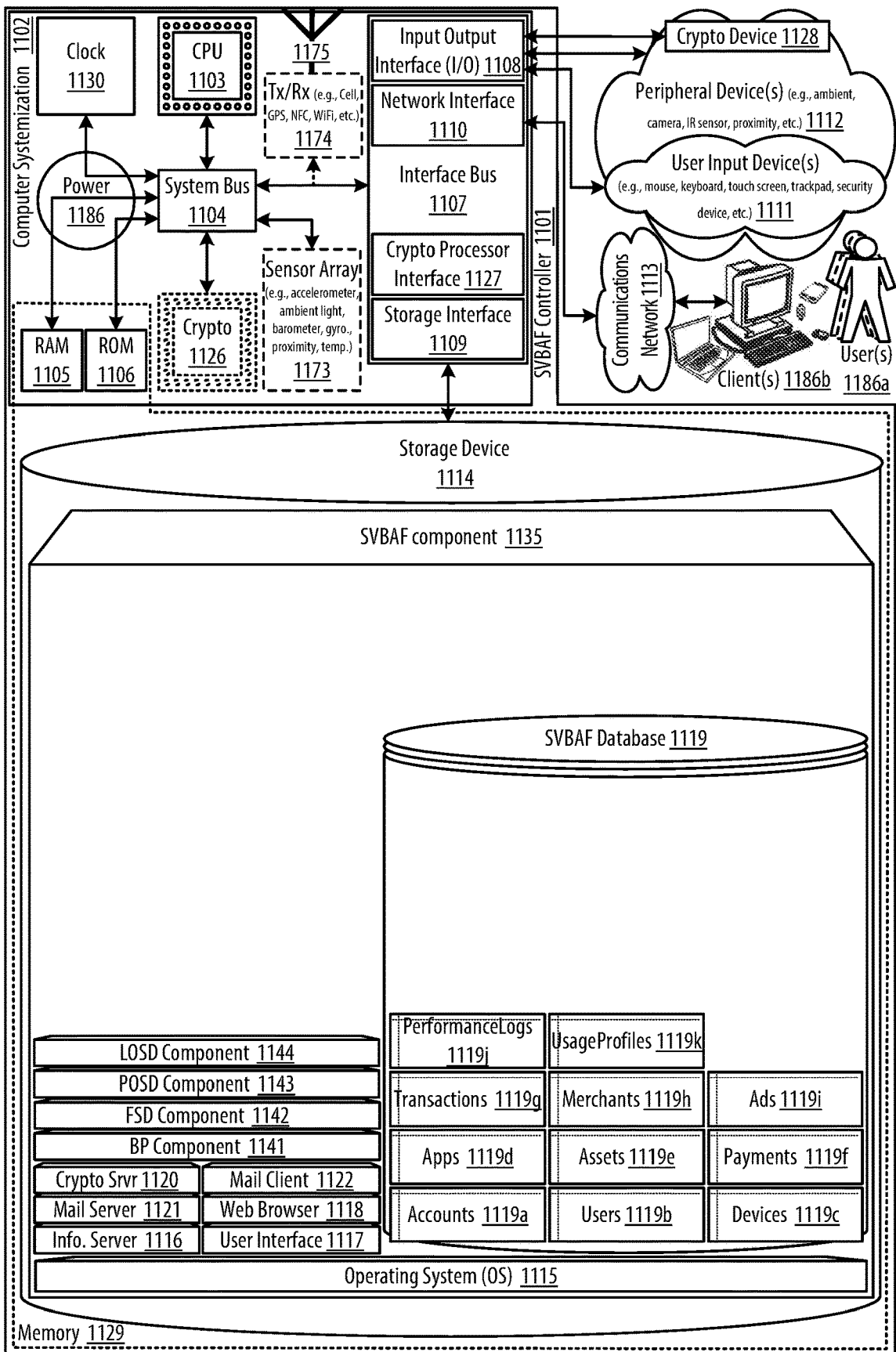
FIGURE 11: SVBAF Controller

SOURCE VOLUME BACKUP WITH PREDICTIVE AND LOOKAHEAD OPTIMIZATIONS APPARATUSES, METHODS AND SYSTEMS

PRIORITY CLAIM

Applicant hereby claims benefit to priority under 35 USC § 120 as a continuation-in-part of: U.S. patent application Ser. No. 16/391,205, filed Apr. 22, 2019, entitled "Source Volume Backup with Adaptive Finalization Apparatuses, Methods and Systems"; U.S. patent application Ser. No. 16/055,347, filed Aug. 6, 2018, entitled "SYSTEMS AND METHODS FOR COPYING AN OPERATING SOURCE VOLUME", and which in turn claims benefit to priority under 35 USC § 119 as a non-provisional conversion of U.S. provisional patent application Ser. No. 62/541,952, filed Aug. 7, 2017, entitled "SYSTEMS AND METHODS FOR COPYING AN OPERATING SOURCE VOLUME".

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address backup systems, and more particularly, include Source Volume Backup with Predictive and Lookahead Optimizations Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Computer system backups are utilized to protect data from being lost due to equipment failures, malware and accidental deletions. A backup may involve copying files to be backed up from one location to another location. For example, files may be copied from a solid-state drive in a user's desktop to an external hard drive that may be connected to the user's desktop via USB.

BRIEF DESCRIPTION OF THE DRAWINGS

Appendices and/or drawings illustrating various, non-limiting, example, innovative aspects of the Source Volume Backup with Predictive and Lookahead Optimizations Apparatuses, Methods and Systems (hereinafter "SVBAF") disclosure, include:

FIGS. 1A-B show block diagrams illustrating example aspects of backup networks, according to some embodiments for the SVBAF;

FIG. 2 shows a block diagram illustrating an exemplary embodiment of a backup system, according to some embodiments for the SVBAF;

FIG. 3 shows a logic flow illustrating embodiments of a backup processing (BP) component for the SVBAF;

FIGS. 4A-B show an exemplary process for copying a particular source volume to a target volume, according to some embodiments for the SVBAF;

FIG. 5 shows a datagraph illustrating data flow(s) for the SVBAF;

FIG. 6 shows a logic flow illustrating embodiments of a finalization settings determining (FSD) component for the SVBAF;

FIG. 7 shows a logic flow illustrating embodiments of a predictive optimization settings determining (POSD) component for the SVBAF;

FIGS. 8A-B show implementation cases for the SVBAF;

FIG. 9 shows a logic flow illustrating embodiments of a lookahead optimization settings determining (LOSD) component for the SVBAF;

FIGS. 10A-C show implementation cases for the SVBAF;

FIG. 11 shows a block diagram illustrating embodiments of a SVBAF controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Source Volume Backup with Predictive and Lookahead Optimizations Apparatuses, Methods and Systems (hereinafter "SVBAF") transforms backup request inputs, via SVBAF components (e.g., BP, FSD, etc. components), into backup response outputs. The SVBAF components, in various embodiments, implement advantageous features as set forth below.

Introduction

The SVBAF implements a way to backup data in an iterative way that reduces the size of the Copy-On-Write (CoW) file. A finalization method may be utilized to determine when to stop the iteration and enter CoW mode. Optimization methods (e.g., predictive optimization, lookahead optimization) may be utilized to improve efficiency by providing iteration and redundancy reduction. The SVBAF provides unconventional features (e.g., a finalization method that has advantages in terms of reduced COW file size, establishing a snapshot closer to the target point in time, reduction in resources (cpu, transmission), avoiding an extended or perpetual process when data is changing rapidly) that were never before available in backup systems.

Logical volumes can be written to by one or more operating systems. These logical volumes can also be copied for multiple purposes, such as for backup of critical data or applications, or to make the contents of the source logical volume available at another time or location.

One way to create a copy of a source logical volume that is crash-consistent is to suspend all writes to the source volume while the copying process is ongoing. This can be achieved by instructing an operating system managing the source logical volume to stop writing to the source volume while the source volume is being copied to a target volume. However, for large logical volumes, this can impose an undesirable burden on performance since the time required to copy the source volume may be lengthy. For instance, the copying procedure may take hours, during which the source volume may be unable to accept new write requests.

Another way to create a copy of a source logical volume that is crash consistent is to cause the operating system managing the source volume to enter a copy-on-write mode before the copying process starts, and to remain in the copy-on-write mode until the source volume is completely copied to the target volume. A source volume can be considered to comprise multiple "blocks" of storage, wherein each block stores a certain amount of data. When in copy-on-write mode, the operating system intercepts every write instruction to the source volume before the write occurs. The operating system then determines, for every write, whether the write would (if allowed to proceed) modify a block of the source volume that has not yet been copied to the target volume. If the to-be-modified block has already been copied to the target volume, the operating system can allow the write to proceed. If the to-be-modified block has not yet been copied, the operating system can copy the original, un-modified contents of the to-be-modified block to a "copy-on-write file" or "CoW file", thereby preserving the original state of the to-be-modified block. After the original contents of the to-be-modified block have been safely copied to the CoW file, the operating system can allow the write instruction to modify the block.

At a later time, when the process copying the source volume to the target volume attempts to copy the modified block, the copying process can be re-directed to copy from the portion of the CoW file that stores the original contents of the modified block. In this way, the copy of the source volume that is copied to the target volume remains crash consistent because it reflects the state of the source volume at the instant the operating system entered copy-on-write mode (i.e., at the beginning of the copy process). A copy of a source logical volume that is crash consistent is typically associated with a time designation, where the time designation refers to a time that the copy process commenced, at which time the copy is crash consistent.

However, causing the operating system to enter a copy-on-write mode can also impact the performance and responsiveness of the operating system and the source volume. Requiring the operating system to examine every write instruction to the source volume, and potentially copy blocks of the source volume to the CoW file, can tie up scarce computational resources needed for other operating system processes. Furthermore, copy-on-write mode can decrease the perceived speed with which the source volume responds to write instructions. If the copying process takes a long time, and if the operating system makes many writes to the source volume during the copying process, a large amount of storage may need to be reserved for the CoW file to store the large number of blocks that are modified. In some systems, this storage for the CoW file must be reserved in advance, even though the operating system cannot predict exactly how long the copying process will take, or how many writes will need to be made to the source volume during the copying process. If the storage reserved for the CoW file is too small to hold all the blocks that were modified during the copying process, the entire copying process may fail. In these cases, the copying process may need to be re-started from the beginning. If the storage reserved for the CoW file is too large, less memory storage space is available for other data and/or applications.

These problems are exacerbated when copying large amounts of data to remote sites via network connections, such as Internet communication to the cloud. Communication over the Internet can be a relatively slow process compared to processes such as computation, file edits, and local copying. Such communication lengthens the copying process leading to more time for growth of the CoW file and presents problems with data transmission interruptions. Accordingly, systems and methods for copying data and data volumes are needed to address the shortcomings of current approaches.

According to one aspect, the present disclosure is directed at systems and methods for copying an operating source volume. For example, these systems and methods may be used to take a "snapshot" of an operating source volume, wherein the snapshot preserves a crash-consistent state of the source volume. According to some embodiments, a crash-consistent state of the source volume can reflect a state of the source volume as it existed at a single point in time. A crash-consistent state can also refer to a state of data on a volume such that if a computer managing the volume were to lose power or crash and be rebooted, the data on the volume can be operated on by the computer's operating system without error or data corruption. In some embodiments, if data in a crash-consistent state is restored to a computer, the operating system should be able to operate on the data as if the operating system had been powered off and on again.

According to one aspect, the present disclosure is directed at a method for copying a source volume comprising multiple blocks to a target volume while an operating system is configured to write to the source volume. The method can comprise (a) designating a set of one or more blocks to be copied from the source volume to the target volume; (b) copying the designated set of one or more blocks from the source volume to the target volume while the operating system is configured to write to the source volume; (c) identifying blocks of the source volume that were written to by the operating system while the operating system was configured to write to the source volume during step (b); (d) if one or more blocks were identified in step (c), comparing an aggregate size of the identified one or more blocks to a threshold, wherein: (d)(i) if the aggregate size is greater than or equal to the threshold: changing the designated set of one or more blocks to be copied from the source volume to the target volume to include the identified one or more blocks, and repeating steps (b), (c), and (d); (d)(ii) if the aggregate size is below the threshold: causing the operating system to enter a copy-on-write mode, in which contents of a block of the source volume that is targeted by a write instruction from the operating system are preserved in a copy-on-write file before the write instruction modifies the contents of the targeted block, and bringing the target volume into a state consistent with a state of the source volume at the time the copy-on-write mode was entered.

In some embodiments, the method includes changing the designated set of one or more blocks to be copied from the source volume to the target volume in (d)(i) to include only the identified one or more blocks.

In some embodiments, the method can conclude if no blocks were identified in step (c).

In some embodiments, designating the set of one or more blocks to be copied from the source volume to the target volume in step (a) comprises designating at least one of (i) all allocated blocks in the source volume, and (ii) all blocks in the source volume.

In some embodiments, the operating system can refrain from entering the copy-on-write mode during steps (a), (b), (c), and (d)(i).

In some embodiments, the method can further comprise receiving, during step (b), an indication that the operating system has written to a block of the source volume; determining, during step (b), whether the written-to block has already been copied to the target volume; if the written-to block has already been copied to the target volume, adding an identifier corresponding to the written-to block to a list of modified blocks; and if the written-to block has not already been copied to the target volume, refraining from adding the identifier corresponding to the written-to block to the list of modified blocks, wherein step (c) comprises evaluating said list of modified blocks. In some embodiments, the evaluating said list of modified blocks includes identifying blocks that are to be copied. According to some embodiments, the blocks that are to be copied are from important files. These files may be identified based on a desired configuration. Important files may include but are not limited to files such as documents or system settings. Files that are not to be copied may include less important files, such as temp files, blocks that have been deleted, browser histories, or other files that a system operator may deem unimportant based on a desired configuration.

In some embodiments, the method can further comprise receiving, during step (b), an instruction from the operating system to write to a block of the source volume; and adding an identifier corresponding to the written-to block to a list of modified blocks, wherein step (c) comprises evaluating said list of modified blocks.

In some embodiments, the threshold can be determined based on a maximum number of blocks that may be transferred from the source volume to the target volume within a target maximum time.

In some embodiments, the threshold can be determined based on a pre-defined proportion of a total size of at least one of the source volume and the target volume.

In some embodiments, the aggregate size of the identified one or more blocks can be a numerical count of the identified one or more blocks, and the threshold comprises a number of blocks.

In some embodiments, step (d)(ii) can comprise copying the identified one or more blocks from the source volume to the target volume while the operating system is in the copy-on-write mode.

In some embodiments, the source volume can be a client device and the target volume can be a backup aggregator at a site local to the client device.

In some embodiments, the source volume can be a client device and the target volume can be a storage server at a cloud storage center remote from the client device.

In some embodiments the source volume can be an aggregator and the target volume can be a cloud storage center remote from the client device.

In some embodiments the source volume and target device are volumes contained within the same device, such as a client computer or other computing device.

In another aspect, the present disclosure is directed at a computer system for copying a source volume comprising multiple blocks to a target volume while an operating system is configured to write to the source volume. The system can comprise: the source volume; a communication interface communicably coupled to the target volume; and at least one processor configured to execute computer-readable instructions which, when executed, cause the at least one processor to: (a) designate a set of one or more blocks to be copied from the source volume to the target volume; (b) copy the designated set of one or more blocks from the source volume to the target volume while the operating system is configured to write to the source volume; (c) identify blocks of the source volume that were written to by the operating system while the operating system was configured to write to the source volume during step (b); (d) if one or more blocks were identified in step (c), comparing an aggregate size of the identified one or more blocks to a threshold, wherein: (d)(i) if the aggregate size is greater than or equal to the threshold: change the designated set of one or more blocks to be copied from the source volume to the target volume to include the identified one or more blocks, and repeating steps (b), (c), and (d); (d)(ii) if the aggregate size is below the threshold: cause the operating system to enter a copy-on-write mode, in which contents of a block of the source volume that is targeted by a write instruction from the operating system are preserved in a copy-on-write file before the write instruction modifies the contents of the targeted block, and bring the target volume into a state consistent with a state of the source volume at the time the copy-on-write mode was entered.

In some embodiments, the changed designated set of one or more blocks to be copied from the source volume to the target volume in (d)(i) includes only the identified one or more blocks.

In some embodiments, the at least one processor can be configured to designate the set of one or more blocks to be copied from the source volume to the target volume in step (a) by being configured to designate at least one of (i) all allocated blocks in the source volume, and (ii) all blocks in the source volume.

In some embodiments, the at least one processor can be configured to refrain from entering copy-on-write mode during steps (a), (b), (c), and (d)(i).

In some embodiments, the at least one processor can be further configured to: receive, when executing step (b), an indication that the operating system has written to a block of the source volume; determine, when executing step (b), whether the written-to block has already been copied to the target volume; if the written-to block has already been copied to the target volume, add an identifier corresponding to the written-to block to a list of modified blocks; and if the written-to block has not already been copied to the target volume, refraining from adding the identifier corresponding to the written-to block to the list of modified blocks, wherein step (c) comprises evaluating said list of modified blocks.

In some embodiments, the at least one processor can be further configured to: receive, when executing step (b), an instruction from the operating system to write to a block of the source volume; and add an identifier corresponding to the written-to block to a list of modified blocks, wherein step (c) comprises evaluating said list of modified blocks.

In some embodiments, the threshold used by the at least one processor can be determined based on a maximum number of blocks that may be transferred from the source volume to the target volume within a target maximum time.

In some embodiments, the threshold used by the at least one processor can be determined based on a pre-defined proportion of a total size of at least one of the source volume and the target volume.

In some embodiments, the aggregate size of the identified one or more blocks used by the at least one processor can be a numerical count of the identified one or more blocks, and the threshold can comprise a number of blocks.

In some embodiments, the at least one processor can be configured to execute step (d)(ii) by being configured to copy the identified one or more blocks from the source volume to the target volume while the operating system is in the copy-on-write mode.

In some embodiments, the source volume of the computer system can be a client device and the target volume can be a backup aggregator at a site local to the client device.

In some embodiments, the source volume of the computer system can be a client device and the target volume can be a storage server at a cloud storage center remote from the client device.

In another aspect, the present disclosure is directed at a method for copying a source volume comprising multiple blocks to a target volume, the method comprising: (a) designating a set of one or more blocks to be copied from the source volume to the target volume; (b) copying the designated set of one or more blocks from the source volume to the target volume while an operating system is configured to write to the source volume; (c) identifying blocks of the source volume that were written to by the operating system while the operating system was configured to write to the source volume during step (b); and (d) comparing an aggregate size of the identified one or more blocks to a threshold, wherein: (d)(i) if the aggregate size is greater than or equal to the threshold: changing the designated set of one or more blocks to be copied from the source volume to the target volume to include the identified one or more blocks, and repeating steps (b), (c), and (d).

In some embodiments, the method includes changing the designated set of one or more blocks to be copied from the source volume to the target volume in step (d)(i) to include only the identified one or more blocks.

In some embodiments, step (d) can further comprise: (d)(ii) if the aggregate size is below the threshold: causing the operating system to enter a copy-on-write mode, in which contents of a block of the source volume that is targeted by a write instruction from the operating system are preserved in a copy-on-write file before the write instruction modifies the contents of the targeted block, and bringing the target volume into a state consistent with a state of the source volume at the time the copy-on-write mode was entered.

In another aspect, the present disclosure is directed at a computer system for copying a source volume comprising multiple blocks to a target volume, the system comprising: the source volume; a communication interface communicably coupled to the target volume; and at least one processor configured to execute computer-readable instructions which, when executed, cause the at least one processor to: (a) designate a set of one or more blocks to be copied from the source volume to the target volume; (b) copy the designated set of one or more blocks from the source volume to the target volume while an operating system is configured to write to the source volume; (c) identify blocks of the source volume that were written to by the operating system while the operating system was configured to write to the source volume during step (b); and (d) comparing an aggregate size of the identified one or more blocks to a threshold, wherein: (d)(i) if the aggregate size is greater than or equal to the threshold: change the designated set of one or more blocks to be copied from the source volume to the target volume to include the identified one or more blocks, and repeating steps (b), (c), and (d).

In some embodiments, the at least one processor can be configured to execute step (d) by further being further configured to: (d)(ii) if the aggregate size is below the threshold: cause the operating system to enter a copy-on-write mode, in which contents of a block of the source volume that is targeted by a write instruction from the operating system are preserved in a copy-on-write file before the write instruction modifies the contents of the targeted block, and bring the target volume into a state consistent with a state of the source volume at the time the copy-on-write mode was entered.

SVBAF

According to one aspect, the disclosed systems and methods address the performance problems discussed above. In particular, in some embodiments, the disclosed systems and methods may allow a crash-consistent state of a source volume to be copied to a target volume even as an operating system is actively writing to the source volume. The disclosed systems and methods may also accomplish this while decreasing the amount of time the operating system spends in copy-on-write mode. Decreasing the amount of time spent in copy-on-write mode can, in turn, improve the performance of the operating system by making it more responsive to user commands. Furthermore, decreasing the amount of time spent in copy-on-write mode can reduce the amount of storage that must be reserved for a CoW file, thus freeing up additional storage resources for other data or applications. Decreasing the amount of storage required for a CoW file can also reduce the likelihood that a copy procedure fails because an insufficient amount of storage space was reserved for the CoW file at the beginning of the copy procedure. In some embodiments, the CoW file can be part of the source volume being copied. However, the CoW file does not have to be part of the source volume being copied, but can be a file stored outside of the source volume. The CoW file can also be stored on a separate part of a physical storage device (e.g., hard-drive) that holds all or part of the logical volume, or on an entirely separate physical storage device.

In some embodiments the CoW mode is not entered at the commencement of the copying process and is instead entered at a time later than the time that the copy process has commenced. Accordingly, crash consistent copy may be created with an associated time designation at a time the CoW mode is entered rather than at the commencement of the copying.

FIGS. 1A-B show block diagrams illustrating example aspects of backup networks, according to some embodiments for the SVBAF. FIG. 1A shows a block diagram illustrating example aspects of a backup network 100 that utilizes the disclosed systems and methods. In one embodiment, the backup network 100 may provide an image-based backup solution wherein a local device, e.g., a backup aggregator 102a, is responsible for and facilitates the aggregation of image-based backups from a plurality of client devices local to and/or in communication with the backup aggregator. For example, in one embodiment, a given client site, e.g., 101a, may have one or more backup aggregators in communication on a local area network, e.g., backup aggregator 102a. According to some embodiments, the devices may be in the same geographic site, campus. According to some embodiments, the client devices and backup aggregator are remote, for example, outside the local area network, geographic site, or campus. Client devices, which may be servers, workstations, laptops, and/or the like, e.g., 103a, 104a, may be in communication with backup aggregator 102a and periodically transfer (depicted as 105a, 106a) a representation of a block-level storage device to backup aggregator 102a. The backup aggregator may thereafter generate a snapshot of the received image backup file(s) according to a local backup schedule. The snapshot operation may be client device specific, such as for example a local backup snapshot policy that generates hourly backups for a mission-critical mail server while only generating daily snapshots of image backup files from a user's laptop. The backup network may also be configured such that the transfer of image-based backup files from client devices (such as servers, workstations, laptops, etc., described above) may differ from the local snapshot policy itself.

In one embodiment, backup aggregator 102a may maintain such a local backup policy while additionally maintaining a remote backup policy. The remote backup policy may be a backup policy maintained at the backup aggregator that determines how frequently the backup aggregator will synchronize certain image-based backup file snapshot data with remote cloud storage center 109. In one embodiment, backup aggregator 102a may coordinate the execution of its remote backup schedule (depicted as 107a) with a master server 110. The master server may receive from the backup aggregator an indicator of the backup aggregator's last known storage server pairing within the cloud storage center 109. A storage server, for example StorageServer A 111a, may be a server that is directly paired with the backup aggregator such that it is capable of receiving and applying to its own snapshot capable file system a received send file representing the file system differences between image-based file backups snapshotted at two different points in time.

In one embodiment, after coordinating with master server 110, a backup aggregator 102a may thereafter initiate a send file transfer operation (depicted as 108a), with its paired storage server 111a within the cloud storage center. In some embodiments, storage server 111a may itself have a paired or file system mirroring relationship with a second storage server. Such a backup network configuration may be useful in cases where the image-based backup snapshot history maintained on the backup aggregator would be advantageously stored on both the backup aggregator's paired server, e.g., 111a, and a secondary storage server located in a different geographical location. Such a configuration may enable recovery of cloud storage center stored image snapshot data even in scenarios where cloud storage center 109 is partially destroyed.

Furthermore, in one embodiment, the master server may direct the activity of multiple backup aggregators as well as manage or direct the pairing of backup aggregators with different storage server nodes within cloud storage center 109, e.g., StorageServer B, C, D, E, or F (StorageServer F 111b). It should be understood that the maintenance of the local or remote backup policy need not necessarily be performed by a backup aggregator device. For example, the master server or a storage server could instead maintain a backup policy associated with the backup aggregator. In such a configuration, the coordination of the backup aggregator with the master server may, for example, additionally comprise sending or receiving information about the currently active local or remote backup policy associated with the backup aggregator.

In some embodiments, each client device (e.g., 103a, 104a, 103b, 104b) can comprise a backup agent installed thereon to perform a backup or copying procedure. When the client device runs its backup agent, the backup agent may generate and send periodic backup files to a Backup Aggregator (e.g., Backup Aggregator X 102a). A periodic backup file may comprise an image-based backup. An image-based backup is a block-by-block copy of a portion of a hard-drive or logical volume. According to some embodiments, the image-based backup is of the allocated portion of a partially allocated hard-drive or logical volume or a portion thereof. According to some embodiments, the image-based backup is of portions of a hard-drive or logical volume that are selected by a user or system operator. According to other embodiments, the image-based backup may be of a full hard-drive or logical volume. A block refers to a specific physical area on a hard-drive, or a specific subset of a logical volume, which may contain data. In some embodiments, a block (sometimes called a physical record) can comprise a sequence of bytes or bits, having a specific length called the block size. Therefore, an image-based backup represents the contents of a source hard-drive or logical volume, exactly as this content was stored on the source hard-drive or logical volume at a single point in time. This data can include data associated with an operating system, and data stored in the system along with structural information and application configurations. The source used to create the image backup file need not actually be a physical hard drive and may, for example, be a virtual hard disk or even another image backup file. The embodiments described herein may be utilized on backup files that are based on a different formatting scheme but otherwise lend themselves to processing by the described embodiments of the backup network. Once generated, block-level image backup files may serve as the basis for restoring a hard drive or logical volume to a substantially similar state as present at the time of the backup, in particular, at the time of entering the CoW mode. Image backup files may contain additional data elements such as file system metadata that was present on the source hard drive or logical volume, master boot records, partition information and/or the like. This manner of backup may be distinguished from what may be thought of as a "file/directory level" backup which merely duplicates the contents and location of files and/or directories contained on a hard drive without necessarily including additional metadata, file system data, etc.

FIG. 1B shows a block diagram illustrating another exemplary embodiment of a backup network 100B that utilizes the disclosed systems and methods. In FIG. 1B, the backup network 100B may not include backup aggregators for some or all client sites (e.g., 101a, 101b). Instead, client devices (e.g., 103a, 104a, 103b, 104b) communicate directly with remote cloud storage center 109. In these embodiments, a backup agent installed on a client device (e.g., 103a) may communicate (e.g., 107C) with master server 110 in the cloud storage center 109 to coordinate the execution of its remote backup schedule. The master server may receive from the agent on the client device (e.g., 103a) an indicator of the client device's last known storage server pairing within the cloud storage center 109. For instance, the client device 103a may have been previously paired with StorageServer A 111a. After coordinating with master server 110, the backup agent on the client device 103a may thereafter initiate a send file transfer operation, e.g., 108C, with its paired storage server 111a within the cloud storage center. Similarly, the backup agent on client device 104b may coordinate (e.g., 107D) the execution of its remote backup schedule with master server 110. If the client device 104b is paired with storage server 111b, the client device 104b may initiate a send file transfer operation, e.g., 108D, with its paired storage server 111b. The backup network 100B of FIG. 1B differs mainly from the backup network 100 of FIG. 1A in that client devices may communicate and transfer image-based backup files directly with cloud storage center 109, without the aid of a backup aggregator local to the client site 101a, 101b.

FIG. 2 shows a block diagram illustrating an exemplary embodiment of a backup system, according to some embodiments for the SVBAF. In FIG. 2, the backup system 200 includes a source volume 203 and a target volume 211. The source volume 203 and the target volume 211 may be on the same device (for example, on the same client computer or computer device, such as two partitions of a single hard drive or on two different hard drives on the same device) or may be on different devices (for example two different server blades or two different servers in the same location or at different locations connected via a communications network).

The disclosed systems and methods for copying a crash-consistent state of a source volume to a target volume may be used in several places in the backup network 100 or 100B. For instance, the disclosed systems and methods may be used to copy data stored at a client device (e.g., 103a, 104a, 103b, 104b) to a backup aggregator (e.g., 102a, 102b) in backup network 100. Alternatively, or in addition, the disclosed systems and methods may be used to copy data stored at a client device (e.g., 103a, 104a, 103b, 104b) directly to a storage server (e.g., 111a, 111b) in the cloud storage center 109 in backup network 100B. The disclosed systems and methods may be particularly useful in the latter context because the time required to copy a source volume from a client device to a storage server in cloud storage center 109 may be longer than the time required to copy the same source volume to a backup aggregator local to the client device. If the time required to copy the source volume is longer, the disclosed systems and methods' ability to decrease the amount of time the client device's operating system stays in copy-on-write mode becomes particularly important. As discussed above, decreasing the amount of time the client device's operating system stays in copy-on-write mode can be desirable because this lessens the performance burden on the client device, and decreases the amount of storage that must be reserved in advance for a CoW file.

FIG. 3 shows a logic flow illustrating embodiments of a backup processing (BP) component for the SVBAF. FIG. 3 is a flowchart depicting an exemplary process 300 for copying a source volume to a target volume, according to some embodiments. As discussed above, the source volume may be managed by an operating system that continues to write to the source volume 302 during the copying process 300. There is no need to take the source volume offline while the copying process is ongoing. Process 300 may be used to copy a source volume at a client device (e.g., 103a, 104a, 103b, 104b) to a backup aggregator (e.g., 102a, 102b) in backup network 100. Alternatively, or in addition, process 300 may be used to copy a source volume at a client device (e.g., 103a, 104a, 103b, 104b) to a storage server (e.g., 111a, 111b) in cloud storage center 109.

In some embodiments, process 300 may maintain at least three separate data structures: (i) a list of blocks to be copied from the source volume to the target volume (designated Blocks_to_Copy in the discussion below), (ii) a list of blocks that were modified by an operating system (OS) (designated Changed_Blocks in the discussion below), and (iii) a copy-on-write file (designated CoW_File in the discussion below). If used, the purpose and operation of each data structure is explained in greater detail below. When process 300 first begins, each data structure Blocks_to_Copy, Changed_Blocks, and CoW_File can be initialized to a null value.

At step 302, process 300 designates blocks to be copied. In some embodiments, the designated blocks to copy can include all allocated blocks in the source volume. In embodiments that use the data structure Blocks_to_Copy, this can be done by updating Blocks_to_Copy to include a list that identifies all allocated blocks in the source volume. Allocated blocks in the source volume can include blocks that have been identified by a file system on the source volume as containing useful data—unallocated blocks can include blocks in the source volume that do not store useful data. In other embodiments, step 302 can also simply designate all blocks in source volume (whether allocated or not) to be copied—this can be done by updating Blocks_to_Copy to include all blocks in the source volume (again, whether allocated or not). In other embodiments, the designated blocks to be copied may not include all allocated blocks. A set of excluded blocks from particular files may not be copied. For instance, certain files may not be advantageous to a back-up and restore application. Examples of such files include, but are not limited to or required to include, page files, swap files, hibernation files, files within a temp directory, old versions of operating systems, files that have been deleted but are still recoverable. Other files may be excluded as well, depending on the back-up and restore application. Excluding blocks from these files in the copying process can reduce the time to copy and reduce the data storage requirement. In some embodiments, the designated blocks to copy may be adjusted based on predictive optimization settings. The designated blocks to copy may be adjusted so that initial passes copy primarily the data blocks that tend to be more stable, while later passes copy the data blocks that tend to change more rapidly. In one implementation, predictive optimization settings associated with a backup may be determined via a predictive optimization settings determining (POSD) component. See FIG. 7 for additional details regarding the POSD component. For example, the predictive optimization settings may specify that busy blocks that tend to change more rapidly (e.g., determined based on historical change frequency) should not be copied during the first two passes (e.g., by adding the busy blocks to a Blocks_to_Copy_Later data structure). In another example, the predictive optimization settings may specify that blocks that changed most recently (e.g., such blocks may be more likely to change again soon compared to blocks that haven't changed in a while) should not be copied during the first five passes.

At step 302, process 300 can cause the operating system to enter an incremental tracking mode. While in incremental tracking mode, the operating system can keep track of every write instruction that modifies a block of the source volume. In some embodiments, the incremental tracking mode can also keep track of the time at which each write instruction occurred, and/or the sequence in which the write instructions occurred. Unlike when the operating system is in copy-on-write mode, the incremental tracking mode does not attempt to copy to a CoW file the contents of blocks that are being written to. Instead, the incremental tracking mode keeps a running list of all blocks in the source volume that have been modified by write instructions since the tracker was turned on. Since the incremental tracking mode does not attempt to copy contents of blocks to a CoW file, the incremental tracking mode imposes a relatively small performance burden on the operating system managing the source volume.

At step 304, process 300 copies the designated blocks from the source volume to the target volume. In embodiments that use the data structure Blocks_to_Copy, this step can comprise copying each block in the source volume identified in Blocks_to_Copy to the target volume according to a predetermined sequence, until there are no more blocks left to copy in Blocks_to_Copy. In embodiments that use the data structure Blocks_to_Copy_Later, this may comprise skipping copying blocks in Blocks_to_Copy_Later. In some embodiments, blocks are identified by a block number, and one example of a predetermined sequence is a numerically ascending order by block number. The predetermined sequence can also be based on physical locations of blocks on a memory device. For example, in some embodiments, each block may correspond to a physical location on a spinning optical or magnetic disk, wherein blocks are numbered according to the order of their physical locations on the disk. Physical storage devices that use spinning disks generally perform best when blocks are read sequentially in increasing numerical block order. Therefore, in some embodiments, the predetermined sequence may be arranged such that sequential or adjacent ranges of blocks are read in order from the block with the smallest block number to the block with the largest block number. Other types of physical storage devices may use solid state memory (e.g., SSDs) that uses different channels to read/write data in parallel. For these types of physical storage devices, the predetermined sequence may be arranged such that blocks are read in an order that pulls data from separate channels so they can be read in parallel (e.g., for improved efficiency) or such that blocks are read according to a randomly determined sequence. Other types of sequences for reading blocks are also possible. In some embodiments, the designated blocks to copy may be adjusted based on lookahead optimization settings. The designated blocks to copy may be adjusted (e.g., periodically, after a predetermined period of time) so that copying of changed blocks forward of the current copy position is accelerated and/or delayed to reduce the number of passes and/or to avoid redundant copying. In one implementation, lookahead optimization settings associated with a backup may be determined via a lookahead optimization settings determining (LOSD) component. See FIG. 9 for additional details regarding the LOSD component. For example, the lookahead optimization settings may specify that accelerated copy optimization should be utilized to add data blocks that changed forward of the current copy position and that had not been marked as changed blocks at the start of a current pass to the designated blocks to copy. In another example, the lookahead optimization settings may specify that delayed copy optimization should be utilized to skip copying data blocks that changed forward of the current copy position and that had been marked as changed blocks at the start of a current pass. Depending on the size of the source volume 302 and the available bandwidth between the source volume and the target volume, step 304 may take a considerable amount of time to complete (e.g., multiple minutes, hours, or even days). After all designated blocks have been copied from the source volume to the target volume, process 300 proceeds to step 306.

At step 306, process 300 identifies at least one block in the source volume that was written to by an operating system after said block was copied to the target volume. This can be done by evaluating records, logs, or data generated and/or modified by the operating system while in incremental tracking mode. For example, during execution of step 304, the incremental tracking mode could have determined whether each write by the operating system to the source volume is to a block of the source volume that has already been copied to the target volume, or has not been copied to the target volume. If the write is to a block of the source volume that has already been copied, the process 300 (while in incremental tracking mode) could add an identifier corresponding to the block of the source volume that was written to by the operating system to a running list of modified blocks. In some simpler embodiments, the incremental tracking mode could forego checking whether a written-to block has been copied to the target volume yet—instead, the mode could simply list all blocks that were written-to during execution of step 304. At step 306, the process of identifying blocks that were written to after said block was copied to the target volume may comprise evaluating the running list of modified blocks maintained by the process 300 while in incremental tracking mode. In embodiments that use the data structure Changed_Blocks, step 306 can comprise updating Changed_Blocks to include a list of each block that was changed after said each block was copied to the target volume. Said another way, Changed_Blocks can be updated to identify each block in the source volume whose corresponding copy in the target volume is now outdated.

In some cases, no blocks may be identified in step 306. This may be because no blocks were written to by the operating system during step 304. Or, alternatively, this may be because some blocks were written to by the operating system during step 304, but all such blocks were modified before they were copied to the target volume (e.g., the target volume already includes the most up-to-date version of the modified blocks). In these cases, process 300 may end at step 306 without proceeding to step 308.

At step 308, process 300 determines whether to enter the CoW mode. In one embodiment, the CoW mode should be entered if finalization settings have been satisfied. In one implementation, finalization settings associated with a backup may be determined via a finalization settings determining (FSD) component. See FIG. 6 for additional details regarding the FSD component. For example, the finalization settings may specify that the CoW mode should be entered if the block size metric has been satisfied (e.g., the aggregate size of all the blocks identified in step 306 is less than a threshold). The threshold may be a fixed aggregate size (e.g., expressed in units of storage such as megabytes, gigabytes, or terabytes), or may be a dynamic size calculated based on an available bandwidth between source volume and target volume, or the size of the source volume or target volume. For instance, the threshold may be calculated by determining the maximum amount of data that may be transferred from the source volume to the target volume within a pre-defined target maximum time, given the available bandwidth between the two computers hosting the two volumes, or it may be calculated based on a pre-defined proportion of the total size of at least one of the source volume or target volume. Alternatively, instead of comparing the aggregate size of the identified blocks against a size threshold, the number of identified blocks may be compared against a numerical threshold (e.g., 500 blocks). If the CoW mode should not be entered (e.g., the number and/or aggregate size of all the blocks identified in step 306 is greater than or equal to the threshold), process 300 branches to step 310. If the CoW mode should be entered (e.g., the aggregate size is less than the threshold), process 300 branches to step 312.

If process 300 branches to step 310, the aggregate size of all the changed blocks that were identified in step 306 may still be relatively large. Process 300 may then change the designated blocks to be copied to be the blocks identified in step 306. In embodiments that use the data structures Blocks_to_Copy and Changed_Blocks, this step can comprise updating Blocks_to_Copy so that it lists the same data blocks as the Changed_Blocks. In some embodiments, the designated blocks to copy may be adjusted based on the predictive optimization settings. For example, if the predictive optimization settings specify that the busy blocks should not be copied during the first two passes, the busy blocks may be removed from the Blocks_to_Copy_Later data structure and added to the Blocks_to_Copy data structure after the first two passes. Process 300 then branches back to step 304.

When process 300 loops back to step 304, process 300 once again copies the designated blocks from the source volume to the target volume, except this time the blocks that changed during the last copy procedure and/or the blocks that were designated to be copied later are copied. According to some embodiments, only the blocks that changed during the last copy procedure and/or the blocks that were designated to be copied later are copied. As discussed above, this can comprise copying each data block listed in Blocks_to_Copy to the target volume. In some embodiments, when process 300 loops back to step 304, process 300 once again copies the designated blocks from the source volume to the target volume, except this time only the blocks that changed during the last copy procedure and/or the blocks that were designated to be copied later are copied. In copying only the blocks that changed during the last copy procedure (e.g., only the blocks that are identified by Changed_Blocks and Blocks_to_Copy) and/or the blocks that were designated to be copied later, other blocks that were previously copied to the target volume are not disturbed. Instead, those blocks in the target volume that are known to be outdated are updated to reflect these blocks' new contents. In some embodiments, the designated blocks to copy may be adjusted based on lookahead optimization settings.

After completing step 304, process 300 again branches to step 306, where process 300 once again identifies blocks that were changed during the last copy procedure (e.g., the second time through step 304). In embodiments that use the data structure Changed_Blocks, this can comprise updating Changed_Blocks to include only those data blocks that changed during the last copy procedure (e.g., the second time through step 304). After completing step 306, process 300 once again branches to step 308.

If the rate at which data is being copied from the source volume to the target volume exceeds the rate at which data is being changed in the source volume by the operating system, the number and/or aggregate size of the blocks that are identified in step 306 should generally decrease each time process 300 loops through steps 304, 306, 308, and 310. With each loop, process 300 checks at step 308 whether the CoW mode should be entered (e.g., whether the aggregate size of the blocks identified in step 306 (e.g., the aggregate size of the blocks listed in Changed_Blocks) is less than the aforementioned threshold). If not, process 300 loops through steps 310, 304 and 306 again. If yes, process 300 exits the loop and branches to step 312.

During steps 302, 304, 306, 308 and 310, the operating system writing to the source volume does not operate in copy-on-write mode. However, at step 312, process 300 enters copy-on-write mode. As discussed above, in copy-on-write mode, the operating system intercepts every write instruction to the source volume before the write occurs. The operating system determines, for every write, whether the write will modify a block of the source volume that has not yet been copied to the target volume. If the to-be-modified block has already been copied to the target volume, the operating system can allow the write to proceed. If the to-be-modified block has not yet been copied, the operating system can copy the original contents of the to-be-modified block to a "copy-on-write file" or CoW_File, thereby preserving the original contents of the block before it is modified by the write. The CoW_File is generally not part of the source volume being copied, but is a file stored outside of the source volume. As discussed above, the CoW_File can be stored on a separate part of a physical storage device (e.g., hard-drive) that holds all or part of the source volume, or on an entirely separate physical storage device. After the original contents of the to-be-modified block have been safely copied to the CoW_File, the operating system can allow the write instruction to modify the block.

At step 314, process 300 copies the identified blocks (e.g., blocks identified the last time through step 306, or the blocks listed in Changed_Blocks and/or the blocks that were designated to be copied later) to the target volume. As process 300 copies each identified block in turn, process 300 determines whether each identified block was modified by the operating system since the operating system entered copy-on-write mode. If not, process 300 copies the identified block from the source volume to the target volume. If yes, process 300 copies the original version of the identified block, as preserved in the CoW_File, to the target volume. A time associated with the time at which the operating system entered the copy-on-write mode can be used as a designation for the time at which the copy is crash consistent. For example, the time designation of the copy can be the hour, minute, second the CoW mode was entered, stated to a desired time resolution. According to some embodiments, some function of that entry time could be used for the designation. Such functions include but are not limited to the time of the last write event before the CoW process commenced, a fixed time before CoW commenced.

By the end of step 314, the target volume contains a crash-consistent copy of the source volume. The copy in the target volume reflects the state of the source volume at the time when process 300 entered copy-on-write mode in step 312, and not the state of the source volume at the time when process 300 began in step 302. By delaying the time at which the operating system enters copy-on-write mode, process 300 improves the performance of the computer systems in backup networks 100, 100B in several ways. First, process 300 decreases the amount of time that the operating system writing to the source volume (e.g., the operating system of client devices 103a, 104a, 103b, 104b) has to stay in copy-on-write mode. By decreasing the amount of time spent in copy-on-write mode, process 300 decreases the number of CoW-related writes to a CoW file that the operating system needs to perform, thereby decreasing the performance burden on the operating system. Second, by decreasing the amount of time spent in copy-on-write mode, process 300 decreases the amount of storage that must be reserved for a CoW file. This frees up processing and storage resources for other applications, thereby allowing client devices to perform faster and more efficiently.

At 316, backup performance characteristics associated with the backup may be logged. In various implementations, logged backup performance characteristics may include the number of passes until CoW mode is entered, the amount of data stored in each pass, completion time for each pass, resource usage intensity (e.g., CPU usage, I/O usage, network usage, power usage), a usage profile associated with the backup (e.g., client device identifier, site identifier, customer identifier, date, time, day of the week, number of users), data blocks change frequency, and/or the like. For example, the backup performance characteristics may be logged via a MySQL database command similar to the following:

INSERT INTO PerformanceLogs (deviceID, performanceCharacteristicsData)
VALUES (ID_client_device_1, "performance characteristics");

Example C code for implementing process 300 is provided below:

```
// main logic of the copy process:
    ret = start_tracking(source_device, mount_point, &cow);
    if (ret != 0) {
        return 1;
    }
    uint64_t how_much_copied = 0;
    while (1) {
        /* initial copy of all blocks (or all allocated blocks) */
        ret = copy_identified_blocks (url, source_device, last_cow, &how_much_copied);
// no tracking file to work with, copy everything
        if (ret != 0) {
            return 1;
        }
        if (how_much_copied > 500) // if the threshold has been surpassed, do it again
        { // atomically get the current tracking data, put it aside, and clear the
tracking data list for the next sweep
            ret = reset_tracking(mount_point, &cow);
            if (ret != 0) {
                return 1;
            }
            continue;
        }
        break;
    }
    /* so now we've done a number of sweeps of live data to the point where our last
sweep
     * did less than 500 blocks, now take a real snapshot and do one last copy. */
    ret = make_snapshot(mount_point, &cow); // transition to snapshot only
    if (ret != 0) {
        return 1;
    }
    // copy from source volume or from CoW file, as appropriate
    char snapname[1000];
    sprintf(snapname, "/dev/datto%d", MEGA_MINOR);
    ret = copy_identified_blocks(url, snapname, last_cow, &how_much_copied);
    if (ret != 0) {
        return 1;
    }
// end of main logic process.
```

Example C code for copying identified blocks based on incremental tracking data is provided below:

```
int copy_identified_blocks(char *url, char *device, char *tracking, uint64_t
*how_much_copied)
{
    fdlive = open_direct(device, O_RDONLY);
    snap_size = lseek(fdlive, 0, SEEK_END);
    total_blocks = (snap_size + COW_BLOCK_SIZE - 1) / COW_BLOCK_SIZE;
    total_chunks = (total_blocks + INDEX_BUFFER_SIZE - 1) / INDEX_BUFFER_SIZE;
    lseek(fdlive, 0, SEEK_SET);
    mappings = (uint64_t *)mymalloc(INDEX_BUFFER_SIZE * sizeof(uint64_t));
    for (i = 0; i < total_chunks; i++) {
        blocks_to_read = MIN(INDEX_BUFFER_SIZE, total_blocks - blocks_done);
        if (tracking != NULL) {
            //read a chunk of incremental tracking data
            bytes = pread(fdcow, mappings, blocks_to_read * sizeof(uint64_t),
            COW_HEADER_SIZE + (INDEX_BUFFER_SIZE * sizeof(uint64_t) * i));
            if (bytes != blocks_to_read * sizeof(uint64_t)) {
                goto error;
            }
        }
        //copy blocks where the incremental tracking says something was written
        for (j = 0; j < blocks_to_read; j++) {
            if (tracking != NULL) {
                if (!mappings[j])
                    continue;
```

```
        }
        ret = copy_block(url, fdlive, (INDEX_BUFFER_SIZE * i) + j);
        if (ret) {
                goto error;
        }
        (*how_much_copied)++;
    }
    blocks_done += blocks_to_read;
  }
}
```

FIGS. 4A-B show an exemplary process for copying a particular source volume to a target volume, according to some embodiments for the SVBAF. FIG. 4A depicts an exemplary process 400 for copying a source volume 402 to a target volume 403 that illustrates principles of process 300. As discussed above, source volume 402 may be managed by an operating system (not shown) that continues to make writes to the source volume 402 during the entire copying process. Therefore, there is no need to take source volume offline while the copying process is ongoing.

At step 404, process 400 begins when the operating system managing the source volume 402 enters an incremental tracking mode. As discussed above, the incremental tracking mode keeps track of which blocks have been modified by the operating system, and potentially the time and/or sequence in which these modifications took place.

At step 406, process 400 begins copying every allocated block in the entire source volume 402 to the target volume 403. This process may comprise a software loop that copies each block in the source volume 402 to the target volume 403 according to a predetermined sequence until there are no more blocks in the source volume 402 to be copied. For simplicity of explication, FIG. 4A and the subsequent explanation below assumes that the entire source volume 402 is being copied to the target volume 403 in step 406. However, it should be understood that, in some embodiments, only the portion of the source volume that has been allocated by the operating system may be copied in this step; in other embodiments, the entire source volume (whether allocated or not) may be copied. Depending on the size of the source volume 402 and the available bandwidth between source volume 402 and target volume 403, the process of copying the entire source volume 402 to the target volume 403 may take a considerable amount of time (e.g., multiple minutes, hours, or even days).

At step 408, process 400 verifies that the process of copying the entire source volume 402 to the target volume 403 is complete. At this point, the copying process evaluates records, logs, or data generated and/or modified by the operating system while in incremental tracking mode and identifies the blocks that changed during the previous copy procedure, i.e., the copy procedure of step 406. In some embodiments, the identified blocks include each block that was modified by write instructions after said each block had been copied to target volume 403. As illustrated in FIG. 4A, these identified blocks include the blocks at regions 408a, 408b, 408c, and 408d in the source volume.

At step 410, process 400 determines that the CoW mode should not be entered (e.g., the aggregate size of the blocks at regions 408a, 408b, 408c, and 408d is greater than or equal to a threshold). Process 400 therefore does not enter copy-on-write mode, but instead proceeds to copy only the blocks identified in step 408 (i.e., 408a, 408b, 408c, and 408d) to the corresponding locations in target volume 403. As a result, the portions 410a, 410b, 410c, and 410d in target volume 403, which correspond to the identified regions 408a, 408b, 408c and 408d in the source volume 402, are updated to reflect the new state of these identified regions. If the rate at which data is being copied from source volume 402 to target volume 403 exceeds the rate at which data in source volume 402 is being changed by the operating system, the aggregate size of the identified regions 408a, 408b, 408c, and 408d should be smaller than the size of the entire source volume 402. Therefore, the copying process of step 410 will generally take less time than the copying process of step 406.

At step 412, process 400 verifies that the process of copying the blocks identified in step 408 is complete. At this point, the copying process again evaluates the records, logs, or data generated and/or modified by the operating system while in incremental tracking mode and identifies the blocks that changed during the previous copy procedure, i.e., the copy procedure of step 410. In some embodiments, the identified blocks can include each block that was modified by write instructions after said each block had been copied to target volume 403. As illustrated in FIG. 4A, these identified blocks include the blocks at regions 412a and 412b in the source volume.

At step 414, process 400 determines that the CoW mode should not be entered (e.g., the aggregate size of the blocks at regions 412a and 412b is greater than or equal to a threshold). Process 400 therefore does not enter copy-on-write mode, but instead proceeds to copy only the blocks identified in step 412 (i.e., 412a and 412b) to the corresponding locations in target volume 403. As a result, the portions 414a and 414b in target volume 403, which correspond to the identified regions 412a and 412b, are updated to reflect the new state of these identified regions. If the rate at which data is being copied from source volume 402 to target volume 403 exceeds the rate at which data in source volume 402 is being changed by the operating system, the aggregate size of the identified regions 412a and 412b should be smaller than the aggregate size of the regions 408a, 408b, 408c, and 408d identified in step 408.

At step 416, process 400 verifies that the process of copying the blocks at regions 412a and 412b is complete. At this point, the copying process again evaluates the records, logs, or data generated and/or modified by the operating system while in incremental tracking mode and identifies the blocks that changed during the previous copy procedure, i.e., the copy procedure of step 414. As illustrated in FIG. 4A, these identified blocks include the blocks at region 416*a*.

Turning to FIG. 4B, at step 418, process 400 determines that the CoW mode should be entered (e.g., the aggregate size of the blocks at region 416*a* is less than the threshold). As a result, process 400 enters copy-on-write mode in step 420, then begins the process of copying the identified blocks at 416*a* to the target volume.

The operation of copy-on-write mode is illustrated at step 422. While in copy-on-write mode, the operating system intercepts every write instruction (e.g., write 423) to the source volume before the write occurs. If the write would modify a block in source volume 402 that has not yet been copied to target volume 403, the original contents of the to-be-modified block can first be preserved in CoW file 450. For example, a copy of the original contents 452 can be stored in CoW file 450.

As illustrated in step 424, when process 400 attempts to copy a block that was modified by the operating system, process 400 can copy the original contents of that block (as preserved in CoW file 450) to the target volume. At the end of step 424, the target volume 403 contains a crash-consistent snapshot of source volume 402—this crash-consistent snapshot reflects the state of source volume 402 at the time that the operating system entered copy-on-write mode, in step 420. After the end of step 424, process 400 can optionally exit copy-on-write mode and turn off the incremental tracking mode.

As described above, the systems and methods taught herein can reduce the time spent in copy-on-write mode. This reduced time reduces the risk of unrecoverable problems that can occur during the copying process. For instance, in some embodiments, interruptions may occur in the copying process leading to a partial copy than cannot be accurately completed. Interruptions can be of a particular concern when data is being copied directly to the cloud. This is because copying data to the cloud requires network transmission, which may be compromised or complicated in the event of an interruption. Interruptions in the copying process occur due to a variety of factors or scenarios. During these scenarios, the copying process may or may not be running. For example, a breakdown in the network connection without causing a concurrent pause in the operation of the agent that is directing the copying. According to another exemplary scenario, the computer could be put to sleep or into a hibernation state, during which the network connection may break but during which the agent directing the copying is not running. According to another exemplary scenario, the backup agent could be stopped by the user, during which the network is still functional but the agent directing the copying is not running. According to another exemplary scenario, the computer on which the agent directing the copying resides may be shut down or rebooted (either cleanly or unexpectedly), during which the agent directing the copying may not be running but the network may still be functional. Other scenarios are contemplated.

The examples listed above can be broken up into two functional categories. In the first category, the agent directing the copying may be unaware that its operation was suspended. For example, when a computer hibernates, it may wake up in the same state it was in before hibernation. However, the network connection may have been broken during hibernation. In the second category, the agent directing the copying may be sufficiently aware of network failures (for example, that the software cannot connect to or communicate with the server anymore) or other interruption causing events (for example shutdowns and restarts). Thus, in the first category, to the agent directing the backup, it appears as if there is a temporary network failure. In response, the agent may attempt to reconnect to the server and continue the backup as if the interruption did not occur.

In the second category, during the interruption, the program continues to run and thus the agent can detect that the network connection was broken and attempts to reconnect to the server. In the case of the network disconnecting, the software may continue to try to connect to the server until a connection is re-established. In the case of shutdown or a restart of the computer running the software, the software may take note of the current state of the backup process and write the state of the backup to a disk. Accordingly, at the next restart, this state can be read from the disk and the system may reconnect to the server and continue sending data where it left off. This may also include recreating the snapshot the system was in the process of creating when in snapshot mode, as opposed to incremental tracking mode.

FIG. 5 shows a datagraph illustrating data flow(s) for the SVBAF. In FIG. 5, a client 502 (e.g., at a client site) may send a backup request 521 to a SVBAF server 506 to initiate a backup. For example, the client may be a desktop, a laptop, a tablet, a smartphone, a smartwatch, and/or the like that is executing a client application. In one implementation, the backup request may include data such as a request identifier, a device identifier, a client site identifier, a source volume identifier, blocks to be copied, a target volume identifier, finalization configuration settings, optimization configuration settings, and/or the like. In one embodiment, the client may provide the following example backup request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
```

-continued

```
            <user_name>JohnDaDoeDoeDoooe@gmail.com</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>SVBAF.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
```

```
            <client_name>Mobile Safari</client_name>
            <client_version>537.75.14</client_version>
    </client_details>
    <backup_request>
            <request_identifier>ID_request_1</request_identifier>
            <device_identifier>ID_client_device_1</device_identifier>
            <client_site_identifier>ID_client_X_site</client_site_identifier>
            <source_volume_identifier>ID_source_device</source_volume_identifier>
            <blocks_to_copy>ALL</blocks_to_copy>
            <target_volume_identifier>ID_target_device</target_volume_identifier>
            <finalization_configuration_settings>
                <metric>NUMBER_OF_PASSES <= 10</metric>
                <metric>DELTA_DATA: ASYMPTOTE (LAST 3 PASSES)</metric>
                <metric>DELTA_TIME: ASYMPTOTE (HISTORICAL)</metric>
                <metric>MAX_COMPLETION_TIME: 60 seconds</metric>
            </finalization_configuration_settings>
            <predictive_optimization_configuration_settings>
                <setting>HISTORICAL_CHANGE_FREQUENCY</setting>
            </predictive_optimization_configuration_settings>
            <lookahead_optimization_configuration_settings>
                <setting>ACCELERATED_COPY</setting>
            </lookahead_optimization_configuration_settings>
    </backup_request>
</auth_request>
```

The SVBAF server may send a performance logs retrieve request 525 to a repository 510 to retrieve pertinent backup performance characteristics logs. In one implementation, the performance logs retrieve request may include data such as a request identifier, a device identifier, a client site identifier, date and/or time specification, performance logs data specification, and/or the like. In one embodiment, the SVBAF server may provide the following example performance logs retrieve request, substantially in the form of a HTTP(S) POST message including XML-formatted data, as provided below:

```
POST /performance_logs_retrieve_request.php HTTP/1.1
Host: www.server.com
Content-Type: Application/XML
Content-Length: 667
<?XML version = "1.0" encoding = "UTF-8"?>
<performance_logs_retrieve_request>
    <request_identifier>ID_request_2</request_identifier>
    <device_identifier>ID_client_device_1</device_identifier>
    <client_site_identifier>ID_client_X_site</client_site_identifier>
    <day_of_week>Wednesday</day_of_week>
    <performance_logs_data>
        DELTA_TIME, HISTORICAL_CHANGE_FREQUENCY
    </performance_logs_data>
</performance_logs_retrieve_request>
```

The repository may send a performance logs retrieve response 529 to the SVBAF server with the requested performance logs data. In one implementation, the performance logs retrieve response may include data such as a response identifier, the requested performance logs data, and/or the like. In one embodiment, the repository may provide the following example performance logs retrieve response, substantially in the form of a HTTP(S) POST message including XML-formatted data, as provided below:

```
POST /performance_logs_retrieve_response.php HTTP/1.1
Host: www.server.com
Content-Type: Application/XML
Content-Length: 667
<?XML version = "1.0" encoding = "UTF-8"?>
<performance_logs_retrieve_response>
    <response_identifier>ID_response_2</response_identifier>
    <performance_logs_data>requested performance logs data</performance_logs_data>
</performance_logs_retrieve_response>
```

A backup processing (BP) component 533 may utilize data provided in the backup request to perform the backup. See FIG. 3 for additional details regarding the BP component. In some implementations, the BP component may utilize a finalization settings determining (FSD) component 537 to determine when to enter the CoW mode based on the finalization configuration settings. See FIG. 6 for additional details regarding the FSD component. In some implementations, the BP component may utilize a predictive optimization settings determining (POSD) component 538 to determine which blocks should be designated to be copied based on the predictive optimization configuration settings. See FIG. 7 for additional details regarding the POSD component. In some implementations, the BP component may utilize a lookahead optimization settings determining (LOSD) component 539 to determine which blocks to copy during a pass based on the lookahead optimization configuration settings. See FIG. 9 for additional details regarding the POSD component.

The SVBAF server may send a performance logs store request 541 to the repository to store backup performance characteristics logs associated with the backup. In one implementation, the performance logs store request may include data such as a request identifier, performance logs data, and/or the like. In one embodiment, the SVBAF server may provide the following example performance logs store request, substantially in the form of a HTTP(S) POST message including XML-formatted data, as provided below:

```
POST /performance_logs_store_request.php HTTP/1.1
Host: www.server.com
Content-Type: Application/XML
Content-Length: 667
<?XML version = "1.0" encoding = "UTF-8"?>
<performance_logs_store_request>
    <request_identifier>ID_request_3</request_identifier>
    <performance_logs_data>per/ormance logs data for the backup</performance_logs_data>
</performance_logs_store_request>
```

The repository may send a performance logs store response 545 to the SVBAF server to confirm that the performance logs data was stored successfully. In one implementation, the performance logs store response may include data such as a response identifier, a status, and/or the like. In one embodiment, the repository may provide the following example performance logs store response, substantially in the form of a HTTP(S) POST message including XML-formatted data, as provided below:

```
POST /performance_logs_store_response.php HTTP/1.1
Host: www.server.com
Content-Type: Application/XML
Content-Length: 667
<?XML version = "1.0" encoding = "UTF-8"?>
<performance_logs_store_response>
    <response_identifier>ID_response_3</response_identifier>
    <status>OK</status>
</performance_logs_store_response>
```

The SVBAF server may send a backup response 549 to the client to inform the client whether the backup completed successfully. In one implementation, the backup response may include data such as a response identifier, a status, and/or the like. In one embodiment, the SVBAF server may provide the following example backup response, substantially in the form of a HTTP(S) POST message including XML-formatted data, as provided below:

```
POST /backup_response.php HTTP/1.1
Host: www.server.com
Content-Type: Application/XML
Content-Length: 667
<?XML version = "1.0" encoding = "UTF-8"?>
<backup_response>
    <response_identifier>ID_response_1</response_identifier>
    <status>OK</status>
</backup_response>
```

FIG. 6 shows a logic flow illustrating embodiments of a finalization settings determining (FSD) component for the SVBAF. In FIG. 6, a finalization settings request may be obtained at 601. For example, the finalization settings request may be obtained as a result of a request from the BP component to obtain finalization settings for a backup requested via a backup request.

Finalization configuration settings for a usage profile associated with the backup may be determined at 605. In one embodiment, the finalization configuration settings may specify which metrics should be utilized to determine whether to enter the CoW mode. For example, the finalization configuration settings may indicate that the CoW mode should be entered when a specified metric or combination of metrics (e.g., based on logical operators such as AND, OR, NOT, etc.) has been satisfied. In one implementation, the backup request may be parsed (e.g., using PHP commands) to determine the specified finalization configuration settings.

For example, the backup request may specify that number of passes, delta data between passes, delta time between passes, and maximum completion time metrics should be utilized to determine whether to enter the CoW mode. In another example, the backup request may specify a threshold value, which indicates when a metric has been satisfied, for each of the specified metrics (e.g., a threshold value for a metric may be specified as a constant (e.g., the number of passes metric is satisfied after 2 passes, or after 10 passes, or after 100 passes, etc. (e.g., determined based on previous experience regarding what number works well in practice)), a threshold value for a metric may be specified as a function or calculated parameter (e.g., the delta time between passes metric is satisfied when delta time reaches an asymptote) determined via statistical analysis of performance logs data (e.g., via a neural network)). In some embodiments, different finalization configuration settings may be utilized for the backup depending on the usage profile associated with the backup. For example, different finalization configuration settings may be utilized for different days (e.g., day of the week, weekday vs weekend), different times (e.g., time of day, working vs non-working hours), different entities (e.g., different client devices to be backed up (e.g., Client X Server 1 vs. Client X Server 2), different sites (e.g., Client X Site vs. Client Y Site), different customers (e.g., Client X vs. Client Y)), different number of users, and/or the like. Finalization configuration settings may vary with regard to metrics, metrics combinations, threshold values, and/or the like utilized for different usage profiles. In one implementation, a usage profile for the backup may be ascertained (e.g., based on data in the backup request, based on current date and/or time, etc.) and the finalization configuration settings for the usage profile may be determined (e.g., based on data stored in a database and/or based on data specified in the backup request). For example, the finalization configuration settings for the usage profile may be determined via a MySQL database command similar to the following:

SELECT usageProfileID, usageProfileFinalizationConfigurationSettings

FROM UsageProfiles

WHERE device_ID=ID_client_device_1 AND dayOfWeek="Wednesday";

Pertinent performance logs may be retrieved at 609. For example, the pertinent performance logs may include backup performance characteristics for the usage profile (e.g., backup performance characteristics logged by device ID_client_device_1 for previous backups that occurred on a Wednesday) that may be utilized to determine whether a specified metric (e.g., having a threshold value specified as a function or calculated parameter) has been satisfied. In one implementation, the pertinent performance logs for metrics specified via the finalization configuration settings may be retrieved from a database. For example, the pertinent performance logs may be retrieved via a MySQL database command similar to the following:

SELECT passID, completionTimePerPass
FROM PerformanceLogs
WHERE device ID=ID_client_device_1 AND
matchingUsageProfileIDs LIKE '%'+usageProfileID+'%';

A determination may be made at 621 whether the block size metric should be utilized by the backup to determine whether to enter the CoW mode (e.g., based on metrics specified via the finalization configuration settings). If so, finalization settings for the block size metric may be determined at 625 (e.g., based on a threshold specified via the finalization configuration settings). In one implementation, the finalization settings for the block size metric may specify that the block size metric is satisfied if the aggregate size of changed blocks in a pass is less than a threshold (e.g., 10 MB). The threshold may be a fixed aggregate size (e.g., expressed in units of storage such as megabytes, gigabytes, or terabytes), or may be a dynamic size calculated based on an available bandwidth between source volume and target volume, or the size of the source volume or target volume. For example, the threshold may be calculated by determining the maximum amount of data that may be transferred from the source volume to the target volume within a pre-defined target maximum time, given the available bandwidth between the two volumes, or the threshold may be calculated based on a pre-defined proportion of the total size of at least one of the source volume or target volume. Threshold calculations and/or various components (e.g., data transfer rate, available bandwidth) of such threshold calculations may be calculated based on data for the backup (e.g., based on data for the last pass, based on data over several passes) and/or based on historical data. If historical data is utilized, such calculations may be performed (e.g., calculated as an average, determined via statistical analysis by a neural network) as part of determining the finalization settings. If data for the backup is utilized, such calculations may be performed during the backup and may utilize pre-calculated components of threshold calculations that are based on historical data. In another implementation, the finalization settings for the block size metric may specify that the block size metric is satisfied if the number of changed blocks in a pass is less than a threshold (e.g., 500 blocks).

A determination may be made at 631 whether the number of passes metric should be utilized by the backup to determine whether to enter the CoW mode (e.g., based on metrics specified via the finalization configuration settings). If so, finalization settings for the number of passes metric may be determined at 635 (e.g., based on a threshold specified via the finalization configuration settings). In one implementation, the finalization settings for the number of passes metric may specify that the number of passes metric is satisfied if the number of passes for the backup exceeds a threshold (e.g., 5 passes). The threshold may be a fixed number or a dynamic number (e.g., calculated based on the average number of passes for a backup for the device on Wednesdays). Threshold calculations (e.g., using the function: the threshold is equal to 1.2 times historical average number of passes) and/or various components of such threshold calculations may be calculated based on data for the backup (e.g., based on data for the last pass, based on data over several passes) and/or based on historical data. If historical data is utilized, such calculations may be performed (e.g., calculated as an average, determined via statistical analysis by a neural network) as part of determining the finalization settings. If data for the backup is utilized, such calculations may be performed during the backup and may utilize pre-calculated components of threshold calculations that are based on historical data.

A determination may be made at 641 whether the delta data metric should be utilized by the backup to determine whether to enter the CoW mode (e.g., based on metrics specified via the finalization configuration settings). If so, finalization settings for the delta data metric may be determined at 645 (e.g., based on a threshold specified via the finalization configuration settings). In one implementation, the finalization settings for the delta data metric may specify that the delta data metric is satisfied if the change in the amount of data copied between passes (delta data) is less than a threshold (e.g., 1 MB). The threshold may be set using various criteria, such as it is more efficient to finish copying the data in one pass than to copy in several increments. Continually going back to copy small data increments may open the opportunity for more data changes during the copying, prolonging the backup process and decreasing efficiency. The threshold may be stated in alternative measures of size (e.g., number of blocks, bytes, bits). The threshold may be a fixed number or a dynamic number (e.g., a calculated parameter). For example, the threshold may be a calculated parameter that is satisfied if the change in the amount of data copied between passes (delta data) over several passes (e.g., over the last 3 passes) reaches an asymptote. Delta data calculations and/or various components (e.g., a trend function that may be used for predicting delta data for a pass) of such delta data calculations may be calculated based on data for the backup and/or based on historical data. For example, delta data for a pass may be calculated by determining a delta data trend function (e.g., linear, exponential) for the backup (e.g., based on the last 3 passes) and predicting delta data for the pass using the delta data trend function.

A determination may be made at 651 whether the delta time metric should be utilized by the backup to determine whether to enter the CoW mode (e.g., based on metrics specified via the finalization configuration settings). If so, finalization settings for the delta time metric may be determined at 655 (e.g., based on a threshold specified via the finalization configuration settings). In one implementation, the finalization settings for the delta time metric may specify that the delta time metric is satisfied if the change between passes in the amount of time to complete a pass (delta time) is less than a threshold (e.g., 5 seconds). The threshold may be set using various criteria, such as it is more efficient to finish copying the data in one pass than to copy in several increments. Continuing to copy small data increments once delta time reaches an asymptote may open the opportunity for more data changes during the copying, prolonging the backup process and decreasing efficiency. The threshold may incorporate a variety of factors (e.g., overall time to complete a pass, I/O time for a pass, transmission time for a pass). The threshold may be a fixed number or a dynamic number (e.g., a calculated parameter). For example, the threshold may be a calculated parameter that is satisfied if the change between passes in the amount of time to complete a pass (delta time) over several passes (e.g., over the last 3 passes) reaches an asymptote. Delta time calculations and/or various components (e.g., a trend function that may be used for predicting delta time for a pass) of such delta time calculations may be calculated based on data for the backup and/or based on historical data. For example, delta time for a pass may be calculated by determining a delta time trend function (e.g., linear, exponential) for the backup (e.g., based on historical data for the device on Wednesdays) and predicting delta time for the pass using the delta time trend function.

A determination may be made at 661 whether the pass completion time metric should be utilized by the backup to determine whether to enter the CoW mode (e.g., based on metrics specified via the finalization configuration settings). If so, finalization settings for the pass completion time metric may be determined at 665 (e.g., based on a threshold specified via the finalization configuration settings). In one implementation, the finalization settings for the pass completion time metric may specify that the pass completion time metric is satisfied if the pass completion time for a pass of the backup is less than a threshold (e.g., 60 seconds). The threshold may be a fixed number or a dynamic number (e.g., calculated based on a statistically determined (e.g., via a neural network) optimal threshold for the device on Wednesdays). Threshold calculations (e.g., using a neural network) and/or various components of such threshold calculations may be calculated based on data for the backup and/or based on historical data (e.g., based on historical data for the device on Wednesdays).

A determination may be made at 671 whether the resource intensity metric should be utilized by the backup to determine whether to enter the CoW mode (e.g., based on metrics specified via the finalization configuration settings). If so, finalization settings for the resource intensity metric may be determined at 675 (e.g., based on a threshold specified via the finalization configuration settings). In one implementation, the finalization settings for the resource intensity metric may specify that the resource intensity metric is satisfied if the resource load for a pass of the backup is less than a threshold (e.g., utilization percentage). The threshold may incorporate a variety of factors (e.g., CPU utilization, I/O utilization, network utilization, power utilization). The threshold may be a fixed number or a dynamic number (e.g., calculated based on a statistically determined (e.g., via a neural network) optimal threshold for the device on Wednesdays). Threshold calculations (e.g., using a neural network) and/or various components of such threshold calculations may be calculated based on data for the backup and/or based on historical data (e.g., based on historical data for the device on Wednesdays).

A determination may be made at 681 whether to optimize the combination of the specified metrics. In one embodiment, the finalization configuration settings may include a set of logical operators that specify how to evaluate the combination of the specified metrics to determine whether finalization settings have been satisfied. For example, the finalization configuration settings may specify that the finalization settings have been satisfied if the number of passes reaches a threshold of N (e.g., 10 passes) OR, for any pass<N, if the pass completion time is less than a threshold of T (e.g., 60 seconds). Accordingly, no additional combination optimization may be utilized. In another embodiment, the finalization configuration settings may specify that the optimal combination of metrics should be determined. Accordingly, combination optimization may be utilized.

If combination optimization should be utilized, an optimal finalization settings combination may be determined at 685. For example, the optimal finalization settings combination may be a combination that minimizes backup completion time, usage resource, and/or the like. In one implementation, a machine learning technique (e.g., a neural network) may be utilized to determine the optimal finalization settings combination. For example, historical data for the device on Wednesdays may be analyzed to determine which finalization settings combination minimizes backup completion time.

Finalization settings may be provided (e.g., to the BP component) at 691. For example, the finalization settings may include the optimal finalization settings combination. In one implementation, the BP component may utilize the finalization settings to determine whether to enter the CoW mode as discussed with regard to the BP component at 308.

FIG. 7 shows a logic flow illustrating embodiments of a predictive optimization settings determining (POSD) component for the SVBAF. In FIG. 7, a predictive optimization settings request may be obtained at 701. For example, the predictive optimization settings request may be obtained as a result of a request from the BP component to obtain predictive optimization settings for a backup requested via a backup request.

A determination may be made at 705 whether predictive optimization should be utilized by the backup. By utilizing predictive optimization, the number of copy operations performed during the backup may be reduced. In one embodiment, predictive optimization may be utilized to configure the backup such that initial passes copy primarily the data blocks that tend to be more stable, while later passes copy the data blocks that tend to change more rapidly. As some data blocks, such as those that represent the operating system, applications and user data (e.g., pictures, video, audio), do not change often, while other data blocks, such as those that represent database entries and mail server files, tend to change rapidly, copying the rapidly changing blocks multiple times across iterations may be minimized by delaying their copying until a later pass. Additionally, the initial passes that do not copy the rapidly changing blocks may be copying fewer data blocks, hence may be performed more quickly.

If predictive optimization should not be utilized, the POSD component may indicate at 709 that all allocated and/or identified blocks should be included in a pass as discussed with regard to the BP component at 302 and/or 310.

If predictive optimization should be utilized, optimization configuration settings for a usage profile associated with the backup may be determined at 713. In one embodiment, the optimization configuration settings may specify how predictive optimization should be configured using a setting or a combination of settings (e.g., based on logical operators such as AND, OR, NOT, etc.). For example, the optimization configuration settings may indicate how (e.g., data attributes, historical trends) data blocks should be categorized into different frequency types (e.g., stable blocks, rapidly changing blocks). In one implementation, the backup request may be parsed (e.g., using PHP commands) to determine the specified optimization configuration settings. For example, the backup request may specify that historical change frequency associated with data blocks should be utilized to classify the data blocks into different frequency types. In another example, the backup request may specify the number of initial passes during which data blocks having a certain frequency type should not be copied (e.g., rapidly changing blocks should not be copied during the first two passes). It is to be understood that criteria such as number of passes, delta data between passes, delta time between passes, pass completion time, resource intensity, and/or the like may be utilized alone or in various combinations to determine when data blocks having a certain frequency type should be copied. In some embodiments, different optimization configuration settings may be utilized for the backup depending on the usage profile associated with the backup. For example, different optimization configuration settings may be utilized for different days (e.g., day of the week, weekday vs weekend), different times (e.g., time of day, working vs non-working hours), different entities (e.g., different client devices to be backed up (e.g., Client X Server 1 vs. Client X Server 2), different sites (e.g., Client X Site vs. Client Y Site), different customers (e.g., Client X vs. Client Y)), different number of users, and/or the like. Optimization configuration settings may vary with regard to settings, settings combinations, frequency types, number of initial passes for different frequency types, and/or the like utilized for different usage profiles. In one implementation, a usage profile for the backup may be ascertained (e.g., based on data in the backup request, based on current date and/or time, etc.) and the optimization configuration settings for the usage profile may be determined (e.g., based on data stored in a database and/or based on data specified in the backup request). For example, the optimization configuration settings for the usage profile may be determined via a MySQL database command similar to the following:

SELECT usageProfileID, usageProfilePredictiveOptimizationConfigurationSettings
FROM UsageProfiles
WHERE device_ID=ID_client_device_1 AND dayOfWeek="Wednesday";

Pertinent performance logs may be retrieved at 717. For example, the pertinent performance logs may include backup performance characteristics for the usage profile (e.g., backup performance characteristics logged by device ID_client_device_1 for previous backups that occurred on a Wednesday) that may be utilized to categorize data blocks into different frequency types. In one implementation, the pertinent performance logs for settings specified via the optimization configuration settings may be retrieved from a database. For example, the pertinent performance logs may be retrieved via a MySQL database command similar to the following:

SELECT passID, dataBlocksChangeFrequency
FROM PerformanceLogs
WHERE device ID=ID_client_device_1 AND matchingUsageProfileIDs LIKE '%'+usageProfileID+'%';

A determination may be made at 721 whether the stable blocks criteria should be utilized by the backup to categorize data blocks into different frequency types (e.g., based on settings specified via the predictive optimization configuration settings). If so, optimization settings for the stable blocks criteria may be determined at 725. In one embodiment, the stable blocks criteria may be used to identify data blocks that are not likely to change based on data type, such as blocks from executable applications, operating system functions, and user data. In one implementation, the stable blocks optimization settings may specify a list of blocks classified as stable blocks (e.g., data blocks that satisfy the stable blocks criteria) and/or the number of initial passes during which data blocks not classified as stable blocks should not be copied (e.g., a number specified via the predictive optimization configuration settings, an optimal number determined by a neural network based on analysis of historical data). It is to be understood that stable blocks may be a single frequency type or may be subdivided into multiple frequency types (e.g., based on probability ranges of being stable blocks, based on the amount of time blocks are likely to remain unchanged).

A determination may be made at 731 whether the busy blocks criteria should be utilized by the backup to categorize data blocks into different frequency types (e.g., based on settings specified via the predictive optimization configuration settings). If so, optimization settings for the busy blocks criteria may be determined at 735. In one embodiment, the busy blocks criteria may be used to identify data blocks that are likely to change more rapidly based on data type, such as files written to by heavily utilized applications that perform a significant amount of I/O (e.g., for a Microsoft Windows NTFS system the following may be categorized as busy blocks: NTFS transaction log journal, NTFS change journal, parts of the Master File Table; for a Microsoft SQL Server the following may be categorized as busy blocks: database files, transaction log). In one implementation, the busy blocks optimization settings may specify a list of blocks classified as busy blocks (e.g., data blocks that satisfy the busy blocks criteria) and/or the number of initial passes during which data blocks classified as busy blocks should not be copied (e.g., a number specified via the predictive optimization configuration settings, an optimal number determined by a neural network based on analysis of historical data). It is to be understood that busy blocks may be a single frequency type or may be subdivided into multiple frequency types (e.g., based on probability ranges of being busy blocks, based on the amount of time blocks are likely to remain unchanged).

A determination may be made at 741 whether the historical change frequency criteria should be utilized by the backup to categorize data blocks into different frequency types (e.g., based on settings specified via the predictive optimization configuration settings). If so, optimization settings for the historical change frequency criteria may be determined at 745. In one embodiment, the historical change frequency criteria may be used to categorize data blocks into different frequency types based on write history associated with the data blocks. For example, a record of block writes may be kept (e.g., for a specified time period, such as for recent block writes) and analyzed (e.g., via statistical analysis by a neural network) to categorize data blocks into different frequency types (e.g., based on historical data for the device on Wednesdays). In one implementation, the historical change frequency optimization settings may specify how data blocks are classified into different frequency types and/or the number of initial passes during which data blocks associated with each frequency type should not be copied (e.g., numbers specified via the predictive optimization configuration settings, optimal numbers determined by a neural network based on analysis of historical data).

A determination may be made at 751 whether to optimize the combination of the specified settings. In one embodiment, the predictive optimization configuration settings may include a set of logical operators that specify how to evaluate the combination of the specified settings to determine how data blocks are classified into different frequency types. For example, the predictive optimization configuration settings may specify that data blocks not classified as stable blocks should not be copied during the first two passes unless classified as busy blocks, which should not be copied during the first three passes. Accordingly, no additional combination optimization may be utilized. In another embodiment, the predictive optimization configuration settings may specify that the optimal combination of settings should be determined. Accordingly, combination optimization may be utilized.

If combination optimization should be utilized, an optimal optimization settings combination may be determined at 755. For example, the optimal optimization settings combination may be a combination that minimizes backup completion time, usage resource, and/or the like. In one implementation, a machine learning technique (e.g., a neural network) may be utilized to determine the optimal optimization settings combination. For example, historical data for the device on Wednesdays may be analyzed to determine which optimization settings combination minimizes the overall number of copy operations.

Predictive optimization settings may be provided (e.g., to the BP component) at 761. For example, the predictive optimization settings may include the optimal predictive optimization settings combination. In one implementation, the BP component may utilize the predictive optimization settings to determine how designated blocks to copy should be adjusted for each pass as discussed with regard to the BP component at 302 and/or 310.

FIGS. 8A-B show implementation cases for the SVBAF. In FIG. 8A, an exemplary embodiment in which predictive optimization is not utilized is illustrated. As shown at 801, blocks 1-20 should be copied to backup and blocks 3, 4 (e.g., busy blocks) tend to change frequently. During the initial full copy phase, all allocated blocks are copied, resulting in 20 copy operations. Blocks 3-6, 10, 12-13, 15 changed while copying. As shown at 810, since the full copy phase completed, blocks 3, 4, 7, 14 changed and are added to the list of blocks to copy. During the first pass of the incremental copy, the changed blocks 3-7, 10, 12-15 are copied, resulting in 10 copy operations. Blocks 1-5, 8, 12, 14, 19-20 changed while copying. As shown at 820, during the second pass of the incremental copy, the changed blocks 1-5, 8, 12, 14, 19-20 are copied, resulting in 10 copy operations. Blocks 3, 4, 20 changed while copying. Since the number of changed blocks is below a threshold (e.g., 5 blocks) for entering the CoW mode, the CoW mode is entered. As shown at 830, during the final pass of the incremental copy, the changed blocks 3, 4, 20 are copied using the CoW file, resulting in 3 copy operations. Thus, a total of 43 copy operations are performed during this backup.

In FIG. 8B, an exemplary embodiment in which predictive optimization is utilized is illustrated. As shown at 840, blocks 1-20 should be copied to backup and blocks 3, 4 (e.g., busy blocks) tend to change frequently. Predictive optimization is utilized to hold off copying the busy blocks until the CoW mode is entered. During the initial full copy phase, all allocated blocks except the busy blocks 3, 4 are copied, resulting in 18 copy operations. Blocks 3-6, 10, 12-13, 15 changed while copying. As shown at 850, since the full copy phase completed, blocks 3, 4, 7, 14 changed and are added to the list of blocks to copy. During the first pass of the incremental copy, the changed blocks 5-7, 10, 12-15 are copied while the busy blocks 3, 4 are not copied, resulting in 8 copy operations. Blocks 1-5, 8, 12, 14, 19-20 changed while copying. As shown at 860, during the second pass of the incremental copy, the changed blocks 1-2, 5, 8, 12, 14, 19-20 are copied while the busy blocks 3, 4 are not copied, resulting in 8 copy operations. Blocks 3, 4, 20 changed while copying. Since the number of changed blocks is below a threshold (e.g., 5 blocks) for entering the CoW mode, the CoW mode is entered and the busy blocks 3, 4 may now be copied. As shown at 870, during the final pass of the incremental copy, the changed blocks 3, 4, 20 are copied using the CoW file, resulting in 3 copy operations. Thus, a total of 37 copy operations are performed during this backup using predictive optimization, resulting in a reduced overall number of copy operations.

FIG. 9 shows a logic flow illustrating embodiments of a lookahead optimization settings determining (LOSD) component for the SVBAF. In FIG. 9, a lookahead optimization settings request may be obtained at 901. For example, the lookahead optimization settings request may be obtained as a result of a request from the BP component to obtain lookahead optimization settings for a backup requested via a backup request.

A determination may be made at 905 whether lookahead optimization should be utilized by the backup. By utilizing lookahead optimization, the number of passes utilized to complete the backup may be reduced and/or redundant copying may be avoided. In one embodiment, lookahead optimization (e.g., accelerated copy optimization) may be utilized to configure the backup such that data blocks that changed forward of the current position (e.g., position of the data block currently being read and copied) and that had not been marked as changed blocks at the start of a current pass are added to the designated blocks to copy. Since fewer changed blocks are copied in the subsequent pass, the threshold to enter the CoW mode may be reached faster, and the number of passes utilized to complete the backup may be reduced. In another embodiment, lookahead optimization (e.g., delayed copy optimization) may be utilized to configure the backup such that copying of data blocks that changed forward of the current position and that had been marked as changed blocks at the start of a current pass is skipped (e.g., because such blocks will be marked as changed blocks and copied in the subsequent pass). Since fewer changed blocks are copied in the current pass, redundant copying may be avoided.

If lookahead optimization should not be utilized, the LOSD component may indicate at 909 that the designated blocks should be copied in a pass as discussed with regard to the BP component at 304.

If lookahead optimization should be utilized, optimization configuration settings for a usage profile associated with the backup may be determined at 913. In one embodiment, the optimization configuration settings may specify how lookahead optimization should be configured using a setting or a combination of settings (e.g., based on logical operators such as AND, OR, NOT, etc.). For example, the optimization configuration settings may indicate which optimizations (e.g., accelerated copy optimization, delayed copy optimization) should be utilized. In one implementation, the backup request may be parsed (e.g., using PHP commands) to determine the specified optimization configuration settings. For example, the backup request may specify that accelerated copy optimization should be utilized during the backup. In another example, the backup request may specify a schedule for applying lookahead optimization to a read/copy position (e.g., periodically, after a predetermined period of time). It is to be understood that criteria such as number of passes, delta data between passes, delta time between passes, pass completion time, resource intensity, and/or the like may be utilized alone or in various combinations to determine the schedule for applying lookahead optimization. In some embodiments, different optimization configuration settings may be utilized for the backup depending on the usage profile associated with the backup. For example, different optimization configuration settings may be utilized for different days (e.g., day of the week, weekday vs weekend), different times (e.g., time of day, working vs non-working hours), different entities (e.g., different client devices to be backed up (e.g., Client X Server 1 vs. Client X Server 2), different sites (e.g., Client X Site vs. Client Y Site), different customers (e.g., Client X vs. Client Y)), different number of users, and/or the like. Optimization configuration settings may vary with regard to settings, settings combinations, and/or the like utilized for different usage profiles. In one implementation, a usage profile for the backup may be ascertained (e.g., based on data in the backup request, based on current date and/or time, etc.) and the optimization configuration settings for the usage profile may be determined (e.g., based on data stored in a database and/or based on data specified in the backup request). For example, the optimization configuration settings for the usage profile may be determined via a MySQL database command similar to the following:

SELECT usageProfileID, usageProfileLookaheadOptimizationConfigurationSettings
FROM UsageProfiles
WHERE device_ID=ID_client_device_1 AND dayOfWeek="Wednesday";

Pertinent performance logs may be retrieved at 917. For example, the pertinent performance logs may include backup performance characteristics for the usage profile (e.g., backup performance characteristics logged by device ID_client_device_1 for previous backups that occurred on a Wednesday) that may be utilized to determine an optimal schedule for applying lookahead optimization (e.g., via a neural network based on analysis of historical data) that results in the best backup performance (e.g., fewest passes, fewest redundant blocks copied, quickest completion time). In one implementation, the pertinent performance logs for settings specified via the optimization configuration settings may be retrieved from a database. For example, the pertinent performance logs may be retrieved via a MySQL database command similar to the following:

SELECT passID, dataPerPass, completionTimePerPass
FROM PerformanceLogs
WHERE device_ID=ID_client_device_1 AND matchingUsageProfileIDs LIKE '%'+usageProfileID+'%';

A determination may be made at 921 whether accelerated copy optimization should be utilized by the backup (e.g., based on settings specified via the lookahead optimization configuration settings). If so, accelerated copy optimization settings may be determined at 925. In one implementation, the accelerated copy optimization settings may specify a schedule that determines when accelerated copy optimization should be utilized (e.g., check the current read/copy position during a pass every 15 seconds).

A determination may be made at 931 whether delayed copy optimization should be utilized by the backup (e.g., based on settings specified via the lookahead optimization configuration settings). If so, delayed copy optimization settings may be determined at 935. In one implementation, the delayed copy optimization settings may specify a schedule that determines when delayed copy optimization should be utilized (e.g., check the current read/copy position during a pass after every 10 megabytes copied).

A determination may be made at 941 whether to optimize the combination of the specified settings. In one embodiment, the lookahead optimization configuration settings may include a set of logical operators that specify how to evaluate the combination of the specified settings to determine which optimizations to use and/or when. For example, the lookahead optimization configuration settings may specify that the accelerated copy optimization but not the delayed copy optimization should be used for the backup. Accordingly, no additional combination optimization may be utilized. In another embodiment, the lookahead optimization configuration settings may specify that the optimal combination of settings should be determined. Accordingly, combination optimization may be utilized.

If combination optimization should be utilized, an optimal optimization settings combination may be determined at 945. For example, the optimal optimization settings combination may be a combination that minimizes backup completion time, usage resource, and/or the like. In one implementation, a machine learning technique (e.g., a neural network) may be utilized to determine the optimal optimization settings combination. For example, historical data for the device on Wednesdays may be analyzed to determine which optimization settings combination minimizes the number of passes utilized to complete the backup.

Lookahead optimization settings may be provided (e.g., to the BP component) at 951. For example, the lookahead optimization settings may include the optimal lookahead optimization settings combination. In one implementation, the BP component may utilize the lookahead optimization settings to determine how designated blocks to copy should be adjusted during each pass as discussed with regard to the BP component at 304.

FIGS. 10A-C show implementation cases for the SVBAF. In FIG. 10A, an exemplary embodiment in which lookahead optimization is not utilized is illustrated. As shown at 1001, blocks 1-20 should be copied to backup. During the initial full copy phase, all allocated blocks are copied, resulting in 20 copy operations. Blocks 5-6, 10, 12-13, 15 changed while copying. As shown at 1010, since the full copy phase completed, blocks 3, 4, 7, 14 changed and are added to the list of blocks to copy. During the first pass of the incremental copy, the changed blocks 3-7, 10, 12-15 are copied, resulting in 10 copy operations. Blocks 1-2, 5, 8, 12, 14, 19-20 changed while copying. As shown at 1020, during the second pass of the incremental copy, the changed blocks 1-2, 5, 8, 12, 14, 19-20 are copied, resulting in 8 copy operations. Blocks 3, 4, 20 changed while copying. Since the number of changed blocks is below a threshold (e.g., 5 blocks) for entering the CoW mode, the CoW mode is entered. As shown at 1030, during the final pass of the incremental copy, the changed blocks 3, 4, 20 are copied using the CoW file, resulting in 3 copy operations. Thus, a total of 41 copy operations in 4 passes are performed during this backup.

In FIG. 10B, an exemplary embodiment in which lookahead optimization is utilized is illustrated. In FIG. 10B, accelerated copy optimization is utilized. As shown at 1040, blocks 1-20 should be copied to backup. During the initial full copy phase, all allocated blocks are copied, resulting in 20 copy operations. Blocks 5-6, 10, 12-13, 15 changed while copying. As shown at 1050, since the full copy phase completed, blocks 3, 4, 7, 14 changed and are added to the list of blocks to copy. During the first pass of the incremental copy, accelerated copy optimization is utilized to add blocks that changed forward of the current read and copy position (e.g., marked by the copy tracker at block 14) and that had not been marked as changed blocks at the start of the first pass to the designated blocks to copy. Thus, blocks 19-20 are added to the designated blocks to copy, and the changed blocks 3-7, 10, 12-15, 19-20 are copied, resulting in 12 copy operations. As a result, even though blocks 1-2, 5, 8, 12, 14, 19-20 changed while copying up to block 14, just blocks 1-2, 5, 8, 12 are marked as changed for the next pass. The accelerated copy optimization may similarly be applied in the next pass at 1060. Alternatively, if the number of changed blocks is below a threshold (e.g., 5 blocks) for entering the CoW mode, the CoW mode is entered at 1060. Thus, 3 passes are performed during this backup using lookahead optimization, resulting in a reduced number of passes utilized to complete the backup.

In FIG. 10C, an exemplary embodiment in which lookahead optimization is utilized is illustrated. In FIG. 10C, delayed copy optimization is utilized. As shown at 1070, blocks 1-20 should be copied to backup. During the initial full copy phase, delayed copy optimization is utilized to skip copying of blocks that changed forward of the current read and copy position (e.g., marked by the copy tracker at block 11) and that had been marked as changed blocks at the start of the initial full copy phase. Since blocks 5-6, 10, 12-13, 15 changed while copying up to block 11, blocks 12-13, 15 are skipped, resulting in 17 copy operations. As shown at 1080, since the full copy phase completed, blocks 3, 4, 7, 14 changed and are added to the list of blocks to copy. Thus, during the first pass of the incremental copy, blocks 3-7, 10, 12-15 are marked as changed blocks to copy. The delayed copy optimization may similarly be applied in this pass and/or in the next pass at 1090. Thus, redundant copying is avoided (e.g., 17 copy operations at 1070 vs. 20 copy operations at 1001) during this backup using lookahead optimization, resulting in reduced resource usage.

SVBAF Controller

FIG. 11 shows a block diagram illustrating embodiments of a SVBAF controller. In this embodiment, the SVBAF controller 1101 may serve to aggregate, process, store, search, serve, identify, instruct, generate, match, and/or facilitate interactions with a computer through backup systems technologies, and/or other related data.

Users, which may be people and/or other systems, may engage information technology systems (e.g., computers) to facilitate information processing. In turn, computers employ processors to process information; such processors 1103 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 1129 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SVBAF controller 1101 may be connected to and/or communicate with entities such as, but not limited to: one or more users from peripheral devices 1112 (e.g., user input devices 1111); an optional cryptographic processor device 1128; and/or a communications network 1113.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The SVBAF controller 1101 may be based on computer systems that may comprise, but are not limited to, components such as: a computer systemization 1102 connected to memory 1129.

Computer Systemization

A computer systemization 1102 may comprise a clock 1130, central processing unit ("CPU(s)" and/or "processor(s)" (these terms are used interchangeable throughout the disclosure unless noted to the contrary)) 1103, a memory 1129 (e.g., a read only memory (ROM) 1106, a random access memory (RAM) 1105, etc.), and/or an interface bus 1107, and most frequently, although not necessarily, are all interconnected and/or communicating through a system bus 1104 on one or more (mother)board(s) 1102 having conductive and/or otherwise transportive circuit pathways through which instructions (e.g., binary encoded signals) may travel to effectuate communications, operations, storage, etc. The computer systemization may be connected to a power source 1186; e.g., optionally the power source may be internal. Optionally, a cryptographic processor 1126 may be connected to the system bus. In another embodiment, the cryptographic processor, transceivers (e.g., ICs) 1174, and/or sensor array (e.g., accelerometer, altimeter, ambient light, barometer, global positioning system (GPS) (thereby allowing SVBAF controller to determine its location), gyroscope, magnetometer, pedometer, proximity, ultra-violet sensor, etc.) 1173 may be connected as either internal and/or external peripheral devices 1112 via the interface bus I/O 1108 (not pictured) and/or directly via the interface bus 1107. In turn, the transceivers may be connected to antenna(s) 1175, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n, Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1129 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's Dragon-Ball® and PowerPC®; IBM's® and Sony's® Cell processor; Intel's® 80X86 series (e.g., 80386, 80486), Pentium®, Celeron®, Core (2) Duo®, i series (e.g., i3, i5, i7, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to various data processing techniques. Such instruction passing facilitates communication within the SVBAF controller and beyond through various interfaces. Should processing requirements dictate a greater amount speed and/or capacity, distributed processors (e.g., see Distributed SVBAF below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the SVBAF may be achieved by implementing a microcontroller such as CAST's® R8051XC2 microcontroller; Intel's® MCS 51 (i.e., 8051 microcontroller); and/or the like. Also, to implement certain features of the SVBAF, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SVBAF component collection (distributed or otherwise) and/or features may be implemented via the microprocessor and/or via embedded components; e.g., via ASIC, coprocessor, DSP, FPGA, and/or the like. Alternately, some implementations of the SVBAF may be implemented with embedded components that are configured and used to achieve a variety of features or signal processing.

Depending on the particular implementation, the embedded components may include software solutions, hardware solutions, and/or some combination of both hardware/software solutions. For example, SVBAF features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the SVBAF features. A hierarchy of programmable interconnects allow logic blocks to be interconnected as needed by the SVBAF system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the SVBAF may be developed on FPGAs and then migrated into a fixed version that more resembles ASIC implementations. Alternate or coordinating implementations may migrate SVBAF controller features to a final ASIC instead of or in addition to FPGAs. Depending on the implementation all of the aforementioned embedded components and microprocessors may be considered the "CPU" and/or "processor" for the SVBAF.

Power Source

The power source 1186 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1186 is connected to at least one of the interconnected subsequent components of the SVBAF thereby providing an electric current to all subsequent components. In one example, the power source 1186 is connected to the system bus component 1104. In an alternative embodiment, an outside power source 1186 is provided through a connection across the I/O 1108 interface. For example, a USB and/or IEEE 1394 connection carries both data and power across the connection and is therefore a suitable source of power.

Interface Adapters

Interface bus(ses) 1107 may accept, connect, and/or communicate to a number of interface adapters, variously although not necessarily in the form of adapter cards, such as but not limited to: input output interfaces (I/O) 1108, storage interfaces 1109, network interfaces 1110, and/or the like. Optionally, cryptographic processor interfaces 1127 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1109 may accept, communicate, and/or connect to a number of storage devices such as, but not limited to: storage devices 1114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1110 may accept, communicate, and/ or connect to a communications network 1113. Through a communications network 1113, the SVBAF controller is accessible through remote clients 1133*b* (e.g., computers with web browsers) by users 1133*a*. Network interfaces may employ connection protocols such as, but not limited to: direct connect, Ethernet (thick, thin, twisted pair 10/100/ 1000/10000 Base T, and/or the like), Token Ring, wireless connection such as IEEE 802.11a-x, and/or the like. Should processing requirements dictate a greater amount speed and/or capacity, distributed network controllers (e.g., see Distributed SVBAF below), architectures may similarly be employed to pool, load balance, and/or otherwise decrease/ increase the communicative bandwidth required by the SVBAF controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1110 may be used to engage with various communications network types 1113. For example, multiple network interfaces may be employed to allow for the communication over broadcast, multicast, and/or unicast networks.

Input Output interfaces (I/O) 1108 may accept, communicate, and/or connect to user, peripheral devices 1112 (e.g., input devices 1111), cryptographic processor devices 1128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/ g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 1112 may be connected and/or communicate to I/O and/or other facilities of the like such as network interfaces, storage interfaces, directly to the interface bus, system bus, the CPU, and/or the like. Peripheral devices may be external, internal and/or part of the SVBAF controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 1111 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the SVBAF controller may be embodied as an embedded, dedicated, and/or monitor-less (i.e., headless) device, wherein access would be provided over a network interface connection.

Cryptographic units such as, but not limited to, microcontrollers, processors 1126, interfaces 1127, and/or devices 1128 may be attached, and/or communicate with the SVBAF controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+ MB/s of cryptographic instructions; VLSI Technology's® 33 MHz 6868; and/or the like.

Memory

Generally, any mechanization and/or embodiment allowing a processor to affect the storage and/or retrieval of information is regarded as memory 1129. However, memory is a fungible technology and resource, thus, any number of memory embodiments may be employed in lieu of or in concert with one another. It is to be understood that the SVBAF controller and/or a computer systemization may employ various forms of memory 1129. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 1129 will include ROM 1106, RAM 1105, and a storage device 1114. A storage device 1114 may be any various computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 1129 may contain a collection of program and/or database components and/or data such as, but not limited to: operating system component(s) 1115 (operating system); information server component(s) 1116 (information server); user interface component(s) 1117 (user interface); Web browser component(s) 1118 (Web browser); database(s) 1119; mail server component(s) 1121; mail client component(s) 1122; cryptographic server component(s) 1120 (cryptographic server); the SVBAF component(s) 1135; and/or the like (i.e., collectively a component collection). These components may be stored and accessed from the storage devices and/or from storage devices accessible through an interface bus. Although unconventional program components such as those in the component collection may be stored in a local storage device 1114, they may also be loaded and/or stored in memory such as: peripheral devices, RAM, remote storage facilities through a communications network, ROM, various forms of memory, and/or the like.

Operating System

The operating system component 1115 is an executable program component facilitating the operation of the SVBAF controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millenium/Mobile/NT/Vista/XP (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SVBAF controller to communicate with other entities through a communications network 1113. Various communication protocols may be used by the SVBAF controller as a subcarrier transport mechanism for interaction, such as, but not limited to: multicast, TCP/IP, UDP, unicast, and/or the like.

Information Server

An information server component 1116 is a stored program component that is executed by a CPU. The information server may be a an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C(++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects®, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SVBAF controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SVBAF database 1119, operating systems, other program components, user interfaces, Web browsers, and/or the like.

Access to the SVBAF database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SVBAF. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, wherein the resulting command is provided over the bridge mechanism to the SVBAF as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, menus, scrollers, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other web-browser/cloud based client OSs); Microsoft's Windows® varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface®, any of which may be used and) provide a baseline and means of accessing and displaying information graphically to users.

A user interface component 1117 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1118 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the SVBAF enabled nodes. The combined application may be nugatory on systems employing Web browsers.

Mail Server

A mail server component 1121 is a stored program component that is executed by a CPU 1103. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C(++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SVBAF. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the SVBAF mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1122 is a stored program component that is executed by a CPU 1103. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1120 is a stored program component that is executed by a CPU 1103, cryptographic processor 1126, cryptographic processor interface 1127, cryptographic processor device 1128, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the SVBAF may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to allow the SVBAF component to engage in secure transactions if so desired. The cryptographic component facilitates the secure accessing of resources on the SVBAF and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SVBAF Database

The SVBAF database component 1119 may be embodied in a database and its stored data. The database is a stored program component, which is executed by the CPU; the stored program component portion configuring the CPU to process the stored data. The database may be a fault tolerant, relational, scalable, secure database such as MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the SVBAF database may be implemented using various other data-structures, such as an array, hash, (linked) list, struct, structured text file (e.g., XML), table, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the SVBAF database is implemented as a data-structure, the use of the SVBAF database 1119 may be integrated into another component such as the SVBAF component 1135. Also, the database may be implemented as a mix of data structures, objects, and relational structures. Databases may be consolidated and/or distributed in countless variations (e.g., see Distributed SVBAF below). Portions of databases, e.g., tables, may be exported and/or imported and thus decentralized and/or integrated.

In one embodiment, the database component 1119 includes several tables 1119*a-k*:

An accounts table 1119*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 1119*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a SVBAF);

An devices table 1119*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 1119*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 1119*e* includes fields such as, but not limited to: assetID, accountID, userID, distributorAccountID, distributorPaymentID, distributorOnwerID, as setOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 1119*f* includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 1119*g* includes fields such as, but not limited to: transactionID, accountID, assetID, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 1119*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 1119*i* includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A performance logs table 1119*j* includes fields such as, but not limited to: deviceID, accountID, performanceCharacteristicsData, numberOfPasses, passID, dataPerPass, completionTimePerPass, usageIntensity, numberOfUsers, dataBlocksChangeFrequency, matchingUsageProfileIDs, and/or the like;

A usage profiles table 1119*k* includes fields such as, but not limited to: usageProfileID, usageProfileDescriptor, deviceID, accountID, timeRange, dayOfWeek, numberOfUsers, usageProfileFinalizationConfigurationSettings, usageProfilePredictiveOptimizationConfigurationSettings, usageProfileLookaheadOptimizationConfigurationSettings, and/or the like.

In one embodiment, the SVBAF database may interact with other database systems. For example, employing a distributed database system, queries and data access by search SVBAF component may treat the combination of the SVBAF database, an integrated data security layer database as a single database entity (e.g., see Distributed SVBAF below).

In one embodiment, user programs may contain various user interface primitives, which may serve to update the SVBAF. Also, various accounts may require custom database tables depending upon the environments and the types of clients the SVBAF may need to serve. It should be noted that any unique fields may be designated as a key field throughout. In an alternative embodiment, these tables have been decentralized into their own databases and their respective database controllers (i.e., individual database controllers for each of the above tables). Employing various data processing techniques, one may further distribute the databases over several computer systemizations and/or storage devices. Similarly, configurations of the decentralized database controllers may be varied by consolidating and/or distributing the various database components 1119*a*-*k*. The SVBAF may be configured to keep track of various settings, inputs, and parameters via database controllers.

The SVBAF database may communicate to and/or with other components in a component collection, including itself, and/or facilities of the like. Most frequently, the SVBAF database communicates with the SVBAF component, other program components, and/or the like. The database may contain, retain, and provide information regarding other nodes and data.

The SVBAFs

The SVBAF component 1135 is a stored program component that is executed by a CPU. In one embodiment, the SVBAF component incorporates any and/or all combinations of the aspects of the SVBAF that was discussed in the previous figures. As such, the SVBAF affects accessing, obtaining and the provision of information, services, transactions, and/or the like across various communications networks. The features and embodiments of the SVBAF discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the SVBAF's features and facilities, and in many cases reduce the costs, energy consumption/requirements, and extend the life of SVBAF's underlying infrastructure; this has the added benefit of making the SVBAF more reliable. Similarly, many of the features and mechanisms are designed to be easier for users to use and access, thereby broadening the audience that may enjoy/employ and exploit the feature sets of the SVBAF; such ease of use also helps to increase the reliability of the SVBAF. In addition, the feature sets include heightened security as noted via the Cryptographic components 1120, 1126, 1128 and throughout, making access to the features and data more reliable and secure The SVBAF transforms backup request inputs, via SVBAF components (e.g., BP, FSD), into backup response outputs.

The SVBAF component enabling access of information between nodes may be developed by employing various development tools and languages such as, but not limited to: Apache® components, Assembly, ActiveX, binary executables, (ANSI) (Objective-) C(++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the SVBAF server employs a cryptographic server to encrypt and decrypt communications. The SVBAF component may communicate to and/or with other components in a component collection, including itself, and/or facilities of the like. Most frequently, the SVBAF component communicates with the SVBAF database, operating systems, other program components, and/or the like. The SVBAF may contain, communicate, generate, obtain, and/or provide program component, system, user, and/or data communications, requests, and/or responses.

Distributed SVBAFs

The structure and/or operation of any of the SVBAF node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through various data processing communication techniques.

The configuration of the SVBAF controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for SVBAF controller and/or SVBAF component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the SVBAF controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
```

-continued

```
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html http://publib.boulder.ibm.com/infocenter/tivihelp/v2r1/index.jsp?topic=/com.ibm.IBMDI.doc/referenceguide295.htm and other parser implementations:
  http://publib.boulder.ibm.com/infocenter/tivihelp/v2r1/index.jsp?topic=/com.ibm.IBMDI.doc/referenceguide259.htm
all of which are hereby expressly incorporated by reference.
Additional embodiments may include:
1. A backup apparatus, comprising:
a memory;
a component collection in the memory, including:
  a backup processing component, and
  a finalization settings determining component;
a processor disposed in communication with the memory, and configured to issue a plurality of processing instructions from the component collection stored in the memory,
  wherein the processor issues instructions from the backup processing component, stored in the memory, to:
    (a) designate, via at least one processor, a set of one or more blocks to be copied from a source volume to a target volume;
    (b) copy, via at least one processor, the designated set of one or more blocks from the source volume to the target volume while an operating system is configured to write to the source volume;
    (c) identify, via at least one processor, blocks of the source volume that were written to by the operating system while the operating system was configured to write to the source volume during element (b);
    (d) analyze, via at least one processor, finalization settings to determine whether to enter a copy-on-write mode, when one or more blocks were identified in element (c);
    (d)(i) change, via at least one processor, the designated set of one or more blocks to be copied from the source volume to the target volume to include at least one of the identified one or more blocks and repeat elements (b), (c), and (d), when it is determined that the copy-on-write mode should not be entered;
    (d)(ii) instruct, via at least one processor, the operating system to enter the copy-on-write mode and bring the target volume into a state consistent with a state of the source volume at the time the copy-on-write mode was entered, when it is determined that the copy-on-write mode should be entered;
  wherein the processor issues instructions from the finalization settings determining component, stored in the memory, to:
    obtain, via at least one processor, a finalization settings request from the backup processing component; and
    provide, via at least one processor, the finalization settings to the backup processing component.
2. The apparatus of embodiment 1, wherein the copy-on-write mode is a mode in which contents of a block of the source volume that is targeted by a write instruction from the operating system are preserved in a copy-on-write file before the write instruction modifies the contents of the targeted block.
3. The apparatus of embodiment 1, further, comprising:
  the processor issues instructions from the backup processing component, stored in the memory, to:
    log, via at least one processor, backup performance characteristics.

4. The apparatus of embodiment 3, wherein the backup performance characteristics include: number of passes through elements (b), (c), and (d) until the copy-on-write mode is entered,
amount of data stored in each pass, completion time for each pass.
5. The apparatus of embodiment 1, further, comprising:
the processor issues instructions from the finalization settings determining component, stored in the memory, to:
determine, via at least one processor, finalization configuration settings associated with the finalization settings request, wherein the finalization configuration settings specify a set of metrics utilized to determine whether to enter the copy-on-write mode, and a threshold value, for each metric in the set of metrics, that indicates whether a metric has been satisfied.
6. The apparatus of embodiment 5, wherein a threshold value is specified as a constant.
7. The apparatus of embodiment 5, wherein a threshold value is specified as a function or calculated parameter.
8. The apparatus of embodiment 7, further, comprising:
the processor issues instructions from the finalization settings determining component, stored in the memory, to:
determine, via at least one processor, a usage profile associated with the finalization settings request;
retrieve, via at least one processor, performance logs associated with the usage profile for the threshold value specified as a function or calculated parameter; and
evaluate, via at least one processor, the threshold value specified as a function or calculated parameter using the retrieved performance logs.
9. The apparatus of embodiment 5, wherein the finalization configuration settings further include a set of logical operators that specify how to evaluate a combination of metrics in the set of metrics to determine whether the finalization settings have been satisfied.
10. The apparatus of embodiment 5, wherein the set of metrics includes a block size metric that is satisfied when aggregate size of changed blocks in a pass through elements (b), (c), and (d) crosses a threshold value that is dynamically calculated based on either available bandwidth between the source volume and the target volume, or size of at least one of: the source volume or the target volume.
11. The apparatus of embodiment 5, wherein the set of metrics includes a number of passes metric that is satisfied when the number of passes through elements (b), (c), and (d) crosses a threshold value specified as a dynamic number calculated based on the average number of passes for a usage profile associated with the finalization settings request.
12. The apparatus of embodiment 5, wherein the set of metrics includes a delta data metric that is satisfied when the change in the amount of data copied between passes through elements (b), (c), and (d) reaches an asymptote.
13. The apparatus of embodiment 5, wherein the set of metrics includes a delta time metric that is satisfied when the change between passes through elements (b), (c), and (d) in the amount of time to complete a pass crosses a threshold value.
14. The apparatus of embodiment 5, wherein the set of metrics includes a pass completion time metric that is satisfied when pass completion time for pass through elements (b), (c), and (d) crosses a threshold value specified as a constant.
15. The apparatus of embodiment 5, wherein the set of metrics includes a resource intensity metric that is satisfied when resource load for pass through elements (b), (c), and (d) crosses a threshold value, wherein the resource load includes at least one of: processor utilization, disk utilization, network utilization, power utilization.
16. A processor-readable backup non-transient physical medium storing processor-executable components, the components, comprising:
a component collection stored in the medium, including:
a backup processing component, and
a finalization settings determining component;
wherein the backup processing component, stored in the medium, includes processor-issuable instructions to:
(a) designate, via at least one processor, a set of one or more blocks to be copied from a source volume to a target volume;
(b) copy, via at least one processor, the designated set of one or more blocks from the source volume to the target volume while an operating system is configured to write to the source volume;
(c) identify, via at least one processor, blocks of the source volume that were written to by the operating system while the operating system was configured to write to the source volume during element (b);
(d) analyze, via at least one processor, finalization settings to determine whether to enter a copy-on-write mode, when one or more blocks were identified in element (c);
(d)(i) change, via at least one processor, the designated set of one or more blocks to be copied from the source volume to the target volume to include at least one of the identified one or more blocks and repeat elements (b), (c), and (d), when it is determined that the copy-on-write mode should not be entered;
(d)(ii) instruct, via at least one processor, the operating system to enter the copy-on-write mode and bring the target volume into a state consistent with a state of the source volume at the time the copy-on-write mode was entered, when it is determined that the copy-on-write mode should be entered;
wherein the finalization settings determining component, stored in the medium, includes processor-issuable instructions to:
obtain, via at least one processor, a finalization settings request from the backup processing component; and
provide, via at least one processor, the finalization settings to the backup processing component.
17. The medium of embodiment 16, wherein the copy-on-write mode is a mode in which contents of a block of the source volume that is targeted by a write instruction from the operating system are preserved in a copy-on-write file before the write instruction modifies the contents of the targeted block.
18. The medium of embodiment 16, further, comprising:
the backup processing component, stored in the medium, includes processor-issuable instructions to:
log, via at least one processor, backup performance characteristics.

19. The medium of embodiment 18, wherein the backup performance characteristics include: number of passes through elements (b), (c), and (d) until the copy-on-write mode is entered, amount of data stored in each pass, completion time for each pass.
20. The medium of embodiment 16, further, comprising:
the finalization settings determining component, stored in the medium, includes processor-issuable instructions to:
determine, via at least one processor, finalization configuration settings associated with the finalization settings request, wherein the finalization configuration settings specify a set of metrics utilized to determine whether to enter the copy-on-write mode, and a threshold value, for each metric in the set of metrics, that indicates whether a metric has been satisfied.
21. The medium of embodiment 20, wherein a threshold value is specified as a constant.
22. The medium of embodiment 20, wherein a threshold value is specified as a function or calculated parameter.
23. The medium of embodiment 22, further, comprising:
the finalization settings determining component, stored in the medium, includes processor-issuable instructions to:
determine, via at least one processor, a usage profile associated with the finalization settings request;
retrieve, via at least one processor, performance logs associated with the usage profile for the threshold value specified as a function or calculated parameter; and
evaluate, via at least one processor, the threshold value specified as a function or calculated parameter using the retrieved performance logs.
24. The medium of embodiment 20, wherein the finalization configuration settings further include a set of logical operators that specify how to evaluate a combination of metrics in the set of metrics to determine whether the finalization settings have been satisfied.
25. The medium of embodiment 20, wherein the set of metrics includes a block size metric that is satisfied when aggregate size of changed blocks in a pass through elements (b), (c), and (d) crosses a threshold value that is dynamically calculated based on either available bandwidth between the source volume and the target volume, or size of at least one of: the source volume or the target volume.
26. The medium of embodiment 20, wherein the set of metrics includes a number of passes metric that is satisfied when the number of passes through elements (b), (c), and (d) crosses a threshold value specified as a dynamic number calculated based on the average number of passes for a usage profile associated with the finalization settings request.
27. The medium of embodiment 20, wherein the set of metrics includes a delta data metric that is satisfied when the change in the amount of data copied between passes through elements (b), (c), and (d) reaches an asymptote.
28. The medium of embodiment 20, wherein the set of metrics includes a delta time metric that is satisfied when the change between passes through elements (b), (c), and (d) in the amount of time to complete a pass crosses a threshold value.
29. The medium of embodiment 20, wherein the set of metrics includes a pass completion time metric that is satisfied when pass completion time for pass through elements (b), (c), and (d) crosses a threshold value specified as a constant.
30. The medium of embodiment 20, wherein the set of metrics includes a resource intensity metric that is satisfied when resource load for pass through elements (b), (c), and (d) crosses a threshold value, wherein the resource load includes at least one of: processor utilization, disk utilization, network utilization, power utilization.
31. A processor-implemented backup system, comprising:
a backup processing component means, to:
(a) designate, via at least one processor, a set of one or more blocks to be copied from a source volume to a target volume;
(b) copy, via at least one processor, the designated set of one or more blocks from the source volume to the target volume while an operating system is configured to write to the source volume;
(c) identify, via at least one processor, blocks of the source volume that were written to by the operating system while the operating system was configured to write to the source volume during element (b);
(d) analyze, via at least one processor, finalization settings to determine whether to enter a copy-on-write mode, when one or more blocks were identified in element (c);
(d)(i) change, via at least one processor, the designated set of one or more blocks to be copied from the source volume to the target volume to include at least one of the identified one or more blocks and repeat elements (b), (c), and (d), when it is determined that the copy-on-write mode should not be entered;
(d)(ii) instruct, via at least one processor, the operating system to enter the copy-on-write mode and bring the target volume into a state consistent with a state of the source volume at the time the copy-on-write mode was entered, when it is determined that the copy-on-write mode should be entered;
a finalization settings determining component means, to:
obtain, via at least one processor, a finalization settings request from the backup processing component; and
provide, via at least one processor, the finalization settings to the backup processing component.
32. The system of embodiment 31, wherein the copy-on-write mode is a mode in which contents of a block of the source volume that is targeted by a write instruction from the operating system are preserved in a copy-on-write file before the write instruction modifies the contents of the targeted block.
33. The system of embodiment 31, further, comprising:
the backup processing component means, to:
log, via at least one processor, backup performance characteristics.
34. The system of embodiment 33, wherein the backup performance characteristics include: number of passes through elements (b), (c), and (d) until the copy-on-write mode is entered, amount of data stored in each pass, completion time for each pass.
35. The system of embodiment 31, further, comprising:
the finalization settings determining component means, to:
determine, via at least one processor, finalization configuration settings associated with the finalization settings request, wherein the finalization configuration settings specify a set of metrics utilized to determine whether to enter the copy-on-write mode, and a threshold value, for each metric in the set of metrics, that indicates whether a metric has been satisfied.
36. The system of embodiment 35, wherein a threshold value is specified as a constant.
37. The system of embodiment 35, wherein a threshold value is specified as a function or calculated parameter.
38. The system of embodiment 37, further, comprising:
the finalization settings determining component means, to:
determine, via at least one processor, a usage profile associated with the finalization settings request;
retrieve, via at least one processor, performance logs associated with the usage profile for the threshold value specified as a function or calculated parameter; and
evaluate, via at least one processor, the threshold value specified as a function or calculated parameter using the retrieved performance logs.
39. The system of embodiment 35, wherein the finalization configuration settings further include a set of logical operators that specify how to evaluate a combination of metrics in the set of metrics to determine whether the finalization settings have been satisfied.
40. The system of embodiment 35, wherein the set of metrics includes a block size metric that is satisfied when aggregate size of changed blocks in a pass through elements (b), (c), and (d) crosses a threshold value that is dynamically calculated based on either available bandwidth between the source volume and the target volume, or size of at least one of: the source volume or the target volume.
41. The system of embodiment 35, wherein the set of metrics includes a number of passes metric that is satisfied when the number of passes through elements (b), (c), and (d) crosses a threshold value specified as a dynamic number calculated based on the average number of passes for a usage profile associated with the finalization settings request.
42. The system of embodiment 35, wherein the set of metrics includes a delta data metric that is satisfied when the change in the amount of data copied between passes through elements (b), (c), and (d) reaches an asymptote.
43. The system of embodiment 35, wherein the set of metrics includes a delta time metric that is satisfied when the change between passes through elements (b), (c), and (d) in the amount of time to complete a pass crosses a threshold value.
44. The system of embodiment 35, wherein the set of metrics includes a pass completion time metric that is satisfied when pass completion time for pass through elements (b), (c), and (d) crosses a threshold value specified as a constant.
45. The system of embodiment 35, wherein the set of metrics includes a resource intensity metric that is satisfied when resource load for pass through elements (b), (c), and (d) crosses a threshold value, wherein the resource load includes at least one of: processor utilization, disk utilization, network utilization, power utilization.
46. A processor-implemented backup method, comprising:
executing processor-implemented backup processing component instructions to:
(a) designate, via at least one processor, a set of one or more blocks to be copied from a source volume to a target volume;
(b) copy, via at least one processor, the designated set of one or more blocks from the source volume to the target volume while an operating system is configured to write to the source volume;
(c) identify, via at least one processor, blocks of the source volume that were written to by the operating system while the operating system was configured to write to the source volume during element (b);
(d) analyze, via at least one processor, finalization settings to determine whether to enter a copy-on-write mode, when one or more blocks were identified in element (c);
(d)(i) change, via at least one processor, the designated set of one or more blocks to be copied from the source volume to the target volume to include at least one of the identified one or more blocks and repeat elements (b), (c), and (d), when it is determined that the copy-on-write mode should not be entered;
(d)(ii) instruct, via at least one processor, the operating system to enter the copy-on-write mode and bring the target volume into a state consistent with a state of the source volume at the time the copy-on-write mode was entered, when it is determined that the copy-on-write mode should be entered;
executing processor-implemented finalization settings determining component instructions to:
obtain, via at least one processor, a finalization settings request from the backup processing component; and
provide, via at least one processor, the finalization settings to the backup processing component.
47. The method of embodiment 46, wherein the copy-on-write mode is a mode in which contents of a block of the source volume that is targeted by a write instruction from the operating system are preserved in a copy-on-write file before the write instruction modifies the contents of the targeted block.
48. The method of embodiment 46, further, comprising:
executing processor-implemented backup processing component instructions to:
log, via at least one processor, backup performance characteristics.
49. The method of embodiment 48, wherein the backup performance characteristics include: number of passes through elements (b), (c), and (d) until the copy-on-write mode is entered, amount of data stored in each pass, completion time for each pass.
50. The method of embodiment 46, further, comprising:
executing processor-implemented finalization settings determining component instructions to:
determine, via at least one processor, finalization configuration settings associated with the finalization settings request, wherein the finalization configuration settings specify a set of metrics utilized to determine whether to enter the copy-on-write mode, and a threshold value, for each metric in the set of metrics, that indicates whether a metric has been satisfied.
51. The method of embodiment 50, wherein a threshold value is specified as a constant.
52. The method of embodiment 50, wherein a threshold value is specified as a function or calculated parameter.
53. The method of embodiment 52, further, comprising:
executing processor-implemented finalization settings determining component instructions to:
determine, via at least one processor, a usage profile associated with the finalization settings request;

retrieve, via at least one processor, performance logs associated with the usage profile for the threshold value specified as a function or calculated parameter; and evaluate, via at least one processor, the threshold value specified as a function or calculated parameter using the retrieved performance logs.

54. The method of embodiment 50, wherein the finalization configuration settings further include a set of logical operators that specify how to evaluate a combination of metrics in the set of metrics to determine whether the finalization settings have been satisfied.

55. The method of embodiment 50, wherein the set of metrics includes a block size metric that is satisfied when aggregate size of changed blocks in a pass through elements (b), (c), and (d) crosses a threshold value that is dynamically calculated based on either available bandwidth between the source volume and the target volume, or size of at least one of: the source volume or the target volume.

56. The method of embodiment 50, wherein the set of metrics includes a number of passes metric that is satisfied when the number of passes through elements (b), (c), and (d) crosses a threshold value specified as a dynamic number calculated based on the average number of passes for a usage profile associated with the finalization settings request.

57. The method of embodiment 50, wherein the set of metrics includes a delta data metric that is satisfied when the change in the amount of data copied between passes through elements (b), (c), and (d) reaches an asymptote.

58. The method of embodiment 50, wherein the set of metrics includes a delta time metric that is satisfied when the change between passes through elements (b), (c), and (d) in the amount of time to complete a pass crosses a threshold value.

59. The method of embodiment 50, wherein the set of metrics includes a pass completion time metric that is satisfied when pass completion time for pass through elements (b), (c), and (d) crosses a threshold value specified as a constant.

60. The method of embodiment 50, wherein the set of metrics includes a resource intensity metric that is satisfied when resource load for pass through elements (b), (c), and (d) crosses a threshold value, wherein the resource load includes at least one of: processor utilization, disk utilization, network utilization, power utilization.

101. A backup apparatus, comprising:
a memory;
a component collection in the memory, including:
a backup processing component;
a processor disposed in communication with the memory, and configured to issue a plurality of processing instructions from the component collection stored in the memory,
wherein the processor issues instructions from the backup processing component, stored in the memory, to:
(a) designate, via at least one processor, a set of one or more blocks to be copied from a source volume to a target volume based on predictive optimization settings associated with a backup request;
(b) copy, via at least one processor, at least some of the designated set of one or more blocks from the source volume to the target volume based on lookahead optimization settings associated with the backup request, while an operating system is configured to write to the source volume;
(c) identify, via at least one processor, blocks of the source volume that were written to by the operating system while the operating system was configured to write to the source volume during element (b);
(d) determine, via at least one processor, whether to enter a copy-on-write mode, when one or more blocks were identified in element (c);
(d)(i) change, via at least one processor, the designated set of one or more blocks to be copied from the source volume to the target volume to include at least one of the identified one or more blocks based on the predictive optimization settings and repeat elements (b), (c), and (d), when it is determined that the copy-on-write mode should not be entered;
(d)(ii) instruct, via at least one processor, the operating system to enter the copy-on-write mode and bring the target volume into a state consistent with a state of the source volume at the time the copy-on-write mode was entered, when it is determined that the copy-on-write mode should be entered.

102. The apparatus of embodiment 101, further, comprising:
the processor issues instructions from the backup processing component, stored in the memory, to:
determine, via at least one processor, a usage profile associated with the backup request; and
set, via at least one processor, the predictive optimization settings to settings corresponding to the usage profile.

103. The apparatus of embodiment 102, further, comprising:
the processor issues instructions from the backup processing component, stored in the memory, to:
retrieve, via at least one processor, performance logs associated with the usage profile; and
determine, via at least one processor, an optimal predictive optimization settings combination based on analysis of the performance logs via a machine learning technique,
wherein the predictive optimization settings are set to the optimal predictive optimization settings combination.

104. The apparatus of embodiment 101, wherein the predictive optimization settings specify that stable blocks criteria, which identify blocks on the source volume that are unlikely to change, are utilized to designate the set of one or more blocks to be copied.

105. The apparatus of embodiment 104, wherein stable blocks optimization settings specify a set of blocks classified as stable blocks, and wherein blocks other than the stable blocks are not designated in the set of one or more blocks to be copied for a specified number of passes through elements (b), (c), and (d).

106. The apparatus of embodiment 105, wherein the stable blocks include blocks that represent at least one of: the operating system, applications, user data.

107. The apparatus of embodiment 105, wherein the stable blocks include blocks classified as stable based on analysis of write history associated with blocks on the source volume via a machine learning technique.

108. The apparatus of embodiment 101, wherein the predictive optimization settings specify that busy blocks criteria, which identify blocks on the source volume that are likely to change frequently, are utilized to designate the set of one or more blocks to be copied.

109. The apparatus of embodiment 108, wherein busy blocks optimization settings specify a set of blocks classified as busy blocks, and wherein the busy blocks are not designated in the set of one or more blocks to be copied for a specified number of passes through elements (b), (c), and (d).

110. The apparatus of embodiment 109, wherein the busy blocks include blocks that represent at least one of: database entries, mail server files.

111. The apparatus of embodiment 109, wherein the busy blocks include blocks classified as busy based on analysis of write history associated with blocks on the source volume via a statistical technique.

112. The apparatus of embodiment 101, wherein the predictive optimization settings specify that historical change frequency criteria, which categorize blocks on the source volume into different frequency types based on analysis of write history, are utilized to designate the set of one or more blocks to be copied.

113. The apparatus of embodiment 112, wherein historical change frequency optimization settings specify the number of passes through elements (b), (c), and (d) during which blocks of each frequency type are not designated in the set of one or more blocks to be copied.

114. The apparatus of embodiment 101, further, comprising:
the processor issues instructions from the backup processing component, stored in the memory, to:
determine, via at least one processor, a usage profile associated with the backup request; and
set, via at least one processor, the lookahead optimization settings to settings corresponding to the usage profile.

115. The apparatus of embodiment 114, further, comprising:
the processor issues instructions from the backup processing component, stored in the memory, to:
retrieve, via at least one processor, performance logs associated with the usage profile; and
determine, via at least one processor, an optimal lookahead optimization settings combination based on analysis of the performance logs via a statistical technique,
wherein the lookahead optimization settings are set to the optimal lookahead optimization settings combination.

116. The apparatus of embodiment 101, wherein the lookahead optimization settings specify that accelerated copy optimization is utilized to configure copying of the designated set of one or more blocks.

117. The apparatus of embodiment 116, wherein accelerated copy optimization settings specify that blocks on the source volume that changed forward of a current position and that had not been marked as changed blocks at the start of a current pass through elements (b), (c), and (d) are added to the set of one or more blocks to copy.

118. The apparatus of embodiment 117, wherein the accelerated copy optimization settings specify a schedule that determines when the accelerated copy optimization is utilized.

119. The apparatus of embodiment 101, wherein the lookahead optimization settings specify that delayed copy optimization is utilized to configure copying of the designated set of one or more blocks.

120. The apparatus of embodiment 119, wherein delayed copy optimization settings specify that blocks on the source volume that changed forward of a current position and that had been marked as changed blocks at the start of a current pass through elements (b), (c), and (d) are removed from the set of one or more blocks to copy.

121. A processor-readable backup non-transient physical medium storing processor-executable components, the components, comprising:
a component collection stored in the medium, including:
a backup processing component;
wherein the backup processing component, stored in the medium, includes processor-issuable instructions to:
(a) designate, via at least one processor, a set of one or more blocks to be copied from a source volume to a target volume based on predictive optimization settings associated with a backup request;
(b) copy, via at least one processor, at least some of the designated set of one or more blocks from the source volume to the target volume based on lookahead optimization settings associated with the backup request, while an operating system is configured to write to the source volume;
(c) identify, via at least one processor, blocks of the source volume that were written to by the operating system while the operating system was configured to write to the source volume during element (b);
(d) determine, via at least one processor, whether to enter a copy-on-write mode, when one or more blocks were identified in element (c);
(d)(i) change, via at least one processor, the designated set of one or more blocks to be copied from the source volume to the target volume to include at least one of the identified one or more blocks based on the predictive optimization settings and repeat elements (b), (c), and (d), when it is determined that the copy-on-write mode should not be entered;
(d)(ii) instruct, via at least one processor, the operating system to enter the copy-on-write mode and bring the target volume into a state consistent with a state of the source volume at the time the copy-on-write mode was entered, when it is determined that the copy-on-write mode should be entered.

122. The medium of embodiment 121, further, comprising:
the backup processing component, stored in the medium, includes processor-issuable instructions to:
determine, via at least one processor, a usage profile associated with the backup request; and
set, via at least one processor, the predictive optimization settings to settings corresponding to the usage profile.

123. The medium of embodiment 122, further, comprising:
the backup processing component, stored in the medium, includes processor-issuable instructions to:
retrieve, via at least one processor, performance logs associated with the usage profile; and
determine, via at least one processor, an optimal predictive optimization settings combination based on analysis of the performance logs via a machine learning technique,
wherein the predictive optimization settings are set to the optimal predictive optimization settings combination.

124. The medium of embodiment 121, wherein the predictive optimization settings specify that stable blocks criteria, which identify blocks on the source volume that are unlikely to change, are utilized to designate the set of one or more blocks to be copied.

125. The medium of embodiment 124, wherein stable blocks optimization settings specify a set of blocks classified as stable blocks, and wherein blocks other than the stable blocks are not designated in the set of one or more blocks to be copied for a specified number of passes through elements (b), (c), and (d).

126. The medium of embodiment 125, wherein the stable blocks include blocks that represent at least one of: the operating system, applications, user data.

127. The medium of embodiment 125, wherein the stable blocks include blocks classified as stable based on analysis of write history associated with blocks on the source volume via a machine learning technique.

128. The medium of embodiment 121, wherein the predictive optimization settings specify that busy blocks criteria, which identify blocks on the source volume that are likely to change frequently, are utilized to designate the set of one or more blocks to be copied.

129. The medium of embodiment 128, wherein busy blocks optimization settings specify a set of blocks classified as busy blocks, and wherein the busy blocks are not designated in the set of one or more blocks to be copied for a specified number of passes through elements (b), (c), and (d).

130. The medium of embodiment 129, wherein the busy blocks include blocks that represent at least one of: database entries, mail server files.

131. The medium of embodiment 129, wherein the busy blocks include blocks classified as busy based on analysis of write history associated with blocks on the source volume via a statistical technique.

132. The medium of embodiment 121, wherein the predictive optimization settings specify that historical change frequency criteria, which categorize blocks on the source volume into different frequency types based on analysis of write history, are utilized to designate the set of one or more blocks to be copied.

133. The medium of embodiment 132, wherein historical change frequency optimization settings specify the number of passes through elements (b), (c), and (d) during which blocks of each frequency type are not designated in the set of one or more blocks to be copied.

134. The medium of embodiment 121, further, comprising:
the backup processing component, stored in the medium, includes processor-issuable instructions to:
determine, via at least one processor, a usage profile associated with the backup request; and
set, via at least one processor, the lookahead optimization settings to settings corresponding to the usage profile.

135. The medium of embodiment 134, further, comprising:
the backup processing component, stored in the medium, includes processor-issuable instructions to:
retrieve, via at least one processor, performance logs associated with the usage profile; and
determine, via at least one processor, an optimal lookahead optimization settings combination based on analysis of the performance logs via a statistical technique,
wherein the lookahead optimization settings are set to the optimal lookahead optimization settings combination.

136. The medium of embodiment 121, wherein the lookahead optimization settings specify that accelerated copy optimization is utilized to configure copying of the designated set of one or more blocks.

137. The medium of embodiment 136, wherein accelerated copy optimization settings specify that blocks on the source volume that changed forward of a current position and that had not been marked as changed blocks at the start of a current pass through elements (b), (c), and (d) are added to the set of one or more blocks to copy.

138. The medium of embodiment 137, wherein the accelerated copy optimization settings specify a schedule that determines when the accelerated copy optimization is utilized.

139. The medium of embodiment 121, wherein the lookahead optimization settings specify that delayed copy optimization is utilized to configure copying of the designated set of one or more blocks.

140. The medium of embodiment 139, wherein delayed copy optimization settings specify that blocks on the source volume that changed forward of a current position and that had been marked as changed blocks at the start of a current pass through elements (b), (c), and (d) are removed from the set of one or more blocks to copy.

141. A processor-implemented backup system, comprising:
a backup processing component means, to:
(a) designate, via at least one processor, a set of one or more blocks to be copied from a source volume to a target volume based on predictive optimization settings associated with a backup request;
(b) copy, via at least one processor, at least some of the designated set of one or more blocks from the source volume to the target volume based on lookahead optimization settings associated with the backup request, while an operating system is configured to write to the source volume;
(c) identify, via at least one processor, blocks of the source volume that were written to by the operating system while the operating system was configured to write to the source volume during element (b);
(d) determine, via at least one processor, whether to enter a copy-on-write mode, when one or more blocks were identified in element (c);
(d)(i) change, via at least one processor, the designated set of one or more blocks to be copied from the source volume to the target volume to include at least one of the identified one or more blocks based on the predictive optimization settings and repeat elements (b), (c), and (d), when it is determined that the copy-on-write mode should not be entered;
(d)(ii) instruct, via at least one processor, the operating system to enter the copy-on-write mode and bring the target volume into a state consistent with a state of the source volume at the time the copy-on-write mode was entered, when it is determined that the copy-on-write mode should be entered.

142. The system of embodiment 141, further, comprising:
the backup processing component means, to:
determine, via at least one processor, a usage profile associated with the backup request; and
set, via at least one processor, the predictive optimization settings to settings corresponding to the usage profile.

143. The system of embodiment 142, further, comprising:
the backup processing component means, to:
retrieve, via at least one processor, performance logs associated with the usage profile; and determine, via at least one processor, an optimal predictive optimization settings combination based on analysis of the performance logs via a machine learning technique,
  wherein the predictive optimization settings are set to the optimal predictive optimization settings combination.
144. The system of embodiment 141, wherein the predictive optimization settings specify that stable blocks criteria, which identify blocks on the source volume that are unlikely to change, are utilized to designate the set of one or more blocks to be copied.
145. The system of embodiment 144, wherein stable blocks optimization settings specify a set of blocks classified as stable blocks, and wherein blocks other than the stable blocks are not designated in the set of one or more blocks to be copied for a specified number of passes through elements (b), (c), and (d).
146. The system of embodiment 145, wherein the stable blocks include blocks that represent at least one of: the operating system, applications, user data.
147. The system of embodiment 145, wherein the stable blocks include blocks classified as stable based on analysis of write history associated with blocks on the source volume via a machine learning technique.
148. The system of embodiment 141, wherein the predictive optimization settings specify that busy blocks criteria, which identify blocks on the source volume that are likely to change frequently, are utilized to designate the set of one or more blocks to be copied.
149. The system of embodiment 148, wherein busy blocks optimization settings specify a set of blocks classified as busy blocks, and wherein the busy blocks are not designated in the set of one or more blocks to be copied for a specified number of passes through elements (b), (c), and (d).
150. The system of embodiment 149, wherein the busy blocks include blocks that represent at least one of: database entries, mail server files.
151. The system of embodiment 149, wherein the busy blocks include blocks classified as busy based on analysis of write history associated with blocks on the source volume via a statistical technique.
152. The system of embodiment 141, wherein the predictive optimization settings specify that historical change frequency criteria, which categorize blocks on the source volume into different frequency types based on analysis of write history, are utilized to designate the set of one or more blocks to be copied.
153. The system of embodiment 152, wherein historical change frequency optimization settings specify the number of passes through elements (b), (c), and (d) during which blocks of each frequency type are not designated in the set of one or more blocks to be copied.
154. The system of embodiment 141, further, comprising: the backup processing component means, to:
  determine, via at least one processor, a usage profile associated with the backup request; and
  set, via at least one processor, the lookahead optimization settings to settings corresponding to the usage profile.
155. The system of embodiment 154, further, comprising: the backup processing component means, to:
  retrieve, via at least one processor, performance logs associated with the usage profile; and determine, via at least one processor, an optimal lookahead optimization settings combination based on analysis of the performance logs via a statistical technique,
  wherein the lookahead optimization settings are set to the optimal lookahead optimization settings combination.
156. The system of embodiment 141, wherein the lookahead optimization settings specify that accelerated copy optimization is utilized to configure copying of the designated set of one or more blocks.
157. The system of embodiment 156, wherein accelerated copy optimization settings specify that blocks on the source volume that changed forward of a current position and that had not been marked as changed blocks at the start of a current pass through elements (b), (c), and (d) are added to the set of one or more blocks to copy.
158. The system of embodiment 157, wherein the accelerated copy optimization settings specify a schedule that determines when the accelerated copy optimization is utilized.
159. The system of embodiment 141, wherein the lookahead optimization settings specify that delayed copy optimization is utilized to configure copying of the designated set of one or more blocks.
160. The system of embodiment 159, wherein delayed copy optimization settings specify that blocks on the source volume that changed forward of a current position and that had been marked as changed blocks at the start of a current pass through elements (b), (c), and (d) are removed from the set of one or more blocks to copy.
161. A processor-implemented backup method, comprising: executing processor-implemented backup processing component instructions to:
  (a) designate, via at least one processor, a set of one or more blocks to be copied from a source volume to a target volume based on predictive optimization settings associated with a backup request;
  (b) copy, via at least one processor, at least some of the designated set of one or more blocks from the source volume to the target volume based on lookahead optimization settings associated with the backup request, while an operating system is configured to write to the source volume;
  (c) identify, via at least one processor, blocks of the source volume that were written to by the operating system while the operating system was configured to write to the source volume during element (b);
  (d) determine, via at least one processor, whether to enter a copy-on-write mode, when one or more blocks were identified in element (c);
    (d)(i) change, via at least one processor, the designated set of one or more blocks to be copied from the source volume to the target volume to include at least one of the identified one or more blocks based on the predictive optimization settings and repeat elements (b), (c), and (d), when it is determined that the copy-on-write mode should not be entered;
    (d)(ii) instruct, via at least one processor, the operating system to enter the copy-on-write mode and bring the target volume into a state consistent with a state of the source volume at the time the copy-on-write mode was entered, when it is determined that the copy-on-write mode should be entered.

162. The method of embodiment 161, further, comprising:
executing processor-implemented backup processing component instructions to:
determine, via at least one processor, a usage profile associated with the backup request; and
set, via at least one processor, the predictive optimization settings to settings corresponding to the usage profile.

163. The method of embodiment 162, further, comprising:
executing processor-implemented backup processing component instructions to:
retrieve, via at least one processor, performance logs associated with the usage profile; and
determine, via at least one processor, an optimal predictive optimization settings combination based on analysis of the performance logs via a machine learning technique,
wherein the predictive optimization settings are set to the optimal predictive optimization settings combination.

164. The method of embodiment 161, wherein the predictive optimization settings specify that stable blocks criteria, which identify blocks on the source volume that are unlikely to change, are utilized to designate the set of one or more blocks to be copied.

165. The method of embodiment 164, wherein stable blocks optimization settings specify a set of blocks classified as stable blocks, and wherein blocks other than the stable blocks are not designated in the set of one or more blocks to be copied for a specified number of passes through elements (b), (c), and (d).

166. The method of embodiment 165, wherein the stable blocks include blocks that represent at least one of: the operating system, applications, user data.

167. The method of embodiment 165, wherein the stable blocks include blocks classified as stable based on analysis of write history associated with blocks on the source volume via a machine learning technique.

168. The method of embodiment 161, wherein the predictive optimization settings specify that busy blocks criteria, which identify blocks on the source volume that are likely to change frequently, are utilized to designate the set of one or more blocks to be copied.

169. The method of embodiment 168, wherein busy blocks optimization settings specify a set of blocks classified as busy blocks, and wherein the busy blocks are not designated in the set of one or more blocks to be copied for a specified number of passes through elements (b), (c), and (d).

170. The method of embodiment 169, wherein the busy blocks include blocks that represent at least one of: database entries, mail server files.

171. The method of embodiment 169, wherein the busy blocks include blocks classified as busy based on analysis of write history associated with blocks on the source volume via a statistical technique.

172. The method of embodiment 161, wherein the predictive optimization settings specify that historical change frequency criteria, which categorize blocks on the source volume into different frequency types based on analysis of write history, are utilized to designate the set of one or more blocks to be copied.

173. The method of embodiment 172, wherein historical change frequency optimization settings specify the number of passes through elements (b), (c), and (d) during which blocks of each frequency type are not designated in the set of one or more blocks to be copied.

174. The method of embodiment 161, further, comprising:
executing processor-implemented backup processing component instructions to:
determine, via at least one processor, a usage profile associated with the backup request; and
set, via at least one processor, the lookahead optimization settings to settings corresponding to the usage profile.

175. The method of embodiment 174, further, comprising:
executing processor-implemented backup processing component instructions to:
retrieve, via at least one processor, performance logs associated with the usage profile; and
determine, via at least one processor, an optimal lookahead optimization settings combination based on analysis of the performance logs via a statistical technique,
wherein the lookahead optimization settings are set to the optimal lookahead optimization settings combination.

176. The method of embodiment 161, wherein the lookahead optimization settings specify that accelerated copy optimization is utilized to configure copying of the designated set of one or more blocks.

177. The method of embodiment 176, wherein accelerated copy optimization settings specify that blocks on the source volume that changed forward of a current position and that had not been marked as changed blocks at the start of a current pass through elements (b), (c), and (d) are added to the set of one or more blocks to copy.

178. The method of embodiment 177, wherein the accelerated copy optimization settings specify a schedule that determines when the accelerated copy optimization is utilized.

179. The method of embodiment 161, wherein the lookahead optimization settings specify that delayed copy optimization is utilized to configure copying of the designated set of one or more blocks.

180. The method of embodiment 179, wherein delayed copy optimization settings specify that blocks on the source volume that changed forward of a current position and that had been marked as changed blocks at the start of a current pass through elements (b), (c), and (d) are removed from the set of one or more blocks to copy.

201. A method for copying a source volume comprising multiple blocks to a target volume while an operating system is configured to write to the source volume, the method comprising:
(a) designating a set of one or more blocks to be copied from the source volume to the target volume;
(b) copying the designated set of one or more blocks from the source volume to the target volume while the operating system is configured to write to the source volume;
(c) identifying blocks of the source volume that were written to by the operating system while the operating system was configured to write to the source volume during step (b);

(d) if one or more blocks were identified in step (c), comparing an aggregate size of the identified one or more blocks to a threshold, wherein:
- (d)(i) if the aggregate size is greater than or equal to the threshold:
  - changing the designated set of one or more blocks to be copied from the source volume to the target volume to include at least one of the identified one or more blocks, and
  - repeating steps (b), (c), and (d);
- (d)(ii) if the aggregate size is below the threshold:
  - causing the operating system to enter a copy-on-write mode, in which contents of a block of the source volume that is targeted by a write instruction from the operating system are preserved in a copy-on-write file before the write instruction modifies the contents of the targeted block, and
  - bringing the target volume into a state consistent with a state of the source volume at the time the copy-on-write mode was entered.

202. The method of embodiment 201, wherein the changing the designated set of one or more blocks to be copied from the source volume to the target volume to include the at least one of the identified one or more blocks in step (d)(i) comprises changing the designated set of one or more blocks to be copied from the source volume to the target volume to include only the at least one of the identified one or more blocks.

203. The method of embodiment 201, wherein the method concludes if no blocks were identified in step (c).

204. The method of embodiment 201, wherein designating the set of one or more blocks to be copied from the source volume to the target volume in step (a) comprises designating at least one of (i) all allocated blocks in the source volume, and (ii) all blocks in the source volume.

205. The method of embodiment 201, further comprising designating a set of excluded blocks in the source volume, wherein the designating the set of one or more blocks to be copied from the source volume to the target volume in step (a) comprises excluding the excluded blocks from the designated set of one or more blocks to be copied from the source volume to the target volume.

206. The method of embodiment 201, wherein the operating system refrains from entering the copy-on-write mode during steps (a), (b), (c), and (d)(i).

207. The method of embodiment 201, further comprising:
receiving, during step (b), an indication that the operating system has written to a block of the source volume;
determining, during step (b), whether the written-to block has already been copied to the target volume;
if the written-to block has already been copied to the target volume, adding an identifier corresponding to the written-to block to a list of modified blocks; and
if the written-to block has not already been copied to the target volume, refraining from adding the identifier corresponding to the written-to block to the list of modified blocks,
wherein step (c) comprises evaluating said list of modified blocks.

208. The method of embodiment 207, wherein the evaluating said list of modified blocks comprises identifying the file types associated with at least one of the modified blocks and determining if said file type is designated to be copied.

209. The method of embodiment 201, further comprising:
receiving, during step (b), an instruction from the operating system to write to a block of the source volume; and
adding an identifier corresponding to the written-to block to a list of modified blocks,
wherein step (c) comprises evaluating said list of modified blocks.

210. The method of embodiment 209, wherein the evaluating said list of modified blocks comprises identifying the file types associated with at least one of the modified blocks and determining if said file type is designated to be copied.

211. The method of embodiment 201, wherein the threshold is determined based on a maximum number of blocks that may be transferred from the source volume to the target volume within a target maximum time.

212. The method of embodiment 201, wherein the threshold is determined based on a pre-defined proportion of a total size of at least one of the source volume and the target volume.

213. The method of embodiment 201, wherein the aggregate size of the identified one or more blocks is a numerical count of the identified one or more blocks, and the threshold comprises a number of blocks.

214. The method of embodiment 201, wherein step (d)(ii) comprises copying the at least one of the identified one or more blocks from the source volume to the target volume while the operating system is in the copy-on-write mode.

215. The method of embodiment 201, wherein the source volume is a client device and the target volume is a backup aggregator at a site local to the client device.

216. The method of embodiment 201, wherein the source volume is a client device and the target volume is a storage server at a cloud storage center remote from the client device.

217. The method of embodiment 201, wherein the source volume includes an image-based backup, and wherein the set of one or more blocks to be copied from the source volume to the target volume includes one or more blocks of the image-based backup.

218. The method of embodiment 201, wherein the target volume is a cloud storage volume.

219. The method of embodiment 201, wherein step (b) comprises sending the designated stet of one or more blocks to the target volume via the internet.

220. A method for copying a source volume comprising multiple blocks to a target volume, the method comprising:
(a) designating a set of one or more blocks to be copied from the source volume to the target volume;
(b) copying the designated set of one or more blocks from the source volume to the target volume while an operating system is configured to write to the source volume;
(c) identifying blocks of the source volume that were written to by the operating system while the operating system was configured to write to the source volume during step (b); and
(d) comparing an aggregate size of the identified one or more blocks to a threshold, wherein:
- (d)(i) if the aggregate size is greater than or equal to the threshold:
  - changing the designated set of one or more blocks to be copied from the source volume to the target volume to include at least one of the identified one or more blocks, and repeating steps (b), (c), and (d).

221. The method of embodiment 220, the changing the designated set of one or more blocks to be copied from the source volume to the target volume to include the at least one of the identified one or more blocks in step (d)(i) comprises changing the designated set of one or more blocks to be copied from the source volume to the target volume to include only the at least one of the identified one or more blocks.

222. The method of embodiment 220, wherein step (d) further comprises:

(d)(ii) if the aggregate size is below the threshold:

causing the operating system to enter a copy-on-write mode, in which contents of a block of the source volume that is targeted by a write instruction from the operating system are preserved in a copy-on-write file before the write instruction modifies the contents of the targeted block, and bringing the target volume into a state consistent with a state of the source volume at the time the copy-on-write mode was entered.

223. The method of embodiment 220, wherein designating the set of one or more blocks to be copied from the source volume to the target volume in step (a) comprises designating at least one of (i) all allocated blocks in the source volume, and (ii) all blocks in the source volume.

224. The method of embodiment 220, wherein the operating system refrains from entering the copy-on-write mode during steps (a), (b), (c), and (d)(i).

225. The method of embodiment 220, further comprising:

receiving, during step (b), an indication that the operating system has written to a block of the source volume;

determining, during step (b), whether the written-to block has already been copied to the target volume;

if the written-to block has already been copied to the target volume, adding an identifier corresponding to the written-to block to a list of modified blocks; and wherein step (c) comprises evaluating said list of modified blocks.

226. The method of embodiment 225, wherein the evaluating said list of modified blocks comprises identifying the file types associated with at least one of the modified blocks and determining if said file type is designated to be copied.

227. The method of embodiment 220, wherein the threshold is determined based on a maximum number of blocks that may be transferred from the source volume to the target volume within a target maximum time.

228. The method of embodiment 220, wherein the aggregate size of the identified one or more blocks is a numerical count of the identified one or more blocks, and the threshold comprises a number of blocks.

229. The method of embodiment 220, wherein step (d) (ii) comprises copying the at least one of the identified one or more blocks from the source volume to the target volume while the operating system is in the copy-on-write mode.

230. The method of embodiment 220, wherein the source volume is a client device and the target volume is a backup aggregator at a site local to the client device.

231. The method of embodiment 220, wherein the source volume is a client device and the target volume is a storage server at a cloud storage center remote from the client device.

232. The method of embodiment 220, wherein the source volume includes an image-based backup, and wherein the set of one or more blocks to be copied from the source volume to the target volume includes one or more blocks of the image-based backup.

233. The method of embodiment 220, wherein the target volume is a cloud storage volume.

234. The method of embodiment 220, wherein step (b) comprises sending the designated stet of one or more blocks to the target volume via the internet.

235. A method for copying a source volume comprising multiple blocks to a cloud storage volume while an operating system is configured to write to the source volume, the method comprising:

(a) designating a set of one or more blocks to be copied from the source volume to the cloud storage volume, wherein the source volume includes an image-based backup, and wherein the set of one or more blocks to be copied from the source volume to the cloud storage volume includes one or more blocks of the image-based backup;

(b) copying the designated set of one or more blocks from the source volume to the cloud storage volume while the operating system is configured to write to the source volume by sending the designated stet of one or more blocks to the cloud storage volume via the internet;

(c) identifying blocks of the source volume that were written to by the operating system while the operating system was configured to write to the source volume during step (b);

(d) if one or more blocks were identified in step (c), comparing an aggregate size of the identified one or more blocks to a threshold, wherein:

(d)(i) if the aggregate size is greater than or equal to the threshold:

changing the designated set of one or more blocks to be copied from the source volume to the cloud storage volume to include at least one of the identified one or more blocks, and repeating steps (b), (c), and (d);

(d)(ii) if the aggregate size is below the threshold:

causing the operating system to enter a copy-on-write mode, in which contents of a block of the source volume that is targeted by a write instruction from the operating system are preserved in a copy-on-write file before the write instruction modifies the contents of the targeted block, and bringing the cloud storage volume into a state consistent with a state of the source volume at the time the copy-on-write mode was entered.

In order to address various issues and advance the art, the entirety of this application for Source Volume Backup with Predictive and Lookahead Optimizations Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivative thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a SVBAF individual and/or enterprise user, database configuration and/or relational model, data type, data transmission and/or network framework, syntax structure, and/or the like, various embodiments of the SVBAF, may be implemented that allow a great deal of flexibility and customization. For example, aspects of the SVBAF may be adapted for storage management systems. While various embodiments and discussions of the SVBAF have included backup systems, however, it is to be understood that the embodiments described herein may be readily configured and/or customized for a wide variety of other applications and/or implementations.

What is claimed is:

1. A backup apparatus, comprising:
a memory;
a component collection in the memory, including:
   a backup processing component;
a processor disposed in communication with the memory, and configured to issue a plurality of processing instructions from the component collection stored in the memory,
   wherein the processor issues instructions from the backup processing component, stored in the memory, to:
   (a) designate, via at least one processor, a set of one or more blocks to be copied from a source volume to a target volume based on predictive optimization settings associated with a backup request,
      the predictive optimization settings determined from historical change frequency analysis of blocks that denote stable blocks with low frequency changes and busy blocks with higher frequency changes,
         the stable blocks designated for copying on initial copy passes and the busy blocks designated for copying on subsequent copy passes;
   (b) copy, via at least one processor, at least some of the designated set of one or more blocks from the source volume to the target volume based on lookahead optimization settings associated with the backup request, while an operating system is configured to write to the source volume;
   (c) identify, via at least one processor, blocks of the source volume that were written to by the operating system while the operating system was configured to write to the source volume during element (b);
   (d) determine, via at least one processor, whether to enter a copy-on-write mode, when one or more blocks were identified in element (c);
      (d)(i) change, via at least one processor, the designated set of one or more blocks to be copied from the source volume to the target volume to include at least one of the identified one or more blocks based on the predictive optimization settings and repeat elements (b), (c), and (d), when it is determined that the copy-on-write mode should not be entered;
      (d)(ii) instruct, via at least one processor, the operating system to enter the copy-on-write mode and bring the target volume into a state consistent with a state of the source volume at the time the copy-on-write mode was entered, when it is determined that the copy-on-write mode should be entered.

2. The apparatus of claim 1, further, comprising:
the processor issues instructions from the backup processing component, stored in the memory, to:
   determine, via at least one processor, a usage profile associated with the backup request; and set, via at least one processor, the predictive optimization settings to settings corresponding to the usage profile.

3. The apparatus of claim 2, further, comprising:
the processor issues instructions from the backup processing component, stored in the memory, to:
retrieve, via at least one processor, performance logs associated with the usage profile; and
determine, via at least one processor, an optimal predictive optimization settings combination based on analysis of the performance logs via a machine learning technique,
wherein the predictive optimization settings are set to the optimal predictive optimization settings combination.

4. The apparatus of claim 1, wherein the predictive optimization settings specify that stable blocks criteria, which identify blocks on the source volume that are unlikely to change, are utilized to designate the set of one or more blocks to be copied.

5. The apparatus of claim 4, wherein stable blocks optimization settings specify a set of blocks classified as stable blocks, and wherein blocks other than the stable blocks are not designated in the set of one or more blocks to be copied for a specified number of passes through elements (b), (c), and (d).

6. The apparatus of claim 5, wherein the stable blocks include blocks that represent at least one of: the operating system, applications, user data.

7. The apparatus of claim 5, wherein the stable blocks include blocks classified as stable based on analysis of write history associated with blocks on the source volume via a machine learning technique.

8. The apparatus of claim 1, wherein the predictive optimization settings specify that busy blocks criteria, which identify blocks on the source volume that are likely to change frequently, are utilized to designate the set of one or more blocks to be copied.

9. The apparatus of claim 8, wherein busy blocks optimization settings specify a set of blocks classified as busy blocks, and wherein the busy blocks are not designated in the set of one or more blocks to be copied for a specified number of passes through elements (b), (c), and (d).

10. The apparatus of claim 9, wherein the busy blocks include blocks that represent at least one of: database entries, mail server files.

11. The apparatus of claim 9, wherein the busy blocks include blocks classified as busy based on analysis of write history associated with blocks on the source volume via a statistical technique.

12. The apparatus of claim 1, wherein the predictive optimization settings specify that historical change frequency criteria, which categorize blocks on the source volume into different frequency types based on analysis of write history, are utilized to designate the set of one or more blocks to be copied.

13. The apparatus of claim 12, wherein historical change frequency optimization settings specify the number of passes through elements (b), (c), and (d) during which blocks of each frequency type are not designated in the set of one or more blocks to be copied.

14. The apparatus of claim 1, further, comprising:
the processor issues instructions from the backup processing component, stored in the memory, to:
determine, via at least one processor, a usage profile associated with the backup request; and set, via at least one processor, the lookahead optimization settings to settings corresponding to the usage profile.

15. The apparatus of claim 14, further, comprising:
the processor issues instructions from the backup processing component, stored in the memory, to:
retrieve, via at least one processor, performance logs associated with the usage profile; and
determine, via at least one processor, an optimal lookahead optimization settings combination based on analysis of the performance logs via a statistical technique,
wherein the lookahead optimization settings are set to the optimal lookahead optimization settings combination.

16. The apparatus of claim 1, wherein the lookahead optimization settings specify that accelerated copy optimization is utilized to configure copying of the designated set of one or more blocks.

17. The apparatus of claim 16, wherein accelerated copy optimization settings specify that blocks on the source volume that changed forward of a current position and that had not been marked as changed blocks at the start of a current pass through elements (b), (c), and (d) are added to the set of one or more blocks to copy.

18. The apparatus of claim 17, wherein the accelerated copy optimization settings specify a schedule that determines when the accelerated copy optimization is utilized.

19. The apparatus of claim 1, wherein the lookahead optimization settings specify that delayed copy optimization is utilized to configure copying of the designated set of one or more blocks.

20. The apparatus of claim 19, wherein delayed copy optimization settings specify that blocks on the source volume that changed forward of a current position and that had been marked as changed blocks at the start of a current pass through elements (b), (c), and (d) are removed from the set of one or more blocks to copy.

21. A processor-readable backup non-transient physical medium storing processor-executable components, the components, comprising:
a component collection stored in the medium, including:
a backup processing component;
wherein the backup processing component, stored in the medium, includes processor-issuable instructions to:
(a) designate, via at least one processor, a set of one or more blocks to be copied from a source volume to a target volume based on predictive optimization settings associated with a backup request,
the predictive optimization settings determined from historical change frequency analysis of blocks that denote stable blocks with low frequency changes and busy blocks with higher frequency changes,
the stable blocks designated for copying on initial copy passes and the busy blocks designated for copying on subsequent copy passes;
(b) copy, via at least one processor, at least some of the designated set of one or more blocks from the source volume to the target volume based on lookahead optimization settings associated with the backup request, while an operating system is configured to write to the source volume;
(c) identify, via at least one processor, blocks of the source volume that were written to by the operating system while the operating system was configured to write to the source volume during element (b);
(d) determine, via at least one processor, whether to enter a copy-on-write mode, when one or more blocks were identified in element (c);
  (d)(i) change, via at least one processor, the designated set of one or more blocks to be copied from the source volume to the target volume to include at least one of the identified one or more blocks based on the predictive optimization settings and repeat elements (b), (c), and (d), when it is determined that the copy-on-write mode should not be entered;
  (d)(ii) instruct, via at least one processor, the operating system to enter the copy-on-write mode and bring the target volume into a state consistent with a state of the source volume at the time the copy-on-write mode was entered, when it is determined that the copy-on-write mode should be entered.

22. A processor-implemented backup system, comprising:
a predictive optimization settings determining component means for determining predictive optimization settings; and
a backup processing component means, to:
  (a) designate a set of one or more blocks to be copied from a source volume to a target volume based on predictive optimization settings associated with a backup request,
    the predictive optimization settings determined from historical change frequency analysis of blocks that denote stable blocks with low frequency changes and busy blocks with higher frequency changes,
    the stable blocks designated for copying on initial copy passes and the busy blocks designated for copying on subsequent copy passes;
  (b) copy at least some of the designated set of one or more blocks from the source volume to the target volume based on lookahead optimization settings associated with the backup request, while an operating system is configured to write to the source volume;
  (c) identify blocks of the source volume that were written to by the operating system while the operating system was configured to write to the source volume during element (b);
  (d) determine whether to enter a copy-on-write mode, when one or more blocks were identified in element (c);
    (d)(i) change the designated set of one or more blocks to be copied from the source volume to the target volume to include at least one of the identified one or more blocks based on the predictive optimization settings and repeat elements (b), (c), and (d), when it is determined that the copy-on-write mode should not be entered;
    (d)(ii) instruct the operating system to enter the copy-on-write mode and bring the target volume into a state consistent with a state of the source volume at the time the copy-on-write mode was entered, when it is determined that the copy-on-write mode should be entered.

23. A processor-implemented backup method, comprising:
executing processor-implemented backup processing component instructions to:
  (a) designate, via at least one processor, a set of one or more blocks to be copied from a source volume to a target volume based on predictive optimization settings associated with a backup request,
    the predictive optimization settings determined from historical change frequency analysis of blocks that denote stable blocks with low frequency changes and busy blocks with higher frequency changes,
    the stable blocks designated for copying on initial copy passes and the busy blocks designated for copying on subsequent copy passes;
  (b) copy, via at least one processor, at least some of the designated set of one or more blocks from the source volume to the target volume based on lookahead optimization settings associated with the backup request, while an operating system is configured to write to the source volume;
  (c) identify, via at least one processor, blocks of the source volume that were written to by the operating system while the operating system was configured to write to the source volume during element (b);
  (d) determine, via at least one processor, whether to enter a copy-on-write mode, when one or more blocks were identified in element (c);
    (d)(i) change, via at least one processor, the designated set of one or more blocks to be copied from the source volume to the target volume to include at least one of the identified one or more blocks based on the predictive optimization settings and repeat elements (b), (c), and (d), when it is determined that the copy-on-write mode should not be entered;
    (d)(ii) instruct, via at least one processor, the operating system to enter the copy-on-write mode and bring the target volume into a state consistent with a state of the source volume at the time the copy-on-write mode was entered, when it is determined that the copy-on-write mode should be entered.

* * * * *